United States Patent
Zhang et al.

(10) Patent No.: US 11,075,718 B2
(45) Date of Patent: Jul. 27, 2021

(54) PARTITIONING OF DOWNLINK FEEDBACK INDICATION BITS

(71) Applicant: QUALCOMM Incorporated, San Diego, CA (US)

(72) Inventors: Xiaoxia Zhang, San Diego, CA (US); Ananta Narayanan Thyagarajan, Bangalore (IN); Jing Sun, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 16/786,711

(22) Filed: Feb. 10, 2020

(65) Prior Publication Data

US 2020/0259599 A1 Aug. 13, 2020

(30) Foreign Application Priority Data

Feb. 13, 2019 (IN) .............................. 201941005675

(51) Int. Cl.
| | |
|---|---|
| *H04L 29/06* | (2006.01) |
| *H04L 1/18* | (2006.01) |
| *H04L 5/00* | (2006.01) |
| *H04W 16/14* | (2009.01) |

(Continued)

(52) U.S. Cl.
CPC .......... *H04L 1/1816* (2013.01); *H04L 5/0044* (2013.01); *H04W 16/14* (2013.01); *H04W 72/1268* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 8,270,364 B1* | 9/2012 | Ranta ................ | H04L 1/1861 370/329 |
| 9,763,199 B2* | 9/2017 | Pelletier ............ | H04W 52/146 |

(Continued)

OTHER PUBLICATIONS

Interdigital Inc: "Configured Grant Enhancements in NR-U", 3GPP Draft, 3GPP TSG RAN WG1 Ad-Hoc Meeting 1901, R1-1900789, Configured Grant Enhancements in NR-U, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593635, 5 pages, Retrieved from the Internet: URL: http://www.3gpp.org/ftp/Meetings%5F3GPP%5FSYNC/RAN1/Docs/R1%2D1900789%2Ezip [retrieved on Oct. 1, 2020] pp. 1-3.

(Continued)

*Primary Examiner* — Sithu Ko
(74) *Attorney, Agent, or Firm* — Qualcomm Incorporated

(57) ABSTRACT

Methods, systems, and devices for wireless communications in a shared spectrum are described. A user equipment (UE) may transmit, via an autonomous uplink (AUL) communication, one or more transport blocks to a base station. Each transport block may include a plurality of code block groups (CBGs). The base station may provide CBG-level feedback to the UE based at least in part on the AUL communication. For example, a downlink feedback indication (DFI) bit sequence may be partitioned to include a first partition comprising AUL hybrid automatic repeat request (HARQ) feedback information and a second partition comprising contention window (CW) update information (e.g., for a subsequent AUL clear channel assessment). In some cases, the number of bits in the first partition may be based on a number of AUL HARQ processes of the UE and an AUL HARQ process granularity.

29 Claims, 22 Drawing Sheets

(51) Int. Cl.
*H04W 74/08* (2009.01)
*H04W 72/12* (2009.01)

(56) References Cited

U.S. PATENT DOCUMENTS

| | | | | |
|---|---|---|---|---|
| 10,652,866 | B2* | 5/2020 | Salem | H04L 5/0048 |
| 2013/0039341 | A1* | 2/2013 | Kim | H04W 36/0055 370/331 |
| 2014/0086078 | A1* | 3/2014 | Malladi | H04W 72/042 370/252 |
| 2017/0127453 | A1* | 5/2017 | Adachi | H04L 1/1825 |
| 2018/0109360 | A1* | 4/2018 | Sun | H04W 72/042 |
| 2019/0036654 | A1* | 1/2019 | Kim | H04L 1/1607 |
| 2019/0268912 | A1* | 8/2019 | Myung | H04W 72/0413 |
| 2020/0059935 | A1* | 2/2020 | Qian | H04W 74/02 |
| 2020/0127768 | A1* | 4/2020 | Seo | H04L 5/0035 |
| 2020/0374933 | A1* | 11/2020 | Lou | H04L 1/1887 |

OTHER PUBLICATIONS

International Search Report and Written Opinion—PCT/US2020/017776—ISA/EPO—dated Jun. 3, 2020, (191358WO).

Qualcomm Incorporated: "HARQ for Autonomous Uplink Access", 3GPP Draft, 3GPP TSG RAN WG1 #90bis, R1-1720405, HARQ for Autonomous Uplink Access, 3rd Generation Partnership Project (3GPP), Mobile Competence Centre, 650, Route Des Lucioles, F-06921, Sophia-Antipolis Cedex, France, vol. RAN WG1, No. Prague, Czech; Oct. 9, 2017-Oct. 13, 2017 Nov. 18, 2017, (Nov. 18, 2017, XP051369968, pp. 1-3, Retrieved from the Internet: URL:http://www.3gpp.org/ftp/tsg%5Fran/WG1%5FRL1/TSGR1%5F91/Docs/ [retrieved on Nov. 18, 2017].

Samsung: "Enhancements on Configured Grant for NR-U," 3GPP Draft, 3GPP TSG RAN WG1 Meeting #95, R1-1812980, Enhancements on Configured Grant for NR-U, 3rd Generation Partnership Project (3GPP), Mobile Competence Centre, 650, Route Des Lucioles, F-06921, Sophia-Antipolis Cedex, France, vol. RAN WG1 No. Spokane, USA; Nov. 12, 2018-Nov. 16, 2018, Nov. 11, 2018 (Nov. 11, 2018), XP051554959, 4 pages, Retrieved from the Internet: URL: http://www.3gpp.org/ftp/Meetings%5F3GPP%5FSYNC/RAN1/Docs/R1%2D1812980%2Ezip [retrieved on Nov. 11, 2018], pp. 1, 3, 4.

* cited by examiner

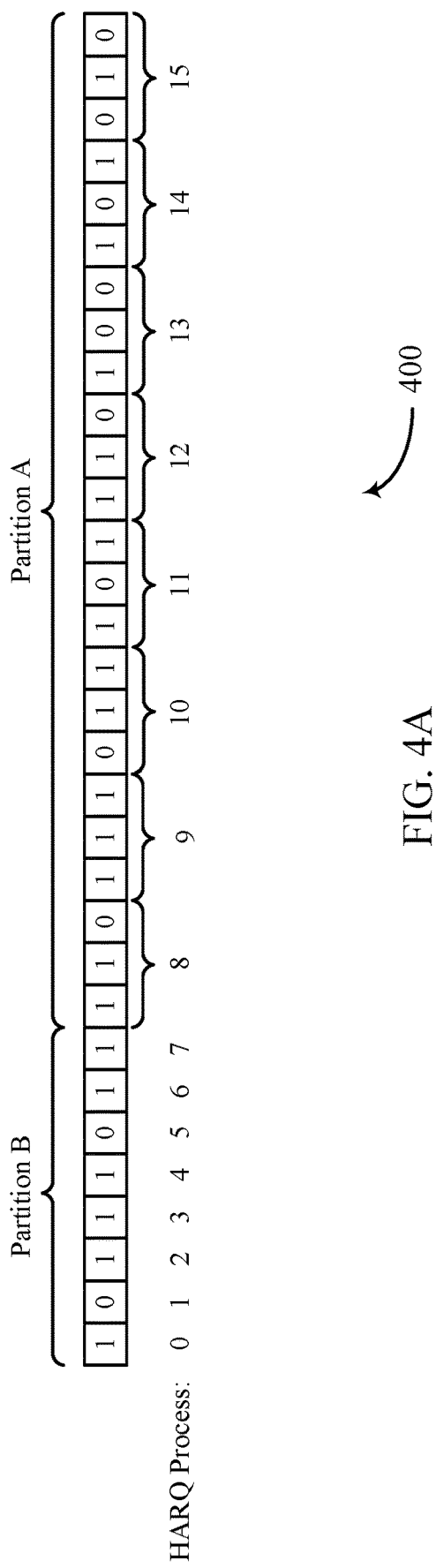
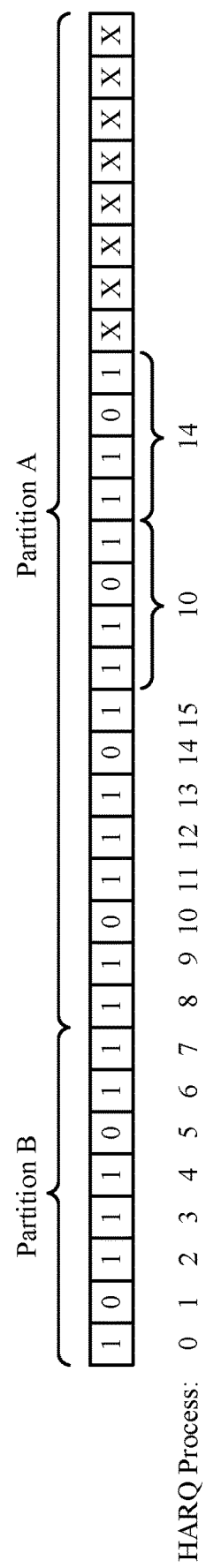
FIG. 4A
FIG. 4B

PARTITIONING OF DOWNLINK FEEDBACK INDICATION BITS

CROSS REFERENCE

The present Application for Patent claims the benefit of India Provisional Patent Application No. 201941005675 by ZHANG et al., entitled "PARTITIONING OF DOWNLINK FEEDBACK INDICATION BITS," filed Feb. 13, 2019, assigned to the assignee hereof, which is expressly incorporated by reference herein.

BACKGROUND

The following relates generally to wireless communications in shared spectrum, and more specifically to partitioning of downlink feedback indication (DFI) bits.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may transmit information to a base station over one or more uplink (UL) channels, and may receive information from the base station over one or more downlink (DL) channels. In some examples, the UE may transmit in response to an uplink transmission grant sent from the base station that identifies resources the UE may use for transmission (e.g., which may be referred to as a scheduled uplink (SUL) transmission). In other examples, the UE may also transmit in an autonomous mode (e.g., without receiving an uplink transmission grant identifying specific resources that are reserved for use by the UE), which may be referred to as an autonomous uplink (AUL) transmission. In some cases, improved base station feedback schemes associated with SUL and AUL transmissions from a UE may be desired.

SUMMARY

A method of wireless communication by a user equipment (UE) is described. The method may include receiving a message that indicates a downlink feedback indication bit sequence is partitioned into a first bit partition and a second bit partition, a number of bits in the first bit partition being based on a number of autonomous uplink hybrid automatic repeat request processes of the UE. The method may further include transmitting, in a shared radio frequency spectrum band, an autonomous uplink transmission corresponding to at least one autonomous uplink hybrid automatic repeat request process of the number of autonomous uplink hybrid automatic repeat request processes. The method may further include receiving a feedback transmission including the downlink feedback indication bit sequence based on the autonomous uplink transmission, and decoding feedback for the autonomous uplink transmission within the first bit partition of the downlink feedback indication bit sequence.

An apparatus for wireless communication by a UE is described. The apparatus may include a processor, memory in electronic communication with the processor, and instructions stored in the memory. The instructions may be executable by the processor to cause the apparatus to receive a message that indicates a downlink feedback indication bit sequence is partitioned into a first bit partition and a second bit partition, a number of bits in the first bit partition being based on a number of autonomous uplink hybrid automatic repeat request processes of the UE. The instructions may be executable by the processor to further cause the apparatus to transmit, in a shared radio frequency spectrum band, an autonomous uplink transmission corresponding to at least one autonomous uplink hybrid automatic repeat request process of the number of autonomous uplink hybrid automatic repeat request processes, receive a feedback transmission including the downlink feedback indication bit sequence based on the autonomous uplink transmission, and decode feedback for the autonomous uplink transmission within the first bit partition of the downlink feedback indication bit sequence.

Another apparatus for wireless communication by a UE is described. The apparatus may include means for receiving a message that indicates a downlink feedback indication bit sequence is partitioned into a first bit partition and a second bit partition, a number of bits in the first bit partition being based on a number of autonomous uplink hybrid automatic repeat request processes of the UE, transmitting, in a shared radio frequency spectrum band, an autonomous uplink transmission corresponding to at least one autonomous uplink hybrid automatic repeat request process of the number of autonomous uplink hybrid automatic repeat request processes, receiving a feedback transmission including the downlink feedback indication bit sequence based on the autonomous uplink transmission, and decoding feedback for the autonomous uplink transmission within the first bit partition of the downlink feedback indication bit sequence.

A non-transitory computer-readable medium storing code for wireless communication by a UE is described. The code may include instructions executable by a processor to receive a message that indicates a downlink feedback indication bit sequence is partitioned into a first bit partition and a second bit partition, a number of bits in the first bit partition being based on a number of autonomous uplink hybrid automatic repeat request processes of the UE, transmit, in a shared radio frequency spectrum band, an autonomous uplink transmission corresponding to at least one autonomous uplink hybrid automatic repeat request process of the number of autonomous uplink hybrid automatic repeat request processes, receive a feedback transmission including the downlink feedback indication bit sequence based on the autonomous uplink transmission, and decode feedback for the autonomous uplink transmission within the first bit partition of the downlink feedback indication bit sequence.

Some examples of the method, apparatuses, and non-transitory computer-readable medium described herein may further include operations, features, means, or instructions for decoding feedback for each scheduled uplink hybrid automatic repeat request process of the UE within the second bit partition of the downlink feedback indication bit sequence. Some examples of the method, apparatuses, and non-transitory computer-readable medium described herein may further include operations, features, means, or instructions for decoding a contention window update command within the second bit partition of the downlink feedback indication bit sequence. In some examples of the method, apparatuses, and non-transitory computer-readable medium described herein, the contention window update command indicates to reset a contention window to a defined duration or to modify a duration of the contention window.

Some examples of the method, apparatuses, and non-transitory computer-readable medium described herein may further include operations, features, means, or instructions for performing, in the shared radio frequency spectrum band, a clear channel assessment procedure within a contention window based on the contention window update command. Some examples of the method, apparatuses, and non-transitory computer-readable medium described herein may further include operations, features, means, or instructions for retransmitting the autonomous uplink transmission or transmitting a second autonomous uplink transmission in the shared radio frequency spectrum band based on a result of the channel assessment procedure and the feedback for the autonomous uplink transmission.

In some examples of the method, apparatuses, and non-transitory computer-readable medium described herein, the partitioning of the downlink feedback indication bit sequence into the first bit partition and the second bit partition may be based on the second bit partition including a contention window update command based on at least a subset of code block groups within a first uplink hybrid automatic repeat request process of the UE passing error detection, a signal to interference plus noise ratio measurement of a transmission time interval that includes the transport block for the first uplink hybrid automatic repeat request process satisfying a threshold, a collision not being detected within the transmission time interval that includes the first uplink hybrid automatic repeat request process, or any combination thereof.

In some examples of the method, apparatuses, and non-transitory computer-readable medium described herein, the second bit partition includes a single bit for the contention window update command that indicates a same update to a respective contention window within each sub-band of a set of sub-bands in the shared radio frequency spectrum band. In some examples of the method, apparatuses, and non-transitory computer-readable medium described herein, the second bit partition includes a set of bits for the contention window update command, each bit of the set of bits indicating an update to a contention window within a respective sub-band of a set of sub-bands in the shared radio frequency spectrum band. In some examples of the method, apparatuses, and non-transitory computer-readable medium described herein, the second bit partition includes a set of bits for the contention window update command, each bit of the set of bits indicating an update to a contention window within a respective sub-band group of a set of sub-band groups in the shared radio frequency spectrum band.

Some examples of the method, apparatuses, and non-transitory computer-readable medium described herein may further include operations, features, means, or instructions for transmitting a first uplink transmission, and updating a duration of a contention window in accordance with the contention window update command based on a duration between the first uplink transmission and receipt of the downlink feedback indication bit sequence for the first uplink transmission satisfying a threshold. In some examples of the method, apparatuses, and non-transitory computer-readable medium described herein, the threshold may be semi-statically obtained from radio resource control programming or explicitly obtained from the second bit partition of the downlink feedback indication bit sequence.

In some examples of the method, apparatuses, and non-transitory computer-readable medium described herein, the partitioning of the downlink feedback indication bit sequence into the first bit partition and the second bit partition may be based on a number of scheduled uplink hybrid automatic repeat request processes of the UE. In some examples of the method, apparatuses, and non-transitory computer-readable medium described herein, the partitioning of the downlink feedback indication bit sequence into the first bit partition and the second bit partition may be based on a number of operating sub-bands in the shared radio frequency spectrum band. In some examples of the method, apparatuses, and non-transitory computer-readable medium described herein, the partitioning of the downlink feedback indication bit sequence into the first bit partition and the second bit partition may be based on the second bit partition including a single bit for each scheduled uplink hybrid automatic repeat request process of the UE.

In some examples of the method, apparatuses, and non-transitory computer-readable medium described herein, the partitioning of the downlink feedback indication bit sequence into the first bit partition and the second bit partition may be based on the second bit partition including a contention window update command. In some examples of the method, apparatuses, and non-transitory computer-readable medium described herein, the partitioning of the downlink feedback indication bit sequence into the first bit partition and the second bit partition may be based on whether a grant for retransmitting the autonomous uplink transmission may be within scheduled uplink resource.

In some examples of the method, apparatuses, and non-transitory computer-readable medium described herein, the partitioning of the downlink feedback indication bit sequence into the first bit partition and the second bit partition may be based on the first bit partition including a set of bits for each autonomous uplink hybrid automatic repeat request process of the UE and the second bit partition including a single bit for each scheduled uplink hybrid automatic repeat request process of the UE.

In some examples of the method, apparatuses, and non-transitory computer-readable medium described herein, the partitioning of the downlink feedback indication bit sequence into the first bit partition and the second bit partition may be based on the first bit partition including a single bit for transport block level feedback for a first subset of autonomous uplink hybrid automatic repeat request processes of the UE and a set of bits for code block group level feedback or code block level feedback for a second subset of autonomous uplink hybrid automatic repeat request processes of the UE. In some examples of the method, apparatuses, and non-transitory computer-readable medium described herein, the partitioning of the downlink feedback indication bit sequence into the first bit partition and the second bit partition may be based on the first bit partition including a set of bits for each autonomous uplink hybrid automatic repeat request process of the UE and the second bit partition including a single bit or two bits for a contention window update command.

In some examples of the method, apparatuses, and non-transitory computer-readable medium described herein, the partitioning of the downlink feedback indication bit sequence into the first bit partition and the second bit partition may be based on the second bit partition including a single bit for feedback for each scheduled uplink hybrid automatic repeat request process of the UE. In some examples of the method, apparatuses, and non-transitory computer-readable medium described herein, a first feedback for a first scheduled uplink hybrid automatic repeat request process of the UE includes one of an acknowledgement or a negative acknowledgment based on whether at least a subset of code block groups within the first scheduled uplink hybrid automatic repeat request process passes error detection.

In some examples of the method, apparatuses, and non-transitory computer-readable medium described herein, a first feedback for a first scheduled uplink hybrid automatic repeat request process of the UE includes one of an acknowledgement or a negative acknowledgment based on whether a signal to interference plus noise ratio measurement of a transmission time interval that includes a transport block for the first scheduled uplink hybrid automatic repeat request process satisfies a threshold.

In some examples of the method, apparatuses, and non-transitory computer-readable medium described herein, a first feedback for a first scheduled uplink hybrid automatic repeat request process of the UE includes one of an acknowledgement or a negative acknowledgment based on whether a collision may be detected within a transmission time interval that includes the first scheduled uplink hybrid automatic repeat request process.

Some examples of the method, apparatuses, and non-transitory computer-readable medium described herein may further include operations, features, means, or instructions for receiving a grant for retransmitting the autonomous uplink transmission within a scheduled uplink resource, retransmitting the autonomous uplink transmission within the scheduled uplink resource, receiving a second feedback transmission including a second downlink feedback indication bit sequence based on the retransmitted autonomous uplink transmission, and decoding feedback for the retransmitted autonomous uplink transmission within the first bit partition of the second downlink feedback indication bit sequence.

A method of wireless communication by a base station is described. The method may include transmitting a message that indicates a downlink feedback indication bit sequence is partitioned into a first bit partition and a second bit partition, a number of bits in the first bit partition being based on a number of autonomous uplink hybrid automatic repeat request processes of a UE, monitoring, in a shared radio frequency spectrum band, for an autonomous uplink transmission corresponding to at least one autonomous uplink hybrid automatic repeat request process of the number of autonomous uplink hybrid automatic repeat request processes, and transmitting a feedback transmission including the downlink feedback indication bit sequence based on monitoring for the autonomous uplink transmission.

An apparatus for wireless communication by a base station is described. The apparatus may include a processor, memory in electronic communication with the processor, and instructions stored in the memory. The instructions may be executable by the processor to cause the apparatus to transmit a message that indicates a downlink feedback indication bit sequence is partitioned into a first bit partition and a second bit partition, a number of bits in the first bit partition being based on a number of autonomous uplink hybrid automatic repeat request processes of a UE, monitor, in a shared radio frequency spectrum band, for an autonomous uplink transmission corresponding to at least one autonomous uplink hybrid automatic repeat request process of the number of autonomous uplink hybrid automatic repeat request processes, and transmit a feedback transmission including the downlink feedback indication bit sequence based on monitoring for the autonomous uplink transmission.

Another apparatus for wireless communication by a base station is described. The apparatus may include means for transmitting a message that indicates a downlink feedback indication bit sequence is partitioned into a first bit partition and a second bit partition, a number of bits in the first bit partition being based on a number of autonomous uplink hybrid automatic repeat request processes of a UE, monitoring, in a shared radio frequency spectrum band, for an autonomous uplink transmission corresponding to at least one autonomous uplink hybrid automatic repeat request process of the number of autonomous uplink hybrid automatic repeat request processes, and transmitting a feedback transmission including the downlink feedback indication bit sequence based on monitoring for the autonomous uplink transmission.

A non-transitory computer-readable medium storing code for wireless communication by a base station is described. The code may include instructions executable by a processor to transmit a message that indicates a downlink feedback indication bit sequence is partitioned into a first bit partition and a second bit partition, a number of bits in the first bit partition being based on a number of autonomous uplink hybrid automatic repeat request processes of a UE, monitor, in a shared radio frequency spectrum band, for an autonomous uplink transmission corresponding to at least one autonomous uplink hybrid automatic repeat request process of the number of autonomous uplink hybrid automatic repeat request processes, and transmit a feedback transmission including the downlink feedback indication bit sequence based on monitoring for the autonomous uplink transmission.

Some examples of the method, apparatuses, and non-transitory computer-readable medium described herein may further include operations, features, means, or instructions for generating feedback for each autonomous uplink hybrid automatic repeat request process of the UE within the first bit partition of the downlink feedback indication bit sequence. Some examples of the method, apparatuses, and non-transitory computer-readable medium described herein may further include operations, features, means, or instructions for monitoring for a retransmission of the autonomous uplink transmission or a second autonomous uplink transmission in the shared radio frequency spectrum band based on the feedback included in the first partition of the downlink feedback indication bit sequence.

Some examples of the method, apparatuses, and non-transitory computer-readable medium described herein may further include operations, features, means, or instructions for generating feedback for each scheduled uplink hybrid automatic repeat request process of the UE within the second bit partition of the downlink feedback indication bit sequence. Some examples of the method, apparatuses, and non-transitory computer-readable medium described herein may further include operations, features, means, or instructions for generating a contention window update command within the second bit partition of the downlink feedback indication bit sequence. In some examples of the method, apparatuses, and non-transitory computer-readable medium described herein, the contention window update command indicates to reset a contention window to a defined duration or to modify a duration of the contention window.

Some examples of the method, apparatuses, and non-transitory computer-readable medium described herein may further include operations, features, means, or instructions for partitioning the downlink feedback indication bit sequence into the first bit partition and the second bit partition based on the second bit partition including a contention window update command based on at least a subset of code block groups within a first uplink hybrid automatic repeat request process of the UE passing error detection, a signal to interference plus noise ratio measurement of a transmission time interval that includes the transport block for the first scheduled uplink hybrid automatic repeat request process satisfying a threshold, a collision not being detected within the transmission time interval that includes the first uplink hybrid automatic repeat request process, or any combination thereof.

In some examples of the method, apparatuses, and non-transitory computer-readable medium described herein, the second bit partition includes a single bit for the contention window update command that indicates a same update to a respective contention window within each sub-band of a set of sub-bands in the shared radio frequency spectrum band. In some examples of the method, apparatuses, and non-transitory computer-readable medium described herein, the second bit partition includes a set of bits for the contention window update command, each bit of the set of bits indicating an update to a contention window within a respective sub-band of a set of sub-bands in the shared radio frequency spectrum band. In some examples of the method, apparatuses, and non-transitory computer-readable medium described herein, the second bit partition includes a set of bits for the contention window update command, each bit of the set of bits indicating an update to a contention window within a respective sub-band group of a set of sub-band groups in the shared radio frequency spectrum band.

Some examples of the method, apparatuses, and non-transitory computer-readable medium described herein may further include operations, features, means, or instructions for partitioning the downlink feedback indication bit sequence into the first bit partition and the second bit partition based on a number of scheduled uplink hybrid automatic repeat request processes of the UE. Some examples of the method, apparatuses, and non-transitory computer-readable medium described herein may further include operations, features, means, or instructions for partitioning the downlink feedback indication bit sequence into the first bit partition and the second bit partition based on a number of operating sub-bands in the shared radio frequency spectrum band.

Some examples of the method, apparatuses, and non-transitory computer-readable medium described herein may further include operations, features, means, or instructions for partitioning the downlink feedback indication bit sequence into the first bit partition and the second bit partition based on the second bit partition including a single bit for each scheduled uplink hybrid automatic repeat request process of the UE. Some examples of the method, apparatuses, and non-transitory computer-readable medium described herein may further include operations, features, means, or instructions for partitioning the downlink feedback indication bit sequence into the first bit partition and the second bit partition based on the second bit partition including a contention window update command.

Some examples of the method, apparatuses, and non-transitory computer-readable medium described herein may further include operations, features, means, or instructions for partitioning of the downlink feedback indication bit sequence into the first bit partition and the second bit partition based on whether a grant for retransmitting the autonomous uplink transmission may be within scheduled uplink resource. Some examples of the method, apparatuses, and non-transitory computer-readable medium described herein may further include operations, features, means, or instructions for partitioning the downlink feedback indication bit sequence into the first bit partition and the second bit partition based on the first bit partition including a set of bits for each autonomous uplink hybrid automatic repeat request process of the UE and the second bit partition including a single bit for each scheduled uplink hybrid automatic repeat request process of the UE.

Some examples of the method, apparatuses, and non-transitory computer-readable medium described herein may further include operations, features, means, or instructions for partitioning the downlink feedback indication bit sequence into the first bit partition and the second bit partition based on the first bit partition including a single bit for transport block level feedback for a first subset of autonomous uplink hybrid automatic repeat request processes of the UE and a set of bits for code block group level feedback or code block level feedback for a second subset of autonomous uplink hybrid automatic repeat request processes of the UE. Some examples of the method, apparatuses, and non-transitory computer-readable medium described herein may further include operations, features, means, or instructions for partitioning the downlink feedback indication bit sequence into the first bit partition and the second bit partition based on the first bit partition including a set of bits for each autonomous uplink hybrid automatic repeat request process of the UE and the second bit partition including a single bit or two bits for a contention window update command.

Some examples of the method, apparatuses, and non-transitory computer-readable medium described herein may further include operations, features, means, or instructions for partitioning the downlink feedback indication bit sequence into the first bit partition and the second bit partition based on the second bit partition including a single bit for feedback for each scheduled uplink hybrid automatic repeat request process of the UE. In some examples of the method, apparatuses, and non-transitory computer-readable medium described herein, a first feedback for a first scheduled uplink hybrid automatic repeat request process of the UE includes one of an acknowledgement or a negative acknowledgment based on whether at least a subset of code block groups within the first scheduled uplink hybrid automatic repeat request process passes error detection.

In some examples of the method, apparatuses, and non-transitory computer-readable medium described herein, a first feedback for a first scheduled uplink hybrid automatic repeat request process of the UE includes one of an acknowledgement or a negative acknowledgment based on whether a signal to interference plus noise ratio measurement of a transmission time interval that includes the first scheduled uplink hybrid automatic repeat request process satisfies a threshold. In some examples of the method, apparatuses, and non-transitory computer-readable medium described herein, a first feedback for a first scheduled uplink hybrid automatic repeat request process of the UE includes one of an acknowledgement or a negative acknowledgment based on whether a collision may be detected within a transmission time interval that includes the first scheduled uplink hybrid automatic repeat request process.

Some examples of the method, apparatuses, and non-transitory computer-readable medium described herein may further include operations, features, means, or instructions for transmitting a grant for retransmitting the autonomous uplink transmission within a scheduled uplink resource, monitoring for a retransmission of the autonomous uplink transmission within the scheduled uplink resource, and transmitting a second feedback transmission including a second downlink feedback indication bit sequence based on monitoring for the retransmission of the autonomous uplink transmission.

Some examples of the method, apparatuses, and non-transitory computer-readable medium described herein may further include operations, features, means, or instructions for transmitting a threshold for a duration between the autonomous uplink transmission and the feedback transmission including the downlink feedback indication bit sequence via radio resource control signaling, where valid information in the downlink feedback indication bit sequence may be based on the threshold for the duration.

In some examples of the method, apparatuses, and non-transitory computer-readable medium described herein, the second bit partition of the downlink feedback indication bit sequence includes a threshold for a duration between the autonomous uplink transmission and the feedback transmission including the downlink feedback indication bit sequence, where valid information in the downlink feedback indication bit sequence may be based on the threshold for the duration.

BRIEF DESCRIPTION OF THE DRAWINGS

FIGS. 4A and 4B illustrate examples of DFI bit sequences that support partitioning of DFI bits in accordance with aspects of the present disclosure.

DETAILED DESCRIPTION

Figure 1:
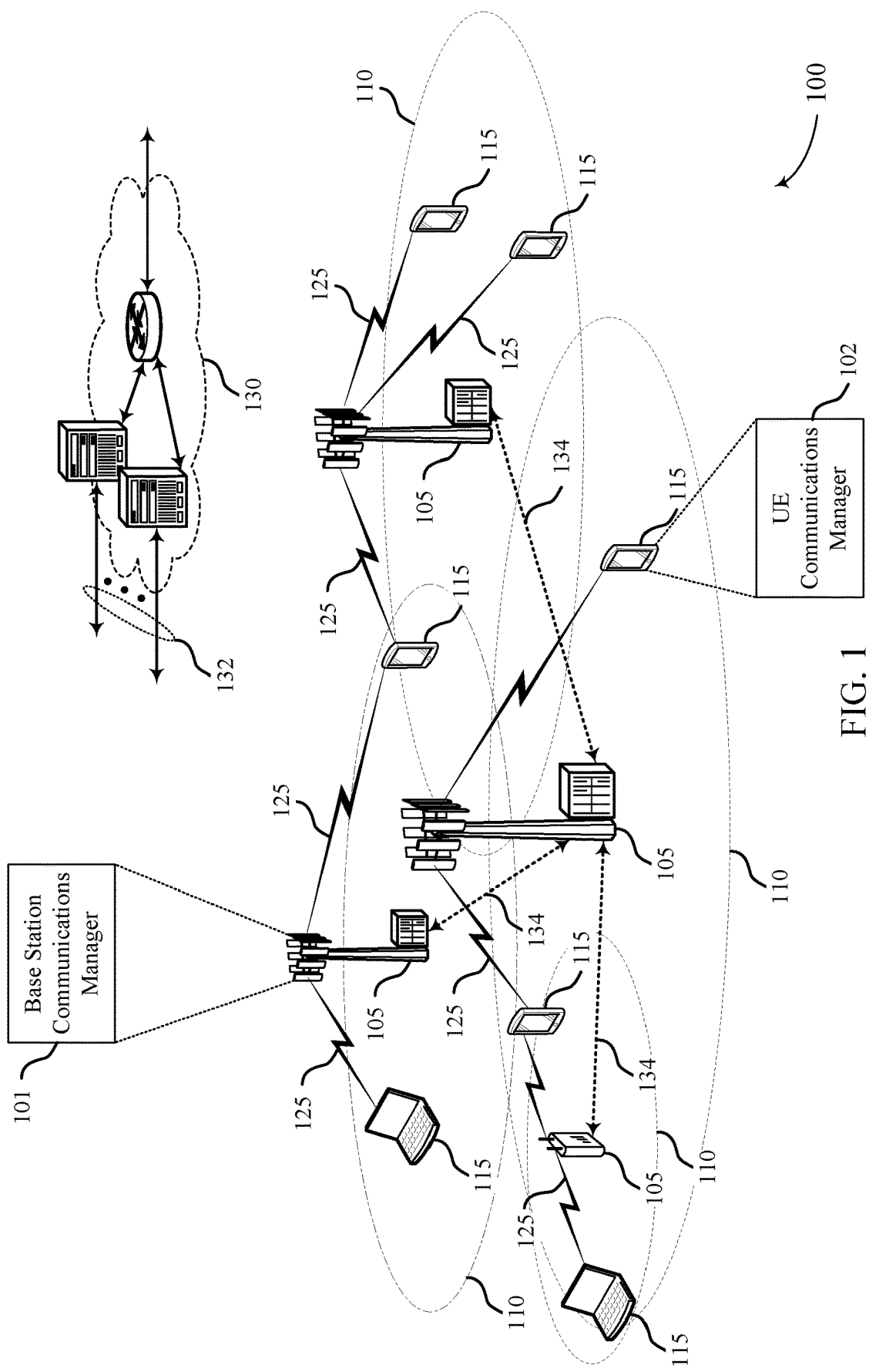
FIG. 1 illustrates an example of a system for wireless communications that supports partitioning of downlink feedback indication (DFI) bits in accordance with aspects of the present disclosure.

The described techniques relate to improved methods, systems, devices, and apparatuses that support partitioning of downlink feedback indication (DFI) bits. A user equipment (UE) may transmit, via autonomous uplink (AUL) communications and scheduled uplink (SUL) communications, one or more transport blocks to a base station. Each transport block may include a plurality of code block groups (CBGs). The base station may provide feedback to the UE via one or more hybrid automatic repeat request (HARQ) processes (e.g., based at least in part on the success or failure of the base station in decoding the AUL communications and SUL communications). In some examples, the base station may provide feedback (e.g., CBG-level feedback) for AUL communications in DFI, and may provide feedback for SUL communications via one or more uplink transmission grants (e.g., in a new data indicator (NDI) of an uplink transmission grant for a next SUL communication). In some cases, the UE may retransmit one or more CBGs included in one or more AUL communications based at least in part on the DFI indicating that the one or more CBGs were not successfully received, and the UE may retransmit one or more CBGs from SUL communications based at least in part on the NDI.

According to aspects of the described techniques, DFI may be partitioned to include a first partition comprising AUL HARQ feedback information and a second partition comprising contention window (CW) update information (e.g., indicating a duration of a CW for a subsequent AUL clear channel assessment). In some cases, the number of bits in the first partition may be based on a number of AUL HARQ processes of the UE and an AUL HARQ process granularity (e.g., a number of feedback bits for each HARQ process). Further, in some examples, the number of bits used in the first partition may be based on a number of failed AUL HARQ processes (e.g., such that a finer HARQ granularity, or more feedback bits, may be provided for failed AUL HARQ process).

According to some examples, the second DFI partition may include SUL HARQ feedback information to implicitly indicate CW update information. For example, in cases where a reference duration (e.g., a reference slot) for CW regulation corresponds to a SUL HARQ process, a DFI bit corresponding to the SUL HARQ process may be used by base station to indicate whether a CW duration is to be reset, doubled, etc. In cases where the second partition of DFI bits comprises SUL HARQ feedback information, the number of bits in the second partition may be based on a number of SUL HARQ processes of the UE. In some examples (e.g., for some DFI bit sequence length), the second partition may be compressed to include a single bit for each SUL HARQ process (e.g., such that the first partition may include a larger portion of the DFI bit sequence length to provide finer AUL HARQ granularity). That is, DFI may be partitioned such that AUL HARQ feedback may be provided with finer granularity, such as CBG-level granularity, than SUL HARQ feedback (e.g., as SUL HARQ feedback indicated by the second partition may be compressed such that more DFI bits are available for AUL HARQ feedback indicated by the first partition).

In other examples, the second DFI partition may include explicit CW commands (e.g., and may not necessarily include SUL HARQ feedback information). That is, in some cases, DFI may be partitioned into a first partition comprising AUL HARQ feedback information and a second partition comprising one or more CW commands (e.g., CW update information), and NDI may be used for SUL HARQ feedback. In such cases, the number of bits in the second partition may be based on a number of CW commands for the UE and a CW command granularity (e.g., a number of bits for each CW command). For example, a CW may be configured for each operating sub-band employed for communications between the base station and the UE (e.g., such that DFI may indicate a CW command for each operating sub-band). In other cases, a CW may be configured for all operating sub-bands, or for a group of operating sub-bands (e.g., such that DFI may indicate a CW command to be applied across all or some operating sub-bands).

A network (e.g., a base station) may configure DFI bit sequences with such DFI partitioning for DFI transmissions to a UE. For example, a DFI bit sequence configuration may include some total DFI bit sequence length and a DFI partition. In some cases, a base station may semi-statically configure DFI bit sequence partitioning (e.g., a base station may indicate specific DFI bit sequence configurations) via radio resource control (RRC) signaling. A UE may thus receive DFI bits (e.g., included in a physical downlink control channel (PDCCH)) and decode information based at least in part on the DFI bit sequence configuration.

Wireless communications systems may use licensed frequency bands or shared frequency bands (e.g., frequency bands that include unlicensed frequency spectrum, a combination of licensed and unlicensed frequency spectrum, or a combination of differently licensed frequency spectrum). In wireless communications systems using licensed frequency bands, a base station may grant transmission opportunities to a UE, and the UE may transmit based on the grant. The UE in licensed frequency bands may be unable to transmit in the absence of the receipt of a transmission grant. As such, a base station may coordinate SUL transmissions by UEs operating within the licensed frequency bands. In contrast, in wireless communications systems using unlicensed or shared frequency bands, UEs may transmit without receiving explicit permission (e.g., such as uplink grants allocating specific time and frequency resources to use for transmission) from a base station. UE transmission without receiving a transmission grant may be referred to as AUL transmission. In unlicensed or shared frequency bands, AUL transmission may allow the UE to transmit whenever it can access the uplink channel, without depending on the base station to first access the downlink channel to provide the uplink grant.

For example, in unlicensed or shared frequency bands, wireless devices (e.g., such as a base station and a UE) may perform medium contention procedures, such as a clear channel assessment, a listen-before-talk (LBT) procedure, etc., prior to communicating over the communications medium. As such, for AUL transmissions in unlicensed or shared frequency bands, a base station may perform an LBT procedure before transmission of an uplink grant, and the corresponding UE then may perform an LBT procedure before uplink transmission using the uplink grant.

Wireless communications systems may employ SUL transmissions as well as AUL transmissions, as AUL transmissions may, in some cases, improve efficiency of the system (e.g., as AUL transmissions may reduce the number of occasions a base station transmits uplink grants for a UE, as well as the number of times the base station needs to successfully access the medium, via clear channel assessments, to transmit the uplink grants). That is, such wireless communications systems (e.g., via a base station) may preconfigure (e.g., or grant) time and frequency resources, such as some indicated set of slots, some periodic set of resources, etc., that a UE may use for AUL transmissions. When a UE has data to transmit, the UE may perform an LBT procedure during these preconfigured or granted AUL resources and transmit autonomously when the medium is free (e.g., instead of waiting for an uplink grant from a base station after the base station is able to access the medium and transmit the grant).

As such, in some examples, a UE may transmit a message including one or more transport blocks to a base station via an AUL transmission. Each transport block may include a plurality of CBGs. In some examples, the base station may not properly receive the entirety of each transport block. For example, the base station may not properly receive one or more CBGs in a transport block. The base station may provide feedback information indicating that the transport block was not properly received. The UE may then retransmit the transport block in a subsequent uplink communication.

However, retransmission of transport blocks in accordance with such a scheme may be inefficient. For example, the base station may properly receive all but one CBG in a transport block. The CBG may be only a portion of the transport block, but the UE may retransmit the entire transport block. Thus, the UE may retransmit a large amount of information that may have already been properly received by the base station, thereby consuming unnecessary overhead and potentially delaying the UE from transmitting new information that the base station has not yet received (e.g., which may decrease system throughput).

For example, a base station may configure a number of feedback processes (e.g., HARQ processes) for AUL transmissions. The base station may use DFI bits (e.g., in a PDCCH) to indicate feedback (e.g., acknowledgment (ACK) or negative acknowledgement (NACK)) for each HARQ process. For example, each configured HARQ process may be used to indicate the successful reception or failed reception of a transport block transmitted by the UE. In addition to DFI, a base station may use a NDI to indicate feedback associated with SUL transmission. A UE may thus receive DFI from the base station, and retransmit a transport block of an AUL transmission (e.g., in case of a corresponding NACK indicated by DFI) or transmit a new or next transport block (e.g., in case of a corresponding ACK indicated by DFI). Further, the UE may receive NDI from the base station, and retransmit a SUL transmission (e.g., in case of a no-toggle NDI) or transmit a new or next transport block (e.g., in case of a toggle NDI).

In addition to potential deficiencies of transport block based (e.g., transport block-level) HARQ processes discussed above, such DFI schemes may be further inefficient, as in cases where the DFI indicates feedback for both AUL transmissions and SUL transmissions, DFI may include redundant information (e.g., for SUL feedback) that is also indicated by NDI. In cases where SUL feedback is not included in DFI, the DFI (e.g., the DFI bit sequence length) may still include bits that correspond to SUL transport blocks, which may be either default values or otherwise unused. As discussed herein, in some cases, a base station and UE may instead use DFI bits that otherwise correspond to SUL transport blocks for CW updates (e.g., for resetting, doubling, or otherwise modifying the duration of a CW the UE may use to perform a clear channel assessment or LBT procedure prior to a next transmission).

According to some aspects of the described techniques, in order to improve the efficiency of the system, a base station may provide CBG-level feedback information, and the UE may retransmit only the CBGs that the base station did not properly receive. The CBG-level feedback may be, for example, a bitmap indicating an acknowledgement status for the corresponding CBG (e.g., an ACK or NACK for each CBG in a transport block). In some examples, the DFI may include transport block-level feedback as well as CBG-level feedback only for transport blocks indicated to have been negatively acknowledged. The UE may thus retransmit any indicated CBGs (e.g., that were not properly received by the base station) in one or more subsequent autonomous uplink communications.

The described techniques may further provide for more efficient DFI resource utilization (e.g., which may include reduced DFI overhead, compression of DFI resources to indicate AUL HARQ feedback with higher granularity, etc.). For example, a network may preconfigure, or a base station may semi-statically indicate via RRC signaling, DFI bit sequence partitioning. A DFI bit sequence may be partitioned in to a first partition including DFI bits for AUL HARQ processes and a second partition for SUL HARQ process, CW update information, or other information. In some examples, the first partition for AUL HARQ processes may include more DFI bits than the second partition, such that a base station may provide more granular (e.g., CBG-level) feedback for AUL transmissions, without necessarily increasing the DFI overhead or the DFI bits used for SUL feedback. For example, DFI may be partitioned into AUL feedback (e.g., which may include four bits per transport block, providing CBG-level feedback for AUL) and SUL feedback (e.g., which may include one bit per transport block).

In some cases, DFI (e.g., a DFI bit sequence) may be partitioned based on a number of feedback processes for AUL transmissions, number of feedback processes for SUL transmissions, or both. Additionally or alternatively, in cases where the second partition is used for CW updates, DFI may be partitioned based on a number of operating sub-bands (e.g., used for communications between the base station and the UE), such that the number of DFI bits in the second partition may indicate sub-band-level (or sub-band group-level) CW updates. In some cases, DFI partitioning may additionally or alternatively be based on whether AUL HARQ process retransmission is granted using SUL transmission (e.g., in such cases DFI bits corresponding to feedback for the SUL, that includes the AUL retransmission, may be included in the first partition for AUL feedback).

These aspects, as well as other aspects, of the disclosure are initially described in the context of a wireless communications system. Aspects of the disclosure are further illustrated by and described with reference to apparatus diagrams, system diagrams, and flowcharts that relate to partitioning of DFI bits.

FIG. 1 illustrates an example of a wireless communications system 100 that supports partitioning of DFI bits in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and shared radio frequency spectrum bands. Shared radio frequency spectrum may include licensed radio frequency spectrum, unlicensed radio frequency spectrum, or a combination of licensed and unlicensed radio frequency spectrum. For example, wireless communications system 100 may employ License Assisted Access (LAA), LTE-Unlicensed (LTE-U) radio access technology, or NR technology in an unlicensed band such as the 5 GHz ISM band. When operating in shared or unlicensed radio frequency spectrum bands, wireless devices such as base stations 105 and UEs 115 may employ a clear channel assessment, such as LBT procedures, to ensure a frequency channel is clear before transmitting data. In some cases, operations in shared or unlicensed bands may be based on a CA configuration in conjunction with CCs operating in a licensed band (e.g., LAA). Operations in shared or unlicensed spectrum may include downlink transmissions, uplink transmissions, peer-to-peer transmissions, or a combination of these. Duplexing in shared or unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115).

In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval. In some cases, a base station may configure a number of HARQ processes, each corresponding to a slots or transport block, and may indicate HARQ feedback in the form of a bitmap in DFI.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may transmit, via AUL communications and SUL communications, one or more transport blocks to a base station 105. Each transport block may include a plurality of CBGs. The base station 105 may provide feedback to the UE 115 via one or more HARQ processes (e.g., based at least in part on the success or failure of AUL communications and SUL communications). In some examples, the base station 105 may provide feedback (e.g., CBG-level feedback) for AUL communications in DFI, and may provide feedback for SUL communications via one or more uplink transmission grants (e.g., in a new data indicator (NDI) of an uplink transmission grant for a next SUL communication). In some cases, the UE 115 may retransmit one or more CBGs from AUL communications based at least in part on the DFI, and may retransmit one or more CBGs from SUL communications based at least in part on the NDI.

In some examples, DFI may be partitioned to include a first partition comprising AUL HARQ feedback information and a second partition comprising CW update information (e.g., for a subsequent AUL clear channel assessment). In some cases, the number of bits in the first partition may be based on a number of AUL HARQ processes of the UE 115 and an AUL HARQ process granularity (e.g., a number of feedback bits for each HARQ process). Further, in some examples, the number of bits in the first partition may be based on a number of failed AUL HARQ processes (e.g., such that a finer HARQ granularity, or more feedback bits, may be provided for failed AUL HARQ process).

According to some examples, the second DFI partition may include SUL HARQ feedback information to implicitly indicate CW update information. For example, in cases where a reference duration (e.g., a reference slot) for CW regulation corresponds to a SUL HARQ process, a DFI bit corresponding to the SUL HARQ process may be used by base station 105 to indicate whether a CW duration is to be reset, doubled, etc. In cases where the second partition of DFI bits comprises SUL HARQ feedback information, the number of bits in the second partition may be based on a number of SUL HARQ processes of the UE 115. In some examples (e.g., for some DFI bit sequence length), the second partition may be compressed to include a single bit for each SUL HARQ process (e.g., such that the first partition may include a larger portion of the DFI bit sequence length to provide finer AUL HARQ granularity). That is, DFI may be partitioned such that AUL HARQ feedback may be provided with finer granularity, such as CBG-level granularity, than SUL HARQ feedback (e.g., as SUL HARQ feedback indicated by the second partition may be compressed such that more DFI bits are available for AUL HARQ feedback indicated by the first partition).

In other examples, the second DFI partition may include explicit CW commands (e.g., and may not necessarily include SUL HARQ feedback information). That is, DFI may be partitioned into a first partition comprising AUL HARQ feedback information and a second partition comprising one or more CW commands (e.g., CW update information), and NDI may be used for SUL HARQ feedback. In such cases, the number of bits in the second partition may be based on a number of CW commands for the UE and a CW command granularity (e.g., a number of bits for each CW command). For example, a CW may be configured for each operating sub-band employed for communications between the base station and the UE (e.g., such that DFI may indicate a CW command for each operating sub-band). In other cases, a CW may be configured for all operating sub-bands, or for a group of operating sub-bands (e.g., such that DFI may indicate a CW command to be applied across all or some operating sub-bands).

Wireless communications system 100 (e.g., or a base station 105) may configure DFI bit sequences with such DFI partitioning for DFI transmissions to a UE 115. For example, a DFI bit sequence configuration may include some total DFI bit sequence length and a DFI partition. In some cases, a base station 105 may semi-statically configure DFI bit sequence partitioning (e.g., may indicate specific DFI bit sequence configurations) via RRC signaling to a UE 115. For example, a base station 105 may use RRC signaling (e.g., one or more RRC parameters) to indicate a DFI bit sequence configuration (e.g., a DFI bit sequence length or a number of DFI bits in a DFI sequence, DFI partitioning information, etc.). In some cases, DFI partitioning information may refer to a number of partitions of the DFI bit sequence, a number of bits within each partition, types of information (e.g., CW command information, AUL HARQ process information, etc.) included in each partition, etc. In some cases, DFI bit sequence configurations may be dynamically configured by the wireless communications system 100. For example, a DFI bit sequence configuration may be determined on a frame by frame basis based on a number of configured AUL HARQ processes, a number of configured AUL HARQ processes, a number of configured operating sub-bands, a number of configured CW commands, etc., which may vary throughout different communication scenarios. A UE 115 may thus receive DFI bits (e.g., included in a PDCCH) and decode information based at least in part on the DFI bit sequence configuration.

For example, one or more of the base stations 105 may include a base station communications manager 101, which may transmit a message that indicates a DFI bit sequence is partitioned into a first bit partition and a second bit partition (e.g., where a number of bits in the first bit partition is based at least in part on a number of AUL HARQ processes of a UE 115). The base station communications manager 101 may receive various AUL and SUL communications from a UE 115, and the AUL communication may include one or more transport blocks, and each transport block may include a plurality of CBGs. The base station communications manager 101 may properly receive a first subset of the CBGs, and may not properly receive a second subset of the CBGs.

That is, a base station communications manager 101 may monitor, in a shared radio frequency spectrum band, for an AUL transmission corresponding to at least one AUL HARQ process of the number of configured AUL HARQ processes. Base station communications manager 101 may generate a feedback transmission comprising a DFI bit sequence based at least in part on monitoring for the AUL transmission, and may cause the base station 105 to transmit the DFI to the UE 115.

The base station communications manager 101 may generate feedback information for each of the one or more transport blocks. The base station communications manager 101 may generate CBG-level feedback for CBGs in at least one of the one or more transport blocks. In some examples, the base station communications manager 101 may generate CBG-level feedback for CBGs only in transport blocks for which a negative acknowledgment was indicated in the transport block-level feedback information. In some examples, the feedback information for the one or more transport blocks and/or CBGs may include a bitmap identifying an acknowledgement status for some or all of the one or more transport blocks and/or CBGs. The bitmap may indicate an acknowledgement (positive acknowledgement) for each transport block that was properly received (e.g., for each transport block for which each CBG was properly received) or for each CBG that was properly received, and the bitmap may indicate a negative acknowledgement for each transport block that was not properly received (e.g., for each transport block for which at least one CBG was not properly received) or for each CBG that was not properly received. The base station communications manager 101 may cause the base station 105 to transmit the DFI to the UE 115.

UEs 115 may include a UE communications manager 102, which may cause the UE 115 to transmit an AUL communication to a base station 105. The AUL communication may include one or more transport blocks. The UE communications manager 102 receive DFI from the base station 105, and may prepare, for retransmission, one or more AUL CBGs in response to AUL CBG-level feedback information.

That is, the UE communications manager 102 may receive a message that indicates a DFI bit sequence is partitioned into a first bit partition and a second bit partition (e.g., where a number of bits in the first bit partition may be based at least in part on a number of AUL HARQ processes of the UE 115). UE communications manager 102 may cause the UE 115 to transmit, in a shared radio frequency spectrum band, an AUL transmission corresponding to at least one AUL HARQ process of the number of AUL HARQ processes. UE communications manager 102 may receive a feedback transmission comprising the DFI bit sequence based at least in part on the AUL transmission, and may decode feedback for the AUL transmission within the first bit partition of the DFI bit sequence (e.g., based on the DFI configuration).

Figure 2:
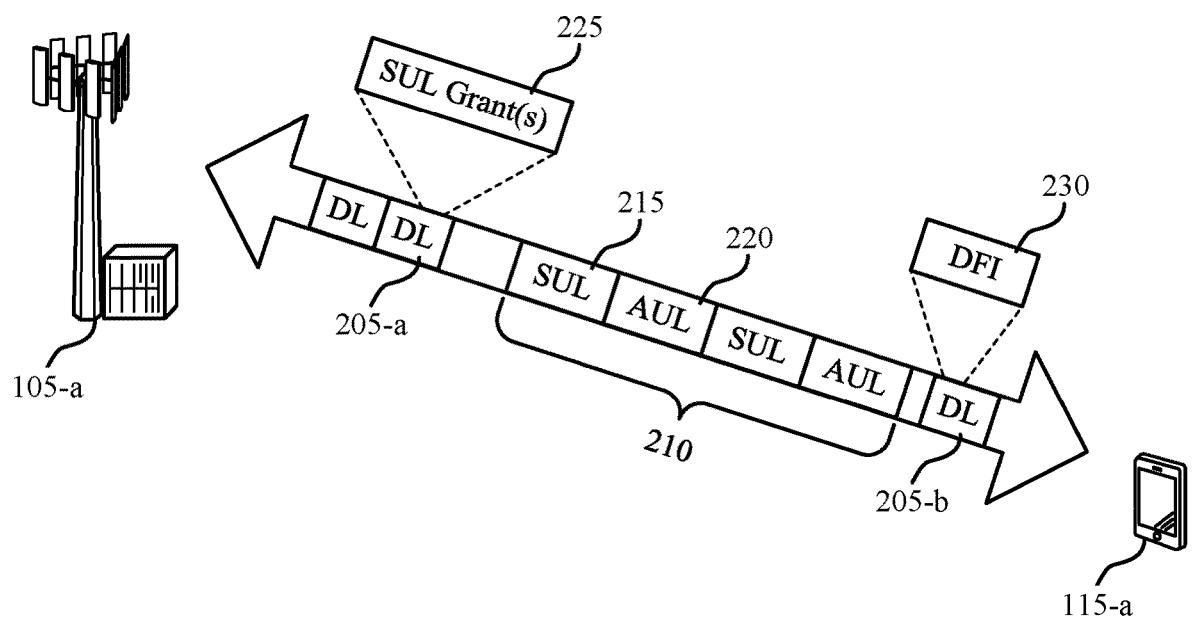
FIG. 2 illustrates an example of a wireless communications system that supports partitioning of DFI bits in accordance with aspects of the present disclosure.

FIG. 2 illustrates an example of a wireless communications system 200 that supports partitioning of DFI bits in accordance with aspects of the present disclosure. In some examples, wireless communications system 200 may implement aspects of wireless communications system 100. For example, the wireless communications system 200 may include a base station 105-a and a UE 115-a. The UE 115-a may be an example of aspects of UE 115 described with reference to FIG. 1, and the base station 105-a may be an example of aspects of base station 105 described with reference to FIG. 1. The UE 115-a may transmit uplink communications 210 to the base station 105-a over an uplink channel, and may receive downlink communications 205 from the base station 105-a over a downlink channel.

The UE 115-a may be configured to transmit SUL transmissions 215 and AUL transmissions 220 (e.g., uplink communications 210 may include SUL transmissions 215 on uplink resources indicated in an uplink grant from base station 105-a and AUL transmissions 220 on uplink resources preconfigured for AUL). For example, the UE 115-a may transmit an AUL transmission 220 without receiving an uplink transmission grant. The UE 115-a may also transmit SUL transmissions 215 using uplink resources indicated in a SUL grant 225. For example, base station 105-a may include a SUL grant 225 in a downlink communications 205-a (e.g., which may refer to downlink control information (DCI)), and UE 115-*a* may transmit an SUL transmission 215 using time and frequency resources indicated by the SUL grant 225.

An AUL transmission 220 may include one or more transport blocks, and each transport block may include a plurality of CBGs (e.g., a transport block may include four CBGs, where each CBG may include one or more code blocks (CB)). For example, a transport block may include a plurality of code blocks, with each code block being separated from the subsequent code block by a CRC. The transport block may be subdivided into a plurality of CBGs, with each CBG including one or more code blocks and one or more CRCs. In some examples, a code block may be split between two CBGs. In some examples, AUL transmissions 220 may be configured with some number of CBGs.

When the UE 115-*a* transmits an AUL transmission 220, the base station 105-*a* may or may not properly receive (e.g., the base station 105-*a* may not successfully decode) every CBG in every transport block in the AUL transmission 220. The base station 105-*a* may transmit DFI 230 (e.g., in downlink communications 205-*b*, which may refer to a PDCCH) to indicate which transport blocks were not properly received and may need to be re-transmitted (e.g., based on which transport blocks include one or more CBGs that were not successfully decoded). For example, DFI 230 may indicate, for each transport block in one or more AUL transmissions 220, whether the transport block was properly received (via an ACK) or not properly received (via a NACK). The UE 115-*a* may then retransmit the transport blocks that were not properly received, for example, in a subsequent AUL transmission 220. In some cases, base station 105-*a* may transmit an uplink grant for the UE 115-*a* to retransmit the information that was not properly received in the form of a subsequent SUL transmission 215.

In some examples, the DFI 230 may include CBG-level feedback for one or more of the transport blocks in the first AUL transmission 220. For example, the DFI 230 may include transport block-level feedback (e.g., a bitmap indicating an acknowledgement status) for each transport block in one or more AUL transmissions 220. The DFI 230 may also include CBG-level feedback (e.g., a bitmap indicating an acknowledgement status) for each CBG in at least one of the transport blocks in the first AUL transmission 220. In some examples, the DFI 230 may include CBG-level feedback for each transport block. In some examples, the DFI 230 may include CBG-level feedback for each transport block for which a negative acknowledgement is indicated (e.g., to provide more granular feedback which may indicate, for a transport block for which a negative acknowledgement is indicated, which CBGs of the transport block were successfully received and which CBGs of the transport block may be retransmitted by the UE 115-*a*).

In some wireless communications systems, a number of HARQ processes may be configured, including HARQ processes for SUL and AUL. For example, in a LAA system, 16 HARQ processes may be configured, and a base station 105 may configure HARQ processes that may be used for AUL from the 16 available HARQ processes, which may also be available for SUL (e.g., AUL may share or use the same SUL HARQ processes). Some wireless communications systems (e.g., such as wireless communications system 200) may use DFI bits for HARQ-ACK feedback for AUL transmissions 220 (e.g., such as 16 or 32 DFI bits, depending on the transmission mode which may affect the number of transport blocks per slot). In some cases, DFI may also include SUL feedback. In some cases, DFI bits corresponding to SUL may not be used for HARQ retransmission (e.g., for HARQ feedback), but may be used for CW updates. For example, as a wireless communications system may employ NDI bits (e.g., in an uplink grant) for SUL HARQ feedback, SUL feedback in DFI may, in some cases, otherwise provide redundant SUL feedback information, and thus DFI bits corresponding to SUL in DFI may instead be used to indicate CW updates.

For example, if AUL is configured for a transmission mode with 1 transport block per slot and SUL is configured for a transmission mode with 2 transport blocks per slot, DFI may include a bit for SUL feedback corresponding to ACKs or NACKs of the two transport blocks for the SUL (e.g., as there may only be 1 bit available in DFI for each SUL). In some wireless communications systems (e.g., in wireless communications system 200), DFI bits may be defined per CBG. As such, wireless communications system 200 may employ various aspects of the techniques described herein to efficiently utilize SUL DFI feedback bits (e.g., as SUL DFI feedback bits, or more generally any DFI bits that do not correspond to AUL, may be used for CW updating and may not be needed for SUL HARQ operations).

That is, feedback schemes for SUL transmissions 215 may use NDI in UE grants. For example, a downlink transmission may schedule or grant a next SUL transmission 215 and may indicate, via NDI, whether the UE uses the uplink resources for a new transmission or for a retransmission (e.g., of a HARQ process). NDI toggle (e.g., an NDI bit toggled to a new value compared to a previous NDI) may indicate an ACK (e.g., that the base station 105-*a* received a previous SUL transmission from the UE 115-*a*, that the UE 115-*a* may transmit new data, etc.). Non-toggle NDI (e.g., an NDI bit repeated or kept constant from a previous NDI) may indicate a NACK (e.g., that the base station 105-*a* failed to receive a previous SUL transmission from the UE 115-*a*, that the UE 115-*a* may retransmit a previous SUL transmission, etc.).

As a DFI sequence may be preconfigured (e.g., as wireless communications system 200 may preconfigure or predefine a DFI sequence length), the number of AUL transmissions 220 that correspond to DFI 230 may, in some cases, vary (e.g., as UE 115-*a* may transmit various combinations of SUL transmissions 215 and AUL transmissions 220 over some number of transport blocks, configured HARQ processes, etc.). In some cases, DFI bits arising from SUL transmissions 215 or DFI bits not corresponding to AUL transmissions 220 may be referred to as SUL DFI bits. In some cases, the more granular feedback DFI provides (e.g., such as CBG-level feedback compared to transport block-feedback), the more DFI bits arising from SUL transmissions 215 or DFI bits not corresponding to AUL transmissions 220 may become available. According to the techniques described herein, as these SUL DFI bits (e.g., generally DFI bits of a DFI bit sequence not corresponding to AUL transmissions 220) may not be used for SUL feedback (e.g., as NDI may provide a mechanism or scheme for SUL feedback), DFI may be partitioned to compress SUL DFI bits and provide increased granularity for AUL feedback.

For example, a DFI bit sequence (e.g., DFI 230) may be partitioned in to a first partition including DFI bits for AUL HARQ processes and a second partition for SUL HARQ process, CW update information, or other information. In some examples, the first partition for AUL HARQ processes may include more DFI bits than the second partition, such that a base station may provide more granular (e.g., CBG-level) feedback for AUL transmissions 220, without necessarily increasing the DFI overhead or the DFI bits used for SUL feedback. For example, DFI 230 may be partitioned into AUL feedback (e.g., which may include four bits per transport block, providing CBG-level feedback for AUL) and SUL feedback (e.g., which may include one bit per transport block). In some cases, DFI 230 (e.g., a DFI bit sequence) may thus be partitioned based on a number of feedback processes for AUL transmissions, number of feedback processes for SUL transmissions, or both.

Additionally or alternatively, in cases where the second partition is used for CW updates (e.g., and does not indicate SUL feedback), the second partition may be based on how may DFI bits are used to indicate one or more CW updates (e.g., and the remaining puts may be included in partition A for AUL feedback). For example, DFI may be partitioned based on a number of operating sub-bands (e.g., used for communications between the base station and the UE), such that the number of DFI bits in the second partition may indicate sub-band-level (or sub-band group-level) CW updates. In some cases, DFI partitioning may additionally or alternatively be based on whether AUL HARQ process retransmission is granted using SUL transmission (e.g., in such cases DFI bits corresponding to feedback for the SUL, that includes the AUL retransmission, may be included in the first partition for AUL feedback).

DFI bits may be transmitted in a downlink control channel (e.g., PDCCH). The described DFI partitioning techniques may reduce inefficient (e.g., redundant, or otherwise unused) overhead via compression of SUL DFI feedback. For example, when AUL and SUL share (e.g., use the same) HARQ processes, DFI may include bits for SUL feedback, however as NDI may be used for SUL HARQ feedback, DFI bits for SUL may be compressed. That is, additional DFI feedback granularity (e.g., CBG-level feedback) for SUL may not be as efficient as additional DFI granularity for AUL DFI feedback (e.g., as SUL DFI feedback may be used for CW updating and NDI may be used for SUL HARQ feedback). As such, DFI (e.g., DFI bit sequences in PDCCH) may be partitioned to allocate more DFI resources for an AUL DFI feedback partition, and DFI bits for SUL transmissions may be compressed into a second partition. As such, more DFI bits of a given DFI bit sequence may be used for AUL feedback (e.g., DFI bits in a first partition may provide for CBG-level AUL feedback), as the DFI bits may be used for AUL HARQ operation. Further, less DFI bits may be used for SUL feedback (e.g., DFI bits in a compressed second partition may provide for transport block-level SUL feedback, or CW updates), as DFI bits for SUL feedback may be used for CW updates or to provide confirmation or robustness to feedback provided via NDI.

When a fixed total number of bits is defined for DFI (e.g., in cases where a network configures a DFI bit sequence length, for example based on a number of configured HARQ processes, a transmission mode, etc.), a base station may partition the DFI bit sequence in a first partition including feedback for AUL processes (e.g., CBG-level feedback for AUL HARQ processes) and a second partition that may include either highly compressed feedback for each SUL HARQ process (e.g., transport block-level feedback for SUL HARQ processes) or CW update related information for uplink (e.g., no feedback from SUL HARQ processes). In some cases, the number of DFI bits may be based on a number of HARQ processes and a number of CBs or CBGs (e.g., granularity) for a HARQ process.

For example, DFI may include SUL feedback for CW updates, as in some cases a reference duration (e.g., a reference slot) for a determination of CW updating may be associated with a SUL transmission. That is (e.g., as described in more detail herein, for example, with reference to FIGS. 3A and 3B), in some cases a base station may determine to update (e.g., reset, double, etc.) a duration of a CW for one or more UE LBT procedures based on the success or failure of uplink transmissions within the reference duration. If a reference duration is determined to be associated with acceptable communications success or efficiency (e.g., if a signal-to-noise-plus-interference ratio (SINR) associated with signals measured over the reference duration exceeds some threshold, if some number of successfully received transport blocks or CBGs within the reference duration exceeds some threshold, etc.), a base station may indicate a CW reset (e.g., to some default value) via DFI. Conversely, if a reference duration is determined to be associated with unacceptable communications success or efficiency (e.g., if a measured SINR over the reference duration is below some threshold, if some number of failed or unsuccessfully received transport blocks or CBGs within the reference duration exceeds some threshold, etc.), a base station may indicate a CW update (e.g., to increasing the CW duration from some default value or from a CW duration used by the UE for LBT prior to transmitting during the reference duration) via DFI.

As such, in cases where a reference duration for CW updating is associated with a SUL transmission, DFI feedback corresponding to such an SUL transmission may be used for CW updating. For example, a base station may determine whether a reference duration is associated with an acceptable communications success or efficiency, and may either transmit an ACK (e.g., which may reset the CW) or a NACK (e.g., which may double, or otherwise increase, the CW) in DFI.

Therefore, DFI feedback values may be determined (e.g., by a base station) differently for AUL and SUL (e.g., positive acknowledgement or negative acknowledgement of AUL may be based on different criteria than positive acknowledgement or negative acknowledgement of SUL). For example, in a scenario where transport block-level HARQ ACK/NACK is configured (e.g., where DFI includes one bit per transport block) for an AUL HARQ process, the DFI bit may be set to ACK(1) only if all CB(G)s in the transport block are successfully received. In the same scenario, if the uplink slot is SUL, the base station may set the DFI bit to ACK(1) if some fraction of CB(G)s in the slot pass (e.g., if 10% or more of the CB(G)s in the slot are successfully received, else send DFI=0). In some cases, if any CB(G) passes for an SUL slot the base station may indicate an ACK in DFI for the SUL slot. That is, as such SUL feedback may be used for CW updating, the SUL feedback may be determined based on CW updating considerations (e.g., based on whether or not the CW should be updated given the information obtained for the reference slot or reference duration). AUL feedback may be determined based on whether certain AUL information of the slot was received, or whether the AUL information is to be retransmitted by the UE.

In general, wireless communications systems (e.g., example wireless communications system 100, example wireless communications system 200, as well as other wireless communications systems) may configure DFI bit sequences (e.g., DFI bit sequence length and DFI bit sequence partitioning) using the techniques described herein. For example, a DFI bit sequence length may be configured based on a number of HARQ processes (e.g., configurable by base station 105-*a*), a granularity of AUL HARQ feedback (e.g., a number of CB(G)s for each AUL HARQ process indicated by DFI), a granularity of SUL HARQ feedback (e.g., a number of CB(G)s for each SUL HARQ process indicated by DFI), a number of CW updates indicated by the DFI, the number of DFI bits used for each CW update, or some combination thereof. A DFI bit sequence partition may include a first partition of DFI bits for AUL HARQ feedback and a second partition of DFI bits for SUL HARQ feedback, DFI bits for CW update information, or DFI bits for both SUL HARQ feedback and CW update information.

The number of DFI bits in the first partition may be configured based on the number of AUL HARQ processes, the granularity of AUL HARQ feedback (e.g., a number of CB(G)s for each AUL HARQ process indicated by DFI), the number of transport block-level AUL HARQ NACKs, etc. The number of DFI bits for the second partition may be configured based on whether the second partition includes SUL HARQ feedback, CW update information, or both. For example, if the second partition includes SUL HARQ feedback, the number of DFI bits in the second partition may be configured based on a number of SUL grants, the number of SUL HARQ processes, the granularity of SUL HARQ feedback (e.g., a number of CB(G)s for each SUL HARQ process indicated by DFI), the number of transport block-level SUL HARQ NACKs, etc. If the second partition includes CW update information, the number of DFI bits in the second partition may be configured based on the number of CW updates to be indicated by the DFI (e.g., based on how many sub-bands are configured, as well as how many CWs are used per sub-band or per group of sub-bands) and the number of DFI bits used for each CW update (e.g., 1 bit may be used for a reset or double indication, 2 bits may be used to indicate 4 different CW durations, etc.).

Various a DFI bit sequences may be thus be preconfigured by wireless communications system 200 (e.g., for different scenarios or different parameters described above and herein). A base station 105-a may determine DFI bit sequences accordingly, and may indicate DFI bit sequence configurations to UE 115-a through semi-static configuration (e.g., via RRC signaling from base station 105-a). For example, in some cases, UE 115-a may receive RRC signaling and reference a look-up table (LUT) to identify a DFI bit sequence length and/or a DFI bit sequence partition that the base station 105-a may use for DFI 230. In some cases, the RRC signaling may include an explicit indication of a DFI bit sequence length and/or a DFI bit sequence partition. In other cases, RRC signaling may indicate any aspects of the different scenarios or different parameters described above and herein, and the UE 115-a may determine a DFI bit sequence length and/or a DFI bit sequence partition associated with DFI 230 based on such information.

For example, DFI bits of DFI 230 (e.g., of a DFI bit sequence) may be partitioned into two portions based on a number of HARQ processes for each AUL and SUL. That is, base station 105-a may determine how many AUL and SUL HARQ processes there are, and partition DFI bits accordingly (e.g., such that there are more bits for AUL feedback per AUL transmission in a first partition and less SUL feedback bits per SUL transmission in a second partition). In cases where the DFI 230 is configured to include CW update information (e.g., and no SUL feedback in DFI 230), DFI 230 may be partitioned based on a number of a number of CW commands to be included in a second partition (e.g., which may depend on a number of operating sub-bands, a number of DFI bits per CW command, etc.). For example, in some cases, a second partition (e.g., other than the DFI partition for AUL HARQ feedback) may include 1 DFI bit feedback per SUL HARQ process or 1 DFI bit per CW update command (e.g., and no SUL HARQ feedback). In some cases, the DFI bit partitioning may depend on whether an AUL HARQ process retransmission is granted using SUL transmission.

In some cases, the partition of HARQ processes into AUL/SUL, the partitioning of DFI into a partition for AUL HARQ feedback and a second partition (e.g., for SUL HARQ feedback or for CW commands), and the type or content of information in DFI bits may be semi-statically configured by RRC. In some cases, a dynamic indication (e.g., in PDCCH) of AUL and SUL HARQ processes may be conveyed using a 16 bit bitmap in DCI. In such cases, a UE may implicitly derive the DFI bit partition (e.g., the first partition of AUL HARQ feedback and the second partition).

Figure 3A:
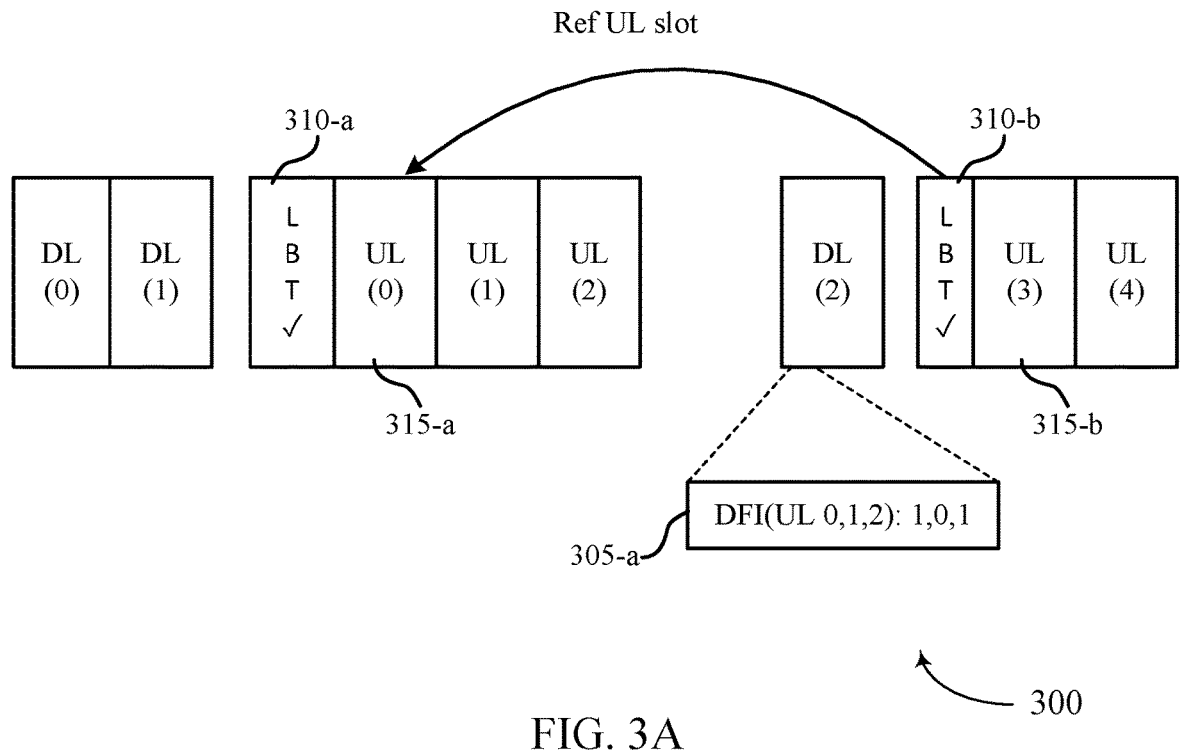
FIGS. 3A and 3B illustrate examples of transmission timelines that support partitioning of DFI bits in accordance with aspects of the present disclosure.
Figure 3B:
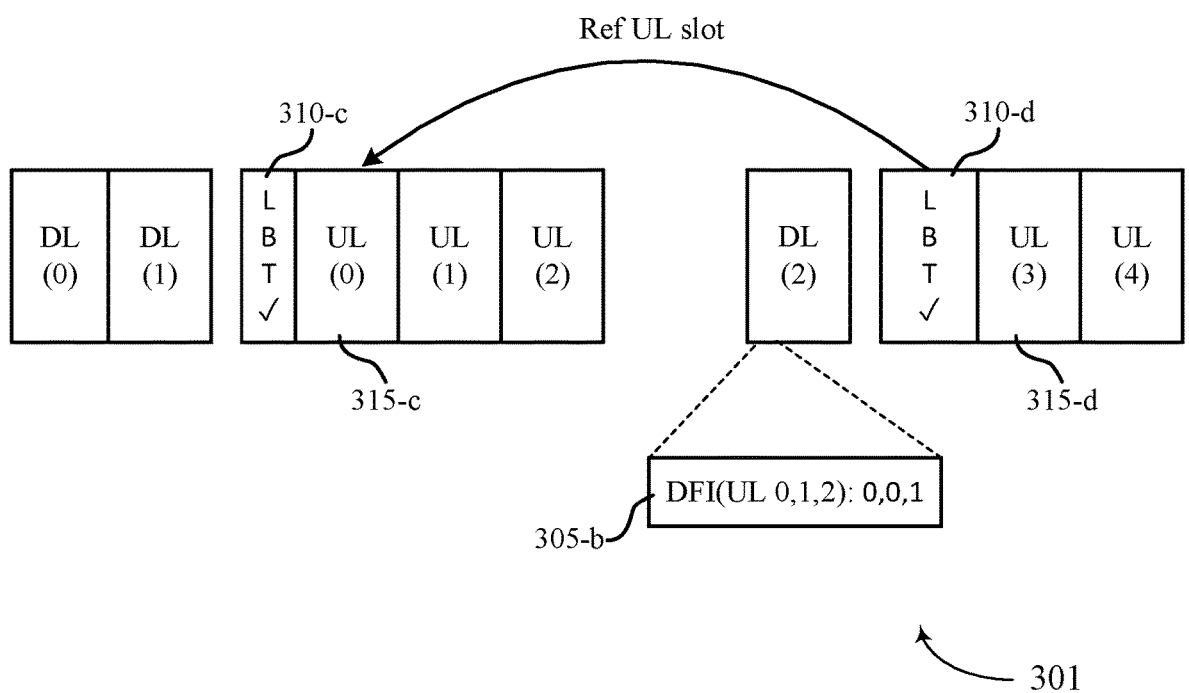

FIGS. 3A and 3B illustrate example transmission timelines 300 and 301, which support partitioning of DFI bits in accordance with aspects of the present disclosure. In some examples, aspects of the techniques illustrated by example transmission timelines 300 and 301 may be implemented by a base station 105 and a UE 115, as described with reference to FIGS. 1 and 2. Transmission timelines 300 and 301 may illustrate how DFI may be used to indicate CW updates.

For example, in transmission timeline 300, DFI 305 (e.g., which may be included in PDCCH) may indicate feedback information for a previous uplink burst (e.g., one or more transport blocks, CBGs, etc. used for uplink transmission by a UE). In some cases, a reference slot may be used to determine whether to update a CW. For example, if a collision is detected in a reference slot, if a failed transmission is associated with a reference slot, etc., a base station may indicate a CW update, in the form of a DFI reference slot NACK, to a UE that may extend the CW (e.g., which may result in a more robust or conservative LBT, as the CW duration is longer). Alternatively, if a successful transmission is received during a reference slot, a base station may indicate a CW update, in the form of a DFI reference slot ACK, to a UE that may reset the CW (e.g., which may result in a default CW duration, as the base station may determine, based on the reference slot, that communications are efficiently being conveyed based at least in part on the UEs LBT procedures).

Transmission timeline 300 may illustrate a CW reset, as DFI 305-a may indicate an ACK for a reference slot configured for CW update determination. For example, a base station may receive uplink transmission 315-a during a reference slot (e.g., which may be preconfigured), and may indicate HARQ feedback for uplink transmissions, which may include feedback for the uplink transmission 315-a associated with the reference slot, as well as other uplink transmissions (e.g., UL(0), UL(1), and UL(2)), via DFI 305-a. A UE may identify a DFI bit corresponding to the reference slot, and may determine whether or not to update a CW for a subsequent LBT procedure based on the feedback corresponding to the reference slot. For example, as discussed herein, a UE may reset (or reduce) a CW if DFI 305 indicates an ACK corresponding to the reference slot, and may increase (e.g., double) a CW if DFI indicates a NACK corresponding to the reference slot.

A UE may perform an LBT procedure 310-a over a CW (e.g., which in the example of FIG. 3A may be some extended CW, for example, based on a reference slot NACK included in previously received DFI). If the LBT passes, the UE may transmit one or more uplink transmissions (e.g., including uplink transmission 315-a) following the CW. A base station may then determine DFI 305-a based on the one or more uplink transmissions. In the example of FIG. 3A, DFI 305-a may indicate an ACK corresponding to UL(0), a NACK corresponding to UL(1), and an ACK corresponding to UL(2), where UL(0) may be configured as the reference slot. Upon reception of DFI 305-*a*, the UE may thus reset the CW. As such, for a next uplink opportunity (e.g., in some cases a next AUL opportunity), the UE may perform an LBT procedure 310-*b* during a reset CW (e.g., which may be shorter than the CW used for LBT procedure 310-*a*, in the example of FIG. 3A), and may transmit an uplink transmission 315-*b* if the LBT procedure 310-*b* passes.

Transmission timeline 301 may illustrate a CW update, as DFI 305-*b* may indicate a NACK for a reference slot configured for CW update determination. For example, a base station may receive uplink transmission 315-*c* during a reference slot (e.g., which may be preconfigured), and may indicate HARQ feedback for uplink transmissions, which may include feedback for the uplink transmission 315-*c* associated with the reference slot, as well as other uplink transmissions (e.g., UL(0), UL(1), and UL(2)), via DFI 305-*b*. A UE may identify a DFI bit corresponding to the reference slot indicates a NACK, and may determine to update a CW for a subsequent LBT procedure based on the feedback corresponding to the reference slot.

A UE may perform an LBT procedure 310-*c* over a CW (e.g., which in the example of FIG. 3B may be some default CW, for example, based on a reference slot ACK included in previously received DFI). If the LBT passes, the UE may transmit one or more uplink transmissions (e.g., including uplink transmission 315-*c*) following the CW. A base station may then determine DFI 305-*b* based on the one or more uplink transmissions. In the example of FIG. 3B, DFI 305-*b* may indicate a NACK corresponding to UL(0), a NACK corresponding to UL(1), and an ACK corresponding to UL(2), where UL(0) may be configured as the reference slot. Upon reception of DFI 305-*b*, the UE may thus update (e.g., double) the CW. As such, for a next uplink opportunity (e.g., in some cases a next AUL opportunity), the UE may perform an LBT procedure 310-*d* during an updated CW (e.g., which may be longer in duration than the CW used for LBT procedure 310-*c*, in the example of FIG. 3B), and may transmit an uplink transmission 315-*d* if the LBT procedure 310-*d* passes. In some cases, such an extension of the CW for LBT procedure 310-*d* may provide for more conservative medium contention (e.g., as the UE may perform LBT over a longer duration, which may increase the chance of a failed LBT in scenarios where the medium is not available).

In some cases, UL(0), UL(1), and UL(2) may each depict a slot or transport block associated with one or more uplink transmissions (e.g., where UL(0) may correspond to some configured reference slot for CW updating). In general, UL(0), UL(1), and UL(2) may each depict any configured TTI. Example, transmission timelines 300 and 301 are shown for illustrative purposes. Aspects of the described techniques may be applied to other CW reference duration configurations, other sizes of DFI sequences used for DFI 305, various configurations of AUL and SUL transmissions by a UE, etc., by analogy, without departing from the scope of the present disclosure. In some cases, a reference TTI or reference duration for CW updates may include several slots or transport blocks (e.g., in some cases, a base station and UE may use several DFI bits or an average of several DFI bits to indicate or determine CW updates), depending on the network configuration of the reference duration for CW updating. In some cases, a CW reference duration may include several TTIs used by a UE for uplink transmission, and DFI 305 may include, for example, one or two bits for a CW update based on a base station assessment of the CW reference duration.

If SUL uses HARQ processes that are also enabled for AUL, then SUL feedback may be included in DFI. In some cases, feedback for SUL in DFI may be used for CW updates (e.g., and not for regular HARQ-retransmission), as NDI may be used for SUL HARQ-retransmission feedback. In some cases, a reference slot for CW duration determination (e.g., for CW updating, resetting etc.), may be the first slot of a previous uplink burst which used LBT (e.g., cat4-LBT) for transmission, and which may be at least K3 slots before the grant for the current uplink transmission. In the example of FIGS. 3A and 3B, the reference slot (UL(0)) of uplink burst transmitted over UL(0), UL(1), and UL(2) may be at least K3 slots before the downlink grant (e.g., received over DL(2)) for the current uplink transmission (e.g., which may include UL(3)).

The reference uplink slot (e.g., for CW updating) may be configured as the first slot (e.g., UL(0)) of the most recent uplink burst for which feedback is available. The feedback (e.g., which may be NDI, DFI, or both) of the reference uplink slot may be used by a UE for CW updates for an LBT procedure of a current (e.g., pending) transmission. In some examples, SUL may use NDI for HARQ operation, and AUL may use DFI for HARQ operation. As discussed herein, as SUL may have the same HARQ processes identifiers (IDs), DFI may also include feedback for SUL (e.g., which may be used for CW updating, as described herein). If DFI indicates an ACK for a reference slot (e.g., or any configured reference duration), the CW for a next LBT may be reset. If DFI indicates a NACK for a reference slot (e.g., or any configured reference duration), the CW for a next LBT may be doubled.

A CW for LBT may refer to time resources (e.g., within shared RF spectrum), which may, for example, include one or more sets of resource blocks that a UE uses to perform energy sensing for an LBT procedure. That is, each resource block within a set of resource blocks (e.g., within a CW) may include signals transmitted by other wireless devices that, when sensed by the UE, indicate that the UE may not transmit, thereby avoiding collisions with the other wireless devices. Alternatively, the resource blocks may not include signals from the other wireless devices (e.g., indicating that the medium is "idle") and the UE may wait a random period (e.g., a backoff period) while continuing to perform sensing of the set of resource blocks. In some cases, the backoff period indicates how many idle time slots a UE may sense before a transmission. The number of the time slots may be specified by a backoff counter that is selected within the range of the CW. If the UE does not detect any signals on the set of resource blocks, the UE may determine that it has won contention for additional sets of resource blocks used for data transmissions. Each set of LBT resources (e.g., of a CW) may thus correspond to a set of target resources for an uplink transmission (e.g., the additional resource blocks of a preconfigured AUL TTI, which may include UL(3) and UL(4)) within the shared RF spectrum region.

In some cases, a CW may be defined, maintained, updated, etc. (e.g., and reference durations may be configured), individually for different sub-bands or sub-band groups. That is, in some cases, each sub-band may potentially be associated with a different CW (e.g., that depends on collisions in that particular sub-band). For example, a channel in shared or unlicensed spectrum may include multiple sub-bands (e.g., multiple 20 MHz sub-bands), and devices (e.g., other wireless devices) in coexisting in the shared or unlicensed spectrum may independently contend for sub-band access.

FIGS. 4A and 4B illustrate example DFI bit sequences 400 and 401, which support partitioning of DFI bits in accordance with aspects of the present disclosure. In some examples, aspects of the techniques illustrated by example DFI bit sequences 400 and 401 may be implemented by a base station 105 and a UE 115, as described with reference to FIGS. 1 and 2. DFI bit sequences 400 and 401 may, for example, illustrate how a DFI bit sequence may be partitioned into an AUL HARQ feedback partition (e.g., Partition A) and a second partition (e.g., Partition B). In example DFI bit sequences 400 and 401, the second partition (e.g., Partition B) may include DFI bits for one or more SUL HARQ processes (e.g., one DFI bit per SUL HARQ process).

DFI bit sequence 400 may include a sequence of DFI bits (e.g., a bitmap) indicating an acknowledgement status. In the example of FIG. 4A, DFI bit sequence 400 may illustrate a DFI bit sequence configured for 8 SUL HARQ processes (e.g., HARQ0-HARQ7) and 8 AUL HARQ processes (e.g., HARQ8-HARQ15), where the DFI bit sequence includes 32 DFI bits. The DFI bit sequence 400 may be partitioned into Partition A and Partition B. Partition B may include 8 DFI bits, with one DFI bit corresponding to each SUL HARQ process. In some cases, such may be referred to herein as compressing SUL HARQ DFI (e.g., as when evenly distributed across SUL and AUL feedback, 32 bits may otherwise provide for 2 DFI bits per HARQ process). Partition A may thus include 24 DFI bits, with three DFI bits corresponding to each AUL HARQ process. As such, the DFI bit sequence 400 may feedback an ACK/NACK for 3 CBGs in every AUL HARQ process (e.g., thus providing CBG-level HARQ granularity).

DFI bit sequence 401 may include a sequence of DFI bits (e.g., a bitmap) indicating an acknowledgement status. In the example of FIG. 4B, DFI bit sequence 401 may illustrate a DFI bit sequence configured for 8 SUL HARQ processes (e.g., HARQ0-HARQ7) and 8 AUL HARQ processes (e.g., HARQ8-HARQ15), where the DFI bit sequence includes 32 DFI bits. The DFI bit sequence 401 may be partitioned into Partition A and Partition B. Partition B may include 8 DFI bits, with one DFI bit corresponding to each SUL HARQ process. In some cases, such may be referred to herein as compressing SUL HARQ DFI (e.g., as when evenly distributed across SUL and AUL feedback, 32 bits may otherwise provide for 2 DFI bits per HARQ process). Partition A may thus include 24 DFI bits.

In the example DFI bit sequence 401, Partition A may include transport block-level and CBG-level HARQ feedback for AUL. For example, the first 8 DFI bits of Partition A (e.g., each corresponding to one of AUL HARQ processes HARQ8 through HARQ15) may indicate transport-block level HARQ feedback. Subsequent bits in Partition A following the transport block-level AUL HARQ feedback may indicate CBG-level feedback for transport block NACKs. That is, in the example DFI bit sequence 401, transport block-level HARQ feedback for AUL HARQ processes HARQ10 and HARQ14 may indicate a NACK (e.g., via a DFI bit=0), and four DFI bits for each of AUL HARQ processes HARQ10 and HARQ14 may follow the transport block-level feedback to provide CBG-level HARQ feedback granularity for the failed or NACK'd HARQ processes. As such, the DFI bit sequence 401 may feedback an ACK/NACK for 4 CBGs in every AUL HARQ process associated with a NACK to CBG-level HARQ granularity for unsuccessful transport block-level AUL HARQ.

As discussed herein, the partitioning of DFI bit sequences may be based on the number of AUL HARQ processes and the number of SUL HARQ processes, and may be semi-statically configured. That is, a DFI bit sequence length and a number of bits included in each of Partition A and Partition B may be semi-statically configured based on the number of AUL/SUL HARQ processes. If an AUL HARQ process fails, more DFI bits in Partition A may be used to indicate the CBGs that failed for that AUL HARQ process. However the total number of bits in the AUL partition (e.g., the number of DFI bits in Partition A) may be fixed and programmed by RRC semi-statically.

Example DFI bit sequences 400 and 401 are shown for illustrative purposes. The described techniques may be implemented to configure various other DFI bit sequences by analogy, without departing from the scope of the present disclosure. For example, in general, the techniques described with reference to FIG. 4B may be extended to any arbitrary combination of SUL and AUL HARQ processes, where one bit per SUL HARQ process may be included in Partition B, and Partition A may include one bit per AUL HARQ process (e.g., at any TTI-level granularity) followed by more granular AUL HARQ feedback for any failed or NACK'd AUL HARQ process. Such DFI configurations may efficiently utilize DFI bits to provide higher levels of granularity (e.g., CBG-level, CB-level, etc.) for selective HARQ processes that may benefit from more granular HARQ feedback (e.g., due to unsuccessful reception of some subsets or all subsets of a longer duration). That is, a first set of bits in a Partition A may give a HARQ process level ACK/NACK for all AUL HARQ processes, and the remaining bits in Partition A may provide more granular (e.g., CBG-level) ACK/NACK for any failing HARQ processes (e.g., with 4 DFI bits per failing HARQ process). In some cases, the level of granularity provided by remaining DFI bits (e.g., the number of DFI bits per failed HARQ process) may depend on the number of DFI bits remaining in the Partition A (e.g., on the length of the DFI bit sequence), the number of AUL HARQ process, and the number of failed AUL HARQ processes. For example, in a scenario where all 8 AUL HARQ process fail, the remaining 16 DFI bits may be split such that 2 DFI bits are used for each of the failed AUL HARQ processes.

DFI bits in Partition A may correspond HARQ feedback for CBGs included in one or more prior AUL transmissions. DFI bits in Partition B may correspond HARQ feedback for transport blocks included in one or more prior SUL transmissions. As shown, the example DFI bit sequences 400 and 401 may indicate acknowledgement status corresponding to the various HARQ processes. The HARQ0-HARQ15 numerology may not necessarily indicate the order in which AUL transmissions and SUL transmissions were transmitted by the UE. But rather may indicate a formatting (e.g., and partitioning) of the DFI bit sequence that is used to indicate HARQ feedback for AUL and SUL HARQ processes associated with previous AUL transmissions and SUL transmissions of the UE.

As discussed herein, in some cases DFI may be configured with one DFI bit per SUL HARQ process (e.g., one DFI bit per SUL HARQ process included in Partition B). In some cases, the acknowledgment status (e.g., whether the DFI bit indicates an ACK or a NACK) may depend on some number of CB(G)s of the slot or SUL HARQ duration passing, the SINR of the slot or SUL HARQ duration, a detected collision during the SUL HARQ duration, etc. For example, a DFI bit for a SUL HARQ process may indicate an ACK (e.g., DFI=1) if some fraction of the CB(G)s passes, otherwise the DFI bit may indicate a NACK (e.g., DFI=0). When SUL in configured in some transmission modes (e.g., TM2), one DFI bit may be included per stream, or one DFI bit may be included for both streams (e.g., as in LAA). In some cases, instead of some fraction of CB(G)s passing, DFI may indicate an ACK if, for example, at least one or two CB(G)s passed, if a first few number of CB(G)s passed, etc. In some cases, a base station may evaluate the SINR (e.g., may measure SINR) of the received SUL HARQ duration (e.g., of the received slot associated with a HARQ process), and may indicate an ACK via the corresponding DFI bit if the SINR exceeds some threshold (e.g., else the base station may indicate a NACK via the DFI bit). In some cases, the base station may detect a collision in a SUL slot, and may transmit a NACK via the corresponding DFI bit (e.g., the base station may indicate an ACK via DFI regardless of the passing or failing of CB(G)s, unless a collision is detected by the base station).

Figure 5A:
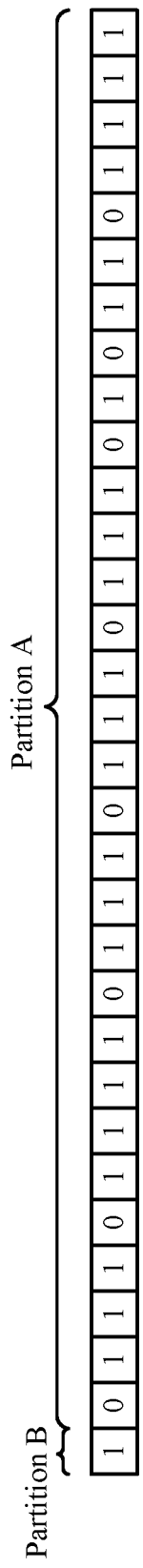
FIGS. 5A and 5B illustrate examples of DFI bit sequences that support partitioning of DFI bits in accordance with aspects of the present disclosure.
Figure 5B:
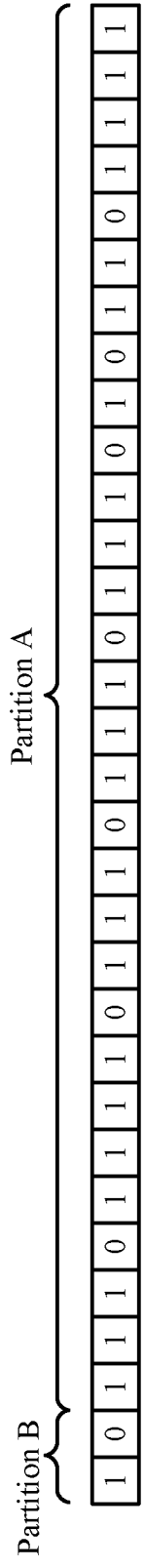

FIGS. 5A and 5B illustrate example DCI bit sequences 500 and 501, which support partitioning of DFI bits in accordance with aspects of the present disclosure. In some examples, aspects of the techniques illustrated by DFI bit sequences 500 and 501 may be implemented by a base station 105 and a UE 115, as described with reference to FIGS. 1 and 2. DFI bit sequences 500 and 501 may, for example, illustrate how a DFI bit sequence may be partitioned into an AUL HARQ feedback partition (e.g., Partition A) and a second partition (e.g., Partition B). In example DFI bit sequences 500 and 501, the second partition (e.g., Partition B) may include DFI bits for CW commands (e.g., and may not, in some cases, indicate SUL HARQ feedback).

DFI bit sequence 500 may illustrate a single bit in Partition B, which may indicate a CW command (e.g., a CW update, such as a CW reset or a CW double command). The remaining DFI bits of the DFI bit sequence 500 may be included in Partition A for AUL HARQ processes. In some cases, the DFI bit in Partition B may not necessarily provide ACK/NACK feedback for a SUL HARQ process, but rather may provide an explicit CW command. In the example, of DFI bit sequence 500, Partition B may include 1 DFI bit for a CW command, and the remaining 31 DFI bits may be included in the Partition A, and may be used for AUL HARQ feedback (e.g., according to any techniques or configurations described or alluded to herein, which may include transport block-level AUL HARQ feedback, CBG-level AUL HARQ feedback, or both).

DFI bit sequence 501 may illustrate 2 DFI bits in Partition B, which may indicate a CW command (e.g., a CW update, such as a CW reset or a CW double command). the remaining DFI bits of the DFI bit sequence 501 may be included in Partition A for AUL HARQ processes. In some cases, the 2 DFI bits in Partition B may not necessarily provide ACK/NACK feedback for a SUL HARQ process, but rather may provide an explicit CW command. In the example, of DFI bit sequence 500, Partition B may include 2 DFI bits for one or more CW commands, and the remaining 30 DFI bits may be included in the Partition A, and may be used for AUL HARQ feedback (e.g., according to any techniques or configurations described or alluded to herein, which may include transport block-level AUL HARQ feedback, CBG-level AUL HARQ feedback, or both).

For example, in some cases the 2 DFI bits in Partition B may be used to indicate a single CW command (e.g., indicating 4 possible states with the 2 DFI bits), or two CW commands (e.g., if a UE is using two operating sub-bands, each associated with a CW). For example, if there are two 20 MHz sub-bands, DFI bit sequence 501 may be configured such that 2 DFI bits are included in Partition B and 30 DFI bits are included in Partition A. Each of the 2 DFI bits may indicate an explicit CW update command for one of the two sub-bands. In general, the number of DFI bits configured in Partition B may depend on the number of CW commands and the number of DFI bits used per CW command. In some cases, the number of CW commands may depend on the number of operating sub-bands (e.g., in some cases the number of DFI bits in Partition B may depend on the number of sub-bands).

In cases where DFI is configured with one or more bits per CW command (e.g., one DFI bit per CW command included in Partition B), a base station may explicitly signal a DFI bit for a CW update to a UE (e.g., instead of one DFI bit feedback for each SUL HARQ process). In some cases, a CW update command may be based on CB(G)s passing a threshold, an SINR measurement exceeding a threshold, or a collision detection (e.g., which may each be determined over a reference slot, over several slots, over a reference duration, etc.). In such cases, the DFI bits in Partition B may not necessarily indicate feedback for SUL HARQ processes, but may indicate explicit base station commands for CW updates.

In some cases, DFI may include at least one DFI feedback bit for each sub-band, for a CW command. In some cases, one DFI bit may indicate common CW update information for all sub-bands, and a UE may apply a same CW update to all sub-bands (e.g., when one DFI bit is configured in a Partition B). A base station indicate a conservative ACK/NACK (e.g., may only ACK if at least one CBG in each sub-band passes). In some cases, a base station may indicate an ACK in DFI if SINR is above a threshold in all sub-bands, if a collision is not detected in all sub-bands, etc.

In some cases, one DFI bit may be included (e.g., in Partition B) for a CW command for each sub-band (e.g., N DFI bits may be included in Partition B for N sub-bands). In such examples, DFI may include an ACK for a CW command corresponding to a sub-band if at least one CB(G) in the sub-band passes. In some examples, DFI may include an ACK for a CW command corresponding to a sub-band if SINR measured in the sub-band exceeds a threshold, if a collision is not detected in the sub-band, etc. In some cases, a DFI bit may be included (e.g., in Partition B) for a CW command for some group of sub-bands (e.g., a CW command may be indicated for every two sub-bands). Generally, if a DFI bit is included for a CW command corresponding to a group of m sub-bands, N/m DFI bits may be included in Partition B. In such cases, SUL HARQ feedback (e.g., an ACK/NACK for each SUL) may not be included in DFI. Any SUL DFI resources (e.g., CW reference durations corresponding to a SUL transmission) may be used for CW feedback for CW updates for all sub-bands, for each sub-band, or for a group of sub-bands (e.g., depending on whether CWs are configured for all sub-bands, for each sub-band, or for groups of sub-bands). As an example, 16 DFI bits may be available for eight AUL HARQ processes, eight SUL HARQ processes, and four sub-bands. In such an example, the first 4 DFI bits (e.g., in a Partition B) may be used for four sub-band-based CW updates, and 12 DFI bits (e.g., in a Partition A) may be used for feedback corresponding to the eight AUL HARQ processes.

In some cases, an AUL HARQ process may be retransmitted by an SUL grant (e.g., an AUL HARQ process may be granted for a SUL retransmission of information originally transmitted via AUL). That is, in some cases, a base station may NACK an AUL transmission, and may transmit an uplink grant to the UE for retransmission of the information. In some of such cases, the semi-static partitioning of the HARQ process and the DFI bits may remain unchanged.

The DFI feedback bits for such an SUL retransmission of an initial AUL transmission may still be included in Partition A resources for this HARQ process. The DFI may assume the SUL retransmission of an initial AUL transmission is an AUL HARQ feedback DFI resource (e.g., is part of Partition A). In some cases, CW update bits for single/multiple bands may be repeated in such a resource. If a downlink slot including the DFI also has a SUL grant for an AUL HARQ process, then the DFI bits may be repartitioned assuming this AUL HARQ process as SUL, and DFI bits may be configured accordingly. In the DFI, a base station may dynamically indicate a bitmap of which of the 16 HARQs are AUL for the DFI purposes.

Figure 6:
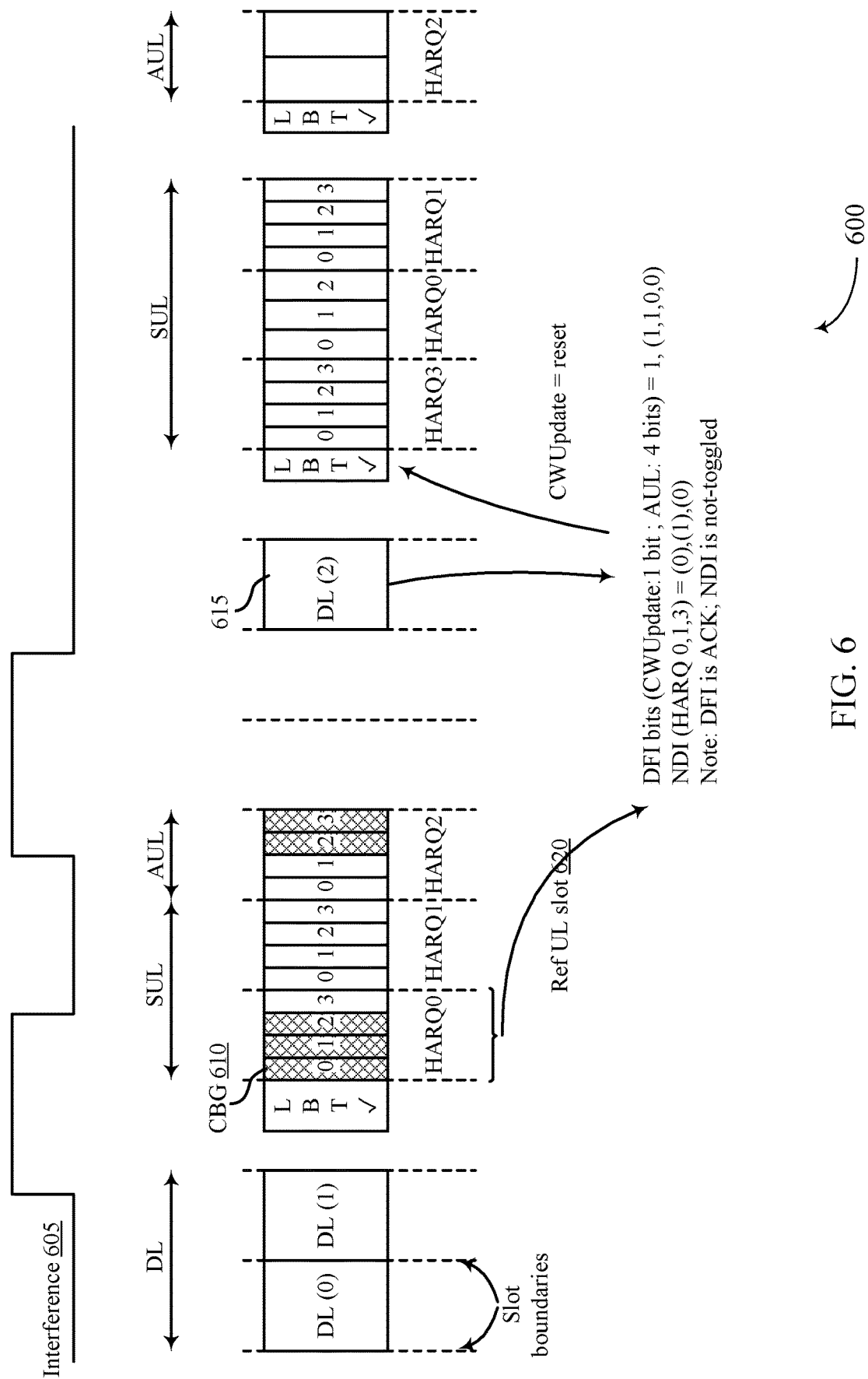
FIG. 6 illustrates an example of a transmission timeline that supports partitioning of DFI bits in accordance with aspects of the present disclosure.

FIG. 6 illustrates an example of a transmission timeline 600 that supports partitioning of DFI bits in accordance with aspects of the present disclosure. In some examples, transmission timeline 600 may implement aspects of wireless communications system 100 and wireless communications system 200. For example, aspects of the techniques illustrated by example transmission timeline 600 may be implemented by a base station 105 and a UE 115, as described with reference to FIGS. 1 and 2. Example transmission timeline 600 may, for example, illustrate UE behavior in the case of conflicting feedback (e.g., in cases where DFI and NDI may indicate conflicting information).

Transmission timeline 600 may illustrate a scenario where NDI and DFI (e.g., included in a downlink transmission 615, which may refer to a PDCCH) indicating conflicting information. Interference profile 605 may illustrate an example interference profile over time, where interference (e.g., or occupancy of the medium by other wireless devices) is represented on the y-axis and time is represented on the x-axis. A downlink transmission 615 may include NDI (e.g., for SUL HARQ feedback) and DFI (e.g., for AUL HARQ feedback, CW commands, in some cases SUL HARQ feedback, etc.). For example, DFI may include HARQ feedback for AUL HARQ process HARQ2, and NDI may include HARQ feedback for SUL HARQ processes HARQ0 and HARQ1. According to the techniques described herein, DFI may include CBG 610 granular HARQ feedback for AUL HARQ processes (e.g., HARQ2) in a second partition of the DFI bit sequence, and a first partition of the DFI bit sequence may include a CW command (e.g., which may be determined based at least in part on a reference uplink slot 620). In some cases, the CW command that is determined from the reference uplink slot 620 (e.g., indicated as an ACK or a NACK) may conflict (e.g., be the opposite or be inequivalent) with SUL HARQ feedback for the reference uplink slot 620.

In the example of FIG. 6 (e.g., in light of interference profile 605), a base station may determine CBGs 0-2 of associated with SUL HARQ process HARQ0 and CBGs 2 and 3 associated with AUL HARQ process HARQ2 have not been properly received. However, because CBG 3 associated with the reference slot has been successfully received, a base station may indicate an ACK in DFI (e.g., as the base station may indicate a CW command of a CW reset, as a fraction or portion of the reference slot was successfully received). NDI indicating SUL HARQ feedback may indicate a NACK for the SUL HARQ process associated with the reference slot (e.g., as the CBGs 0-2 of associated with SUL HARQ process HARQ0). As such, the NDI and DFI may indicate different acknowledgment statuses corresponding to the reference uplink slot 620 (e.g., NDI may be not-toggled, but DFI may indicate an ACK).

In cases where NDI for an SUL HARQ process (e.g., HARQ0) is different than the DFI (e.g., when NDI indicates a no-toggle in an uplink grant, for retransmission, for a HARQ0 process, but DFI is ACK for the HARQ0 process), a UE may be configured to interpret such information in various ways. For example, in scenarios where DFI is ACK and NDI is no-toggle, a UE may reset a CW (e.g., DFI may be used and NDI may be ignored for CW updating purposes) and may perform HARQ retransmission for the uplink grant (e.g., NDI no-toggle may be used). In other cases, for example, a UE may double the CW (e.g., NDI no-toggle may be used and DFI may be ignored for CW updating purposes) and may perform HARQ retransmission for the uplink grant (e.g., NDI no-toggle may be used for HARQ retransmission purposes). In scenarios where DFI is NACK and NDI is toggled (e.g., if a base station detects a collision or measures low SINR, but transport blocks or CBGs still pass due to use of a low MCS), a UE may use the DFI and double the CW size, and perform a new transmission for the uplink grant according to the HARQ process. In other cases, for example, the UE may reset the CW, and may perform a new transmission for the uplink grant according to the HARQ process. In the example of FIG. 6, the UE may reset the CW based on the DFI feedback (e.g., the U may use DFI for CW commands), and may perform HARQ retransmission for the uplink grant (e.g., the UE may use NDI no-toggle for SUL HARQ feedback purposes).

Further, in some cases, DFI and/or NDI may include default values, for example, in cases where a configured DFI or NDI includes information bits corresponding to HARQ processes that have not yet been initiated or HARQ processes that are premature (e.g., HARQ processes within 3 slots prior to the time the DFI or NDI is received, as further described with reference to FIG. 7). For example, NDI may include feedback for SUL HARQ processes HARQ0, HARQ1, and HARQ3, however a SUL transmission corresponding to the HARQ3 process may have not yet been sent. In such cases, the NDI may include a default bit (e.g., a 0 value) which the UE may identify as default (e.g., as the UE may determine the SUL transmission corresponding to HARQ3 has not yet been transmitted). In such cases, the UE may effectively disregard such default values.

Figure 7A:
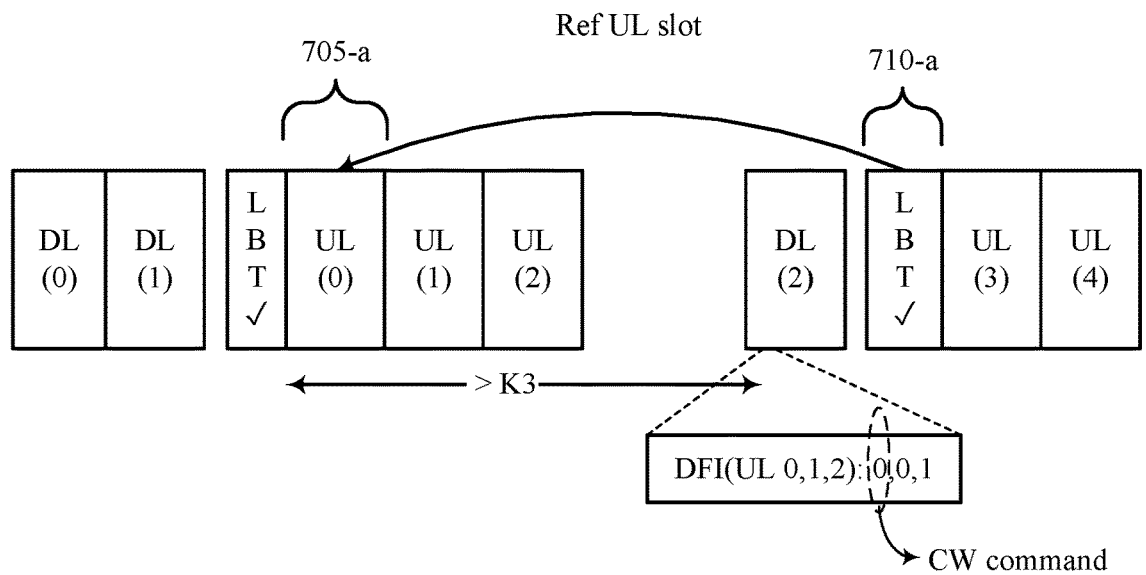
FIGS. 7A and 7B illustrate examples of transmission timelines that support partitioning of DFI bits in accordance with aspects of the present disclosure.
Figure 7B:
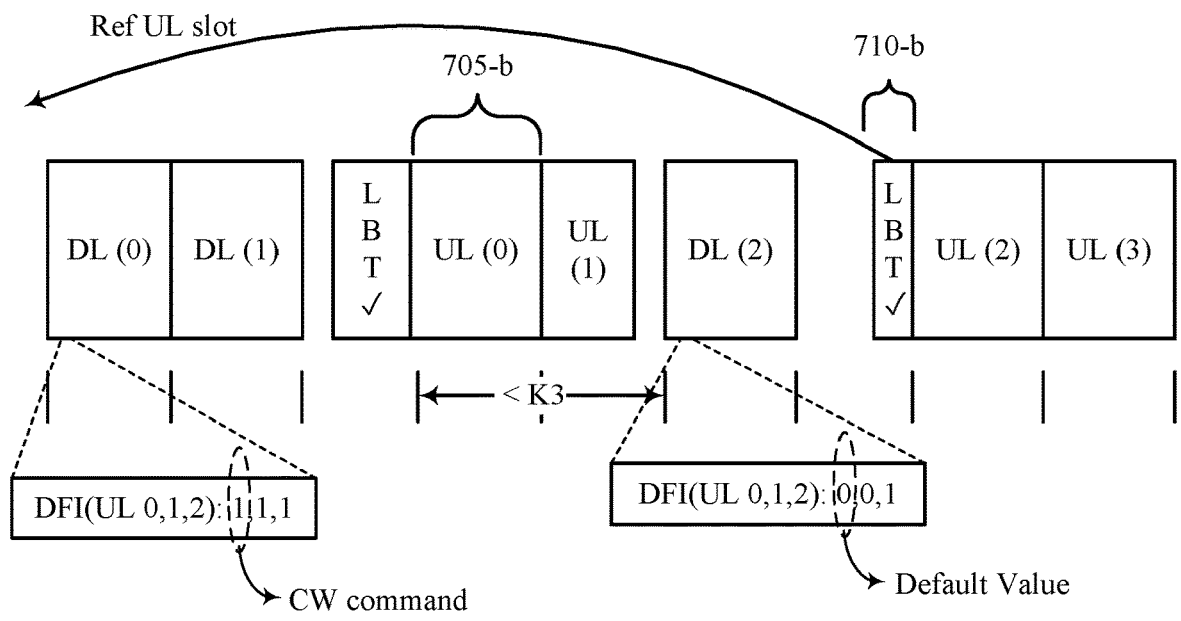

FIGS. 7A and 7B illustrate example transmission timeline 700 and example transmission timeline 701 that each supports partitioning of DFI bits in accordance with aspects of the present disclosure. In some examples, aspects of the techniques illustrated by transmission timeline 700 may be implemented by a base station 105 and a UE 115, as described with reference to FIGS. 1 and 2. Transmission timelines 700 and 701 may, for example, illustrate UE behavior for CW updating from CW update information included in DFI.

Transmission timeline 700 may, for example, illustrate DFI including information bits corresponding to a reference duration 705-a (e.g., a reference slot) for CW updating. For example, DFI may include HARQ feedback information corresponding to a reference slot, and a UE may use the DFI bits corresponding to the reference duration 705-a to determine CW update information. In some cases, CW update information may be valid for DFI bits corresponding to HARQ processes beyond 3 slots prior to the time the DFI is received. In the example of FIG. 7A, DFI corresponding to reference duration 705-a may be used to update CW duration 710-a, as reference duration 705-a may occur more than 3 slots prior to the reception (e.g., the reception slot) of the DFI.

Transmission timeline 701 may, for example, illustrate DFI including information bits corresponding to a duration 705-b that may not be used for updating a CW duration

710-*b* (e.g., as the duration 705-*b* may occur within 3 slots prior to the received DFI). For example, DFI included in DL(2) may include HARQ feedback information corresponding to a duration 705-*b*, and a UE may not use the DFI bits corresponding to the duration 705-*b* to determine CW update information. As the duration 705-*b* may not allow enough processing time for CW updating, the UE may use previously received DFI for any CW updates (e.g., DFI included in DL(0), which may include HARQ feedback information for a reference slot previously measured by the base station). That is, in the example of FIG. 7B, the DFI in DL(2) comprises a default value '0'. This DFI bit may not indicate the feedback for the duration 705-*b* as the base station may not have enough processing time to provide the feedback in DL(2).

In some examples, a default value may be set to '0' (e.g., a NACK). If the feedback for a HARQ process is not available, then the DFI bit may be set to NACK as default. In the present example, the first DFI bit shows 0 (e.g., DFI(0,1,2)=0, 0, 1) because '0' is the default value (e.g., and not necessarily because UL(0) failed). As the time from UL(0) to the DFI bits (e.g., to reception of DL(2)) is <K3, and the base station may use at least K3 slots to process and give the feedback for duration 705-*b*, the DFI bit may be set to a default value and effectively disregarded by the UE. As such a previous DFI feedback may be used to update the CW.

Further, transmission timeline 701 may, for example, illustrate UE behavior in the case of default DFI values (e.g., in cases where DFI includes information bits corresponding to AUL HARQ processes that have not yet been initiated, information bits corresponding to HARQ processes within 3 slots prior to the time the DFI is received, etc.). For example, in some cases (e.g., due to some fixed DFI bit sequence length), DFI may include default HARQ feedback information (e.g., in cases where the DFI bit sequence length is configured to include HARQ feedback for an AUL transmission which has yet to be transmitted, for an AUL transmission that was transmitted too recently for the base station to have been able to process the transmission and include it in the DFI, etc.). In some cases, DFI may include valid HARQ feedback information only for AUL transmissions transmitted by the UE before 3 slots prior to the reception of the DFI. Generally, the UE may assume valid HARQ feedback information for PUSCH transmissions ending at least some duration K3 prior to the starting symbol of the DFI carrying the HARQ feedback information. In the example of FIG. 7B, DFI included in DL(2) may include invalid AUL HARQ feedback information (e.g., default values) for UL(0) and UL(1) HARQ processes (e.g., as the ending symbol of UL(0) and UL(1) may have been transmitted within K3 of the DL(2) starting symbol).

In some cases, a DFI bit may be a NACK such that if a UE was unable to transmit (e.g., due to a failed LBT procedure), the UE may not use the SUL DFI bit. For example, in some cases, a base station may grant a transmission for a UE, but the UE may be unable to transmit. In such cases, the corresponding DFI may indicate a NACK as the base station may not know the UE failed an LBT procedure associated with the granted transmission. In some cases, a UE may consider SUL DFI bit for CW updates if the SUL DFI is received after some K3 slots after SUL transmission (e.g., if the SUL DFI is received after some K3 duration from the ending symbol of the PUSCH to the starting symbol of the DFI carrying HARQ for that PUSCH).

In some examples, K3 may be indicated semi-statically in RRC. In some examples, K3 may be indicated dynamically in DFI (e.g., DFI may be for uplink transmissions before K3 slots). If DFI includes HARQ feedback for multiple slots, the UE may use the SUL or AUL DFI for the reference slot. In some cases, if the reference slot is a AUL slot, the UE may use the reference AUL DFI bits for CW update information. In some cases, if the reference slot is a AUL slot, the UE may use the explicit CW update command bit transmitted in the non-AUL DFI resources. If the UE transmission of uplink reference slot was punctured, then the UE may consider the DFI for the reference slot (e.g., a first partial slot) and subsequent slots for the CW update information.

Figure 8:
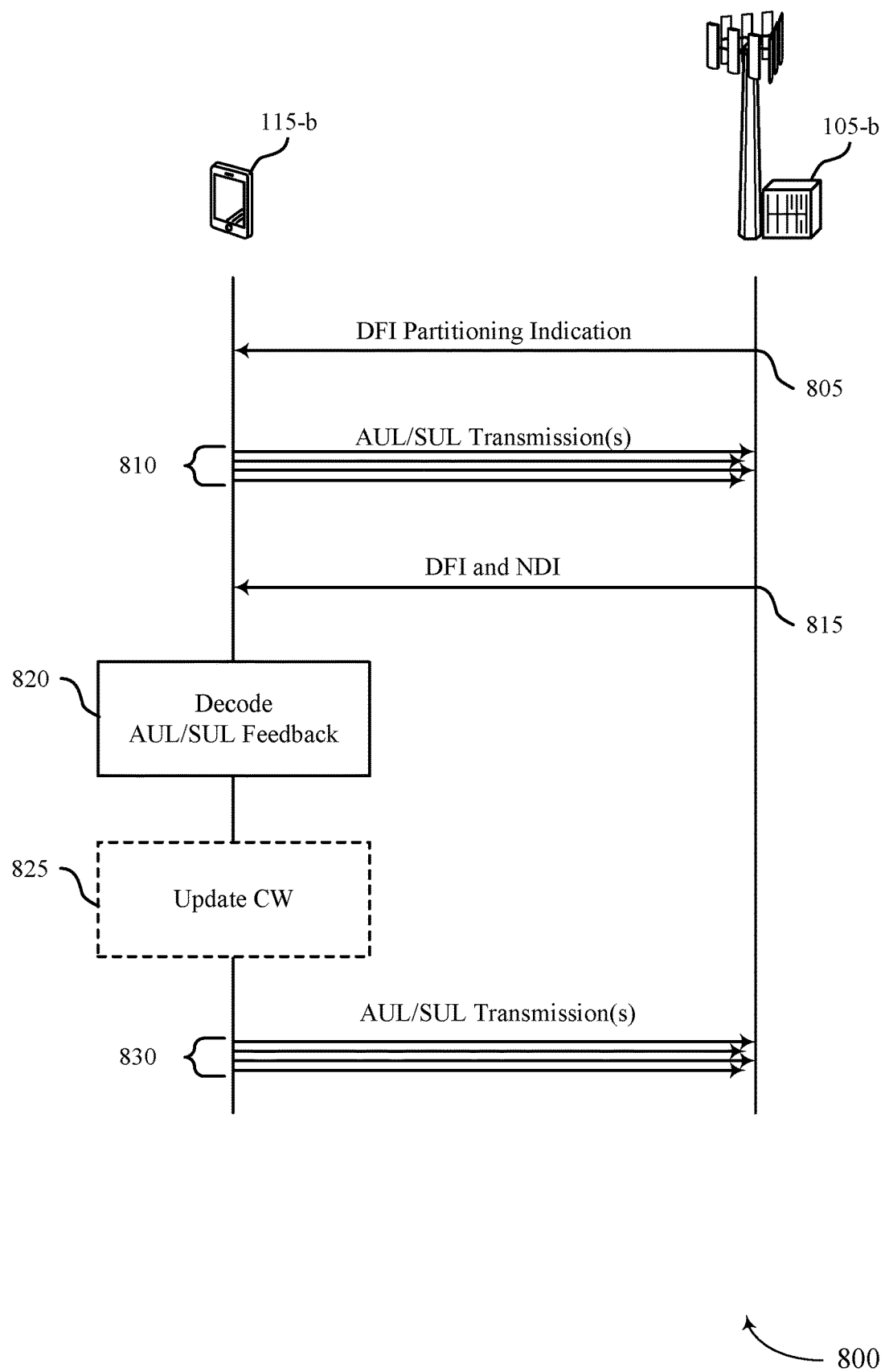
FIG. 8 illustrates an example of a process flow that supports partitioning of DFI bits in accordance with aspects of the present disclosure.

FIG. 8 illustrates an example of a process flow 800 that supports partitioning of DFI bits in accordance with aspects of the present disclosure. In some examples, process flow 800 may implement aspects of wireless communications system 100 and wireless communications system 200. Process flow 800 illustrates aspects of techniques performed by base station 105-*b* and UE 115-*b*, which may be examples of a base station 105 and UE 115 described with reference to FIGS. 1-7. In the following description of the process flow 800, the operations between the base station 105-*b* and UE 115-*b* may be transmitted in a different order than the exemplary order shown, or the operations performed by base station 105-*b* and UE 115-*b* may be performed in different orders or at different times. In some cases, certain operations may also be left out of the process flow 800, or other operations may be added to the process flow 800.

At 805, base station 105-*b* may transmit a message (e.g., via RRC signaling) that indicates a DFI bit sequence is partitioned into a first bit partition and a second bit partition, a number of bits in the first bit partition being based at least in part on a number of AUL HARQ processes of the UE 115-*b*.

At 810, UE 115-*b* may transmit, in a shared radio frequency spectrum band (e.g., in an unlicensed radio frequency spectrum band), one or more AUL transmissions and, in a second radio frequency band (e.g., a licensed radio frequency spectrum band) one or more SUL transmissions, including an AUL transmission corresponding to at least one AUL HARQ process of the number of AUL HARQ processes. Base station 105-*b* may monitor for AUL transmissions corresponding the AUL HARQ processes, and may generate feedback (e.g., in the form of DFI) based at least in part on the success or failure of the various AUL HARQ processes (e.g., the success or failure of the various AUL transmissions).

At 815, base station 105-*b* may transmit a feedback transmission comprising the DFI bit sequence based at least in part on monitoring for the AUL transmission.

At 820, the UE 115-*b* may decode feedback for the AUL transmission within the first bit partition of the DFI bit sequence. Further, the UE 115-*b* may identify any CW commands from the DFI. As discussed herein, depending on the DFI bit sequence configuration, the DFI may include explicit CW commands, or may include implicit CW update commands via SUL HARQ feedback (e.g., or in some cases via AUL HARQ feedback, depending on the configuration of the reference duration). The UE 115-*b* may decode the SUL HARQ feedback and/or the CW update command in the second partition.

At 825, the UE 115-*b* may, in cases where a CW command indicates such, update a CW based on the DFI. For example, a UE 115-*b* may reset a CW, double a CW, etc. based on the CW update information. The UE 115-*b* may perform, in the shared radio frequency spectrum band, a clear channel assessment procedure (e.g., an LBT procedure) within a CW based at least in part on the CW update command. In some cases, the clear channel assessment procedure may be performed prior to an AUL transmission at 830.

At 830, the UE 115-b may transmit one or more AUL and SUL transmissions based on the DFI. For example, the UE 115-b may retransmit one or more AUL CBGs corresponding to any NACKs received in DFI. Additionally or alternatively, UE 115-b may transmit new CBGs or new transport blocks (e.g., in cases transmissions at 810 are ACK' d).

Figure 9:
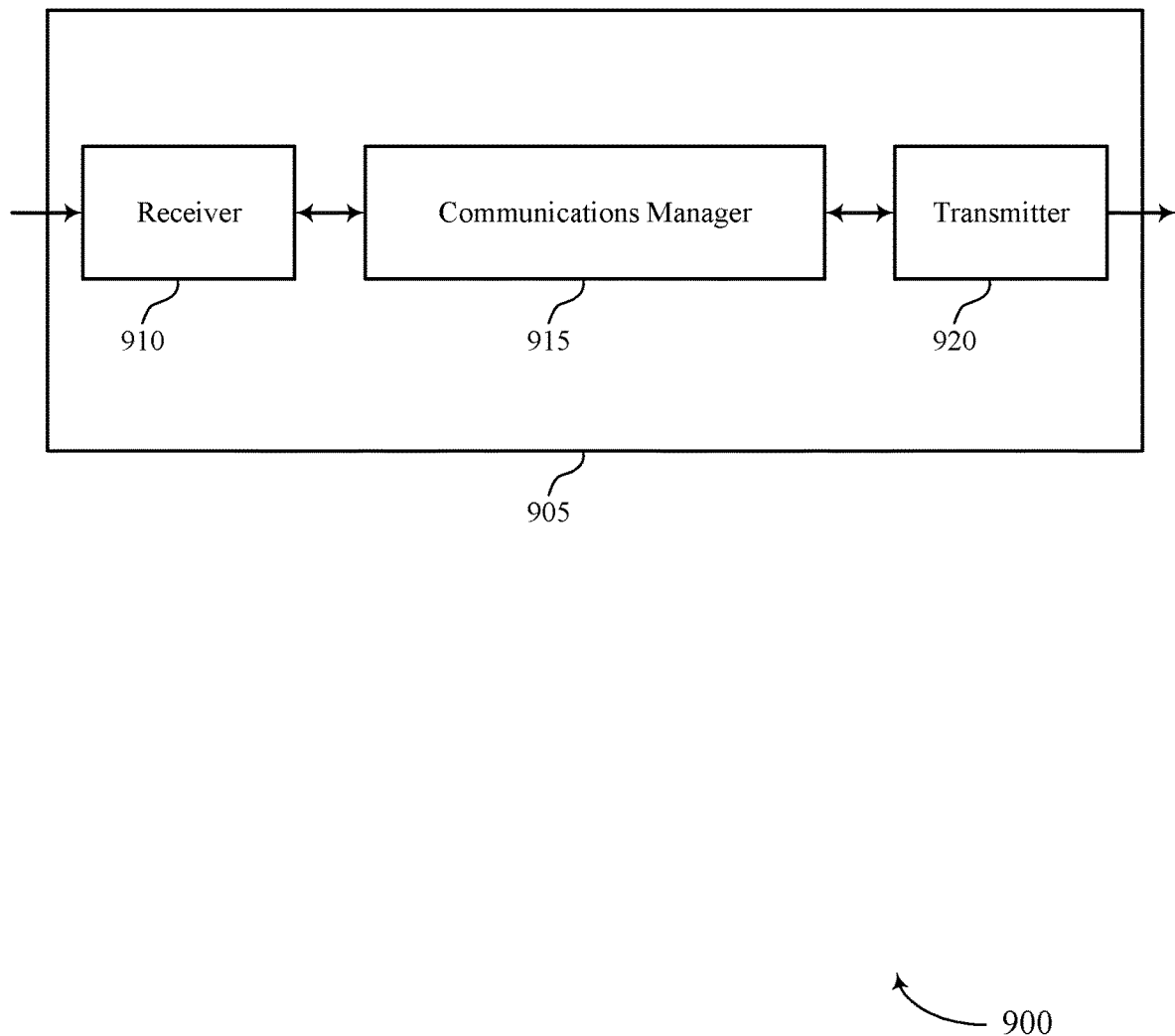
FIGS. 9 and 10 show block diagrams of devices that support partitioning of DFI bits in accordance with aspects of the present disclosure.

FIG. 9 shows a block diagram 900 of a device 905 that supports partitioning of DFI bits in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to partitioning of DFI bits, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a message that indicates a downlink feedback indication bit sequence is partitioned into a first bit partition and a second bit partition, a number of bits in the first bit partition being based on a number of autonomous uplink hybrid automatic repeat request processes of the UE, transmit, in a shared radio frequency spectrum band, an autonomous uplink transmission corresponding to at least one autonomous uplink hybrid automatic repeat request process of the number of autonomous uplink hybrid automatic repeat request processes, receive a feedback transmission including the downlink feedback indication bit sequence based on the autonomous uplink transmission, and decode feedback for the autonomous uplink transmission within the first bit partition of the downlink feedback indication bit sequence. The communications manager 915 may be an example of aspects of the communications manager 1210 described herein.

The communications manager 915, and/or at least some of its sub-components, may be implemented in hardware, code (e.g., software executed by a processor or firmware) executed by a processor, or any combination thereof. If implemented in software executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. The communications manager 915, and/or at least some of its sub-components, may be physically located at various positions, including being distributed such that portions of functions are implemented at different physical locations by one or more physical devices. In some examples, communications manager 915, and/or at least some of its sub-components, may be a separate and distinct component in accordance with various aspects of the present disclosure. In some examples, communications manager 915, and/or at least some of its sub-components, may be combined with one or more other hardware components, including but not limited to a receiver, a transmitter, a transceiver, one or more other components described in the present disclosure, or a combination thereof in accordance with various aspects of the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
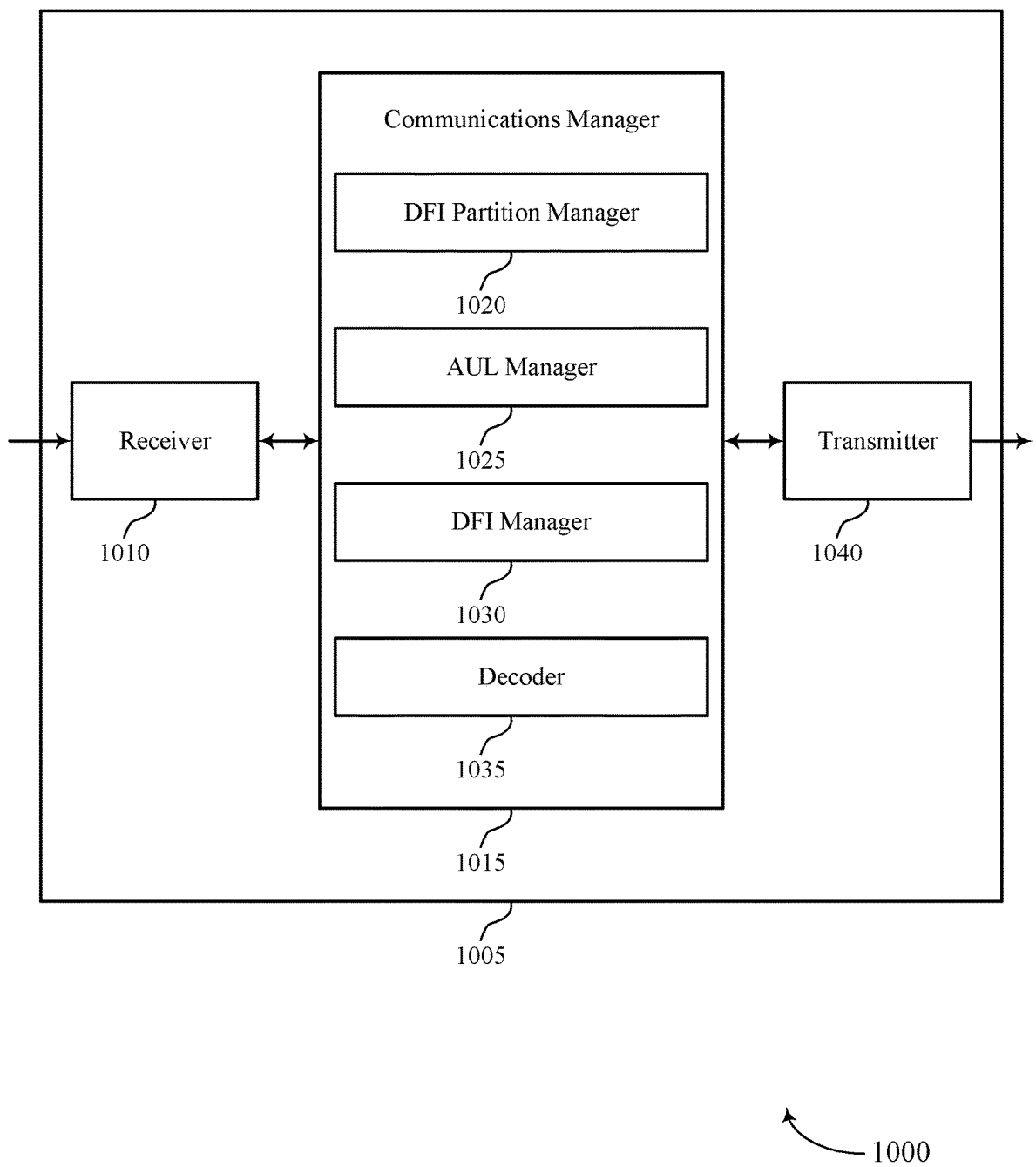

FIG. 10 shows a block diagram 1000 of a device 1005 that supports partitioning of DFI bits in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to partitioning of DFI bits, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a DFI partition manager 1020, an AUL manager 1025, a DFI manager 1030, and a decoder 1035. The communications manager 1015 may be an example of aspects of the communications manager 1210 described herein.

The DFI partition manager 1020 may receive a message that indicates a downlink feedback indication bit sequence is partitioned into a first bit partition and a second bit partition, a number of bits in the first bit partition being based on a number of autonomous uplink hybrid automatic repeat request processes of the UE.

The AUL manager 1025 may transmit, in a shared radio frequency spectrum band, an autonomous uplink transmission corresponding to at least one autonomous uplink hybrid automatic repeat request process of the number of autonomous uplink hybrid automatic repeat request processes.

The DFI manager 1030 may receive a feedback transmission including the downlink feedback indication bit sequence based on the autonomous uplink transmission.

The decoder 1035 may decode feedback for the autonomous uplink transmission within the first bit partition of the downlink feedback indication bit sequence.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
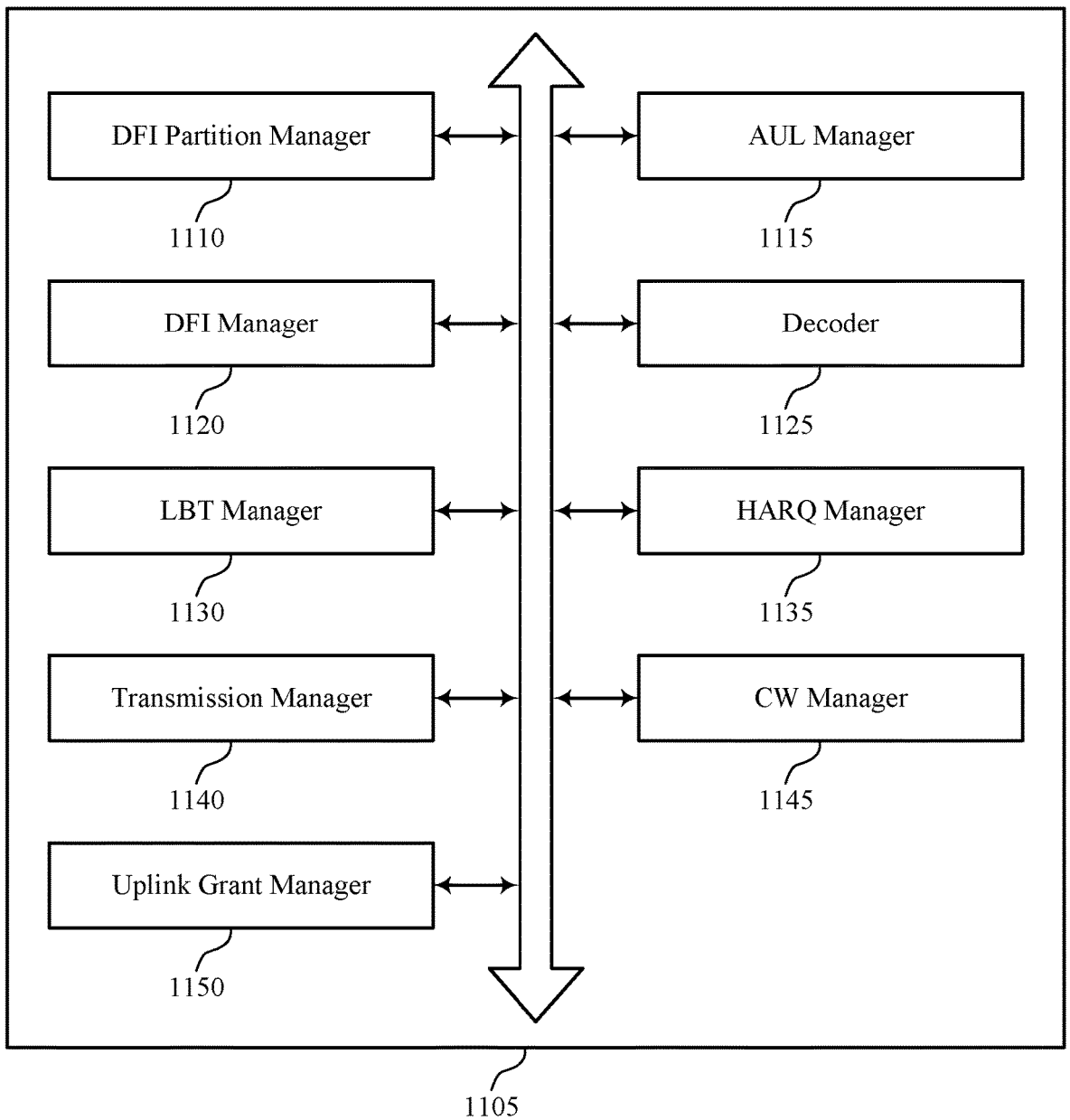
FIG. 11 shows a block diagram of a communications manager that supports partitioning of DFI bits in accordance with aspects of the present disclosure.

FIG. 11 shows a block diagram 1100 of a communications manager 1105 that supports partitioning of DFI bits in accordance with aspects of the present disclosure. The communications manager 1105 may be an example of aspects of a communications manager 915, a communications manager 1015, or a communications manager 1210 described herein. The communications manager 1105 may include a DFI partition manager 1110, an AUL manager 1115, a DFI manager 1120, a decoder 1125, a LBT manager 1130, a HARQ manager 1135, a transmission manager 1140, a CW manager 1145, and an uplink grant manager 1150. Each of these modules may communicate, directly or indirectly, with one another (e.g., via one or more buses).

The DFI partition manager 1110 may receive a message that indicates a downlink feedback indication bit sequence is partitioned into a first bit partition and a second bit partition, a number of bits in the first bit partition being based on a number of autonomous uplink hybrid automatic repeat request processes of the UE.

In some cases, the partitioning of the downlink feedback indication bit sequence into the first bit partition and the second bit partition is based on the second bit partition including a contention window update command based on at least a subset of code block groups within a first uplink hybrid automatic repeat request process of the UE passing error detection, a signal to interference plus noise ratio measurement of a transmission time interval that includes the transport block for the first uplink hybrid automatic repeat request process satisfying a threshold, a collision not being detected within the transmission time interval that includes the first uplink hybrid automatic repeat request process, or any combination thereof.

In some cases, the second bit partition includes a single bit for the contention window update command that indicates a same update to a respective contention window within each sub-band of a set of sub-bands in the shared radio frequency spectrum band. In some cases, the second bit partition includes a set of bits for the contention window update command, each bit of the set of bits indicating an update to a contention window within a respective sub-band of a set of sub-bands in the shared radio frequency spectrum band.

In some cases, the second bit partition includes a set of bits for the contention window update command, each bit of the set of bits indicating an update to a contention window within a respective sub-band group of a set of sub-band groups in the shared radio frequency spectrum band. In some cases, the partitioning of the downlink feedback indication bit sequence into the first bit partition and the second bit partition is based on a number of scheduled uplink hybrid automatic repeat request processes of the UE.

In some cases, the partitioning of the downlink feedback indication bit sequence into the first bit partition and the second bit partition is based on a number of operating sub-bands in the shared radio frequency spectrum band. In some cases, the partitioning of the downlink feedback indication bit sequence into the first bit partition and the second bit partition is based on the second bit partition including a single bit for each scheduled uplink hybrid automatic repeat request process of the UE.

In some cases, the partitioning of the downlink feedback indication bit sequence into the first bit partition and the second bit partition is based on the second bit partition including a contention window update command. In some cases, the partitioning of the downlink feedback indication bit sequence into the first bit partition and the second bit partition is based on whether a grant for retransmitting the autonomous uplink transmission is within scheduled uplink resource. In some cases, the partitioning of the downlink feedback indication bit sequence into the first bit partition and the second bit partition is based on the first bit partition including a set of bits for each autonomous uplink hybrid automatic repeat request process of the UE and the second bit partition including a single bit for each scheduled uplink hybrid automatic repeat request process of the UE.

In some cases, the partitioning of the downlink feedback indication bit sequence into the first bit partition and the second bit partition is based on the first bit partition including a single bit for transport block level feedback for a first subset of autonomous uplink hybrid automatic repeat request processes of the UE and a set of bits for code block group level feedback or code block level feedback for a second subset of autonomous uplink hybrid automatic repeat request processes of the UE.

In some cases, the partitioning of the downlink feedback indication bit sequence into the first bit partition and the second bit partition is based on the first bit partition including a set of bits for each autonomous uplink hybrid automatic repeat request process of the UE and the second bit partition including a single bit or two bits for a contention window update command. In some cases, the partitioning of the downlink feedback indication bit sequence into the first bit partition and the second bit partition is based on the second bit partition including a single bit for feedback for each scheduled uplink hybrid automatic repeat request process of the UE.

In some cases, a first feedback for a first scheduled uplink hybrid automatic repeat request process of the UE includes one of an acknowledgement or a negative acknowledgment based on whether at least a subset of code block groups within the first scheduled uplink hybrid automatic repeat request process passes error detection. In some cases, a first feedback for a first scheduled uplink hybrid automatic repeat request process of the UE includes one of an acknowledgement or a negative acknowledgment based on whether a signal to interference plus noise ratio measurement of a transmission time interval that includes a transport block for the first scheduled uplink hybrid automatic repeat request process satisfies a threshold. In some cases, a first feedback for a first scheduled uplink hybrid automatic repeat request process of the UE includes one of an acknowledgement or a negative acknowledgment based on whether a collision is detected within a transmission time interval that includes the first scheduled uplink hybrid automatic repeat request process.

The AUL manager 1115 may transmit, in a shared radio frequency spectrum band, an autonomous uplink transmission corresponding to at least one autonomous uplink hybrid automatic repeat request process of the number of autonomous uplink hybrid automatic repeat request processes.

The DFI manager 1120 may receive a feedback transmission including the downlink feedback indication bit sequence based on the autonomous uplink transmission. In some examples, the DFI manager 1120 may receive a second feedback transmission including a second downlink feedback indication bit sequence based on the retransmitted autonomous uplink transmission.

The decoder 1125 may decode feedback for the autonomous uplink transmission within the first bit partition of the downlink feedback indication bit sequence. In some examples, the decoder 1125 may decode feedback for each scheduled uplink hybrid automatic repeat request process of the UE within the second bit partition of the downlink feedback indication bit sequence. In some examples, the decoder 1125 may decode a contention window update command within the second bit partition of the downlink feedback indication bit sequence. In some examples, the decoder 1125 may decode feedback for the retransmitted autonomous uplink transmission within the first bit partition of the second downlink feedback indication bit sequence. In some cases, the contention window update command indicates to reset a contention window to a defined duration or to modify a duration of the contention window.

The LBT manager 1130 may perform, in the shared radio frequency spectrum band, a clear channel assessment procedure within a contention window based on the contention window update command.

The HARQ manager 1135 may retransmit the autonomous uplink transmission or transmitting a second autonomous uplink transmission in the shared radio frequency spectrum band based on a result of the channel assessment procedure and the feedback for the autonomous uplink transmission. In some examples, the HARQ manager 1135 may retransmit the autonomous uplink transmission within the scheduled uplink resource.

The transmission manager 1140 may transmit a first uplink transmission.

The CW manager 1145 may update a duration of a contention window in accordance with the contention window update command based on a duration between the first uplink transmission and receipt of the downlink feedback indication bit sequence for the first uplink transmission satisfying a threshold. In some cases, the threshold is semi-statically obtained from radio resource control programming or explicitly obtained from the second bit partition of the downlink feedback indication bit sequence.

The uplink grant manager 1150 may receive a grant for retransmitting the autonomous uplink transmission within a scheduled uplink resource.

Figure 12:
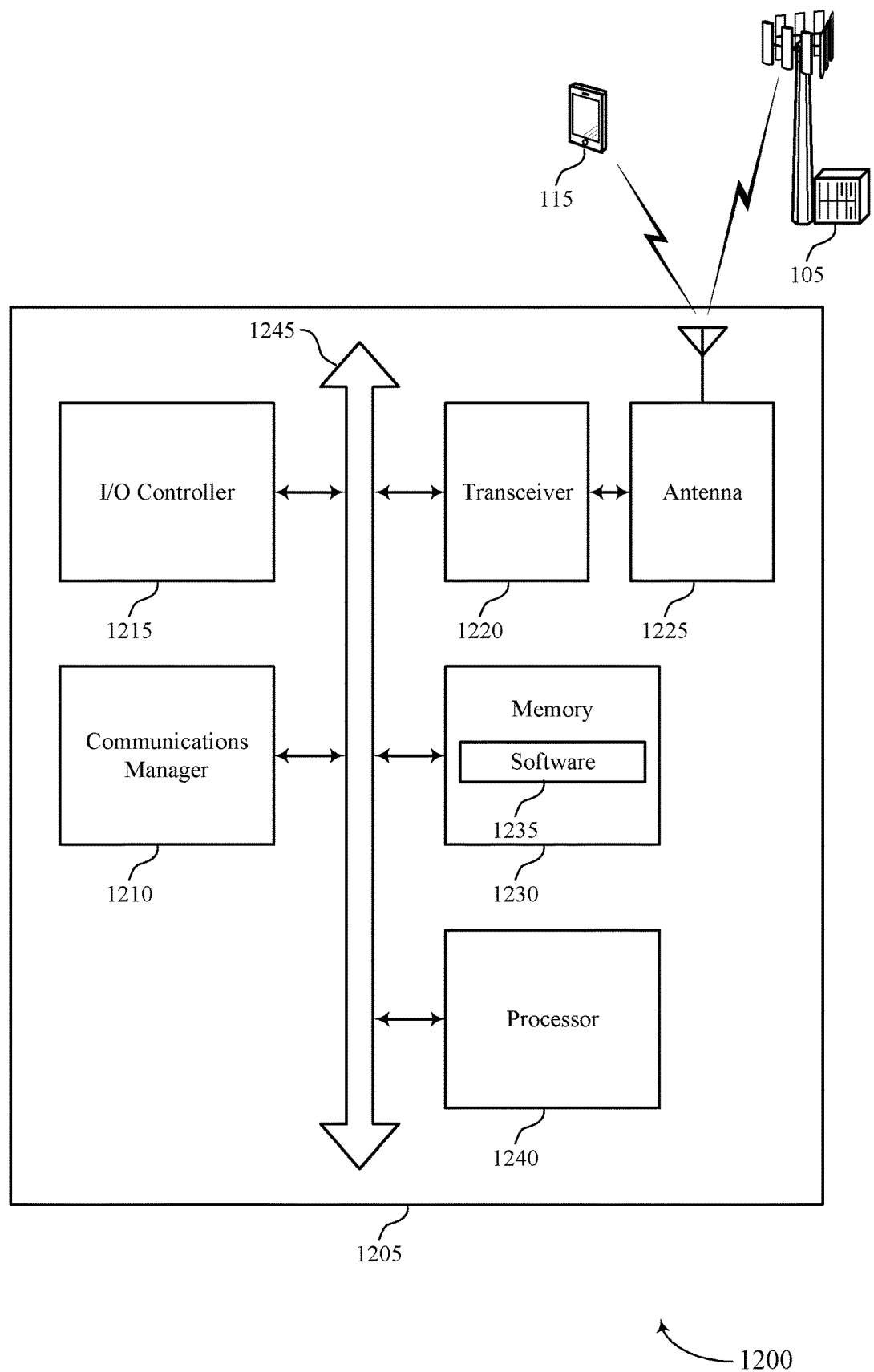
FIG. 12 shows a diagram of a system including a device that supports partitioning of DFI bits in accordance with aspects of the present disclosure.

FIG. 12 shows a diagram of a system 1200 including a device 1205 that supports partitioning of DFI bits in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive a message that indicates a downlink feedback indication bit sequence is partitioned into a first bit partition and a second bit partition, a number of bits in the first bit partition being based on a number of autonomous uplink hybrid automatic repeat request processes of the UE, transmit, in a shared radio frequency spectrum band, an autonomous uplink transmission corresponding to at least one autonomous uplink hybrid automatic repeat request process of the number of autonomous uplink hybrid automatic repeat request processes, receive a feedback transmission including the downlink feedback indication bit sequence based on the autonomous uplink transmission, and decode feedback for the autonomous uplink transmission within the first bit partition of the downlink feedback indication bit sequence.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code or software 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting partitioning of DFI bits).

The software 1235 may include instructions to implement aspects of the present disclosure, including instructions to support wireless communications. The software 1235 may be stored in a non-transitory computer-readable medium such as system memory or other type of memory. In some cases, the software 1235 may not be directly executable by the processor 1240 but may cause a computer (e.g., when compiled and executed) to perform functions described herein.

Figure 13:
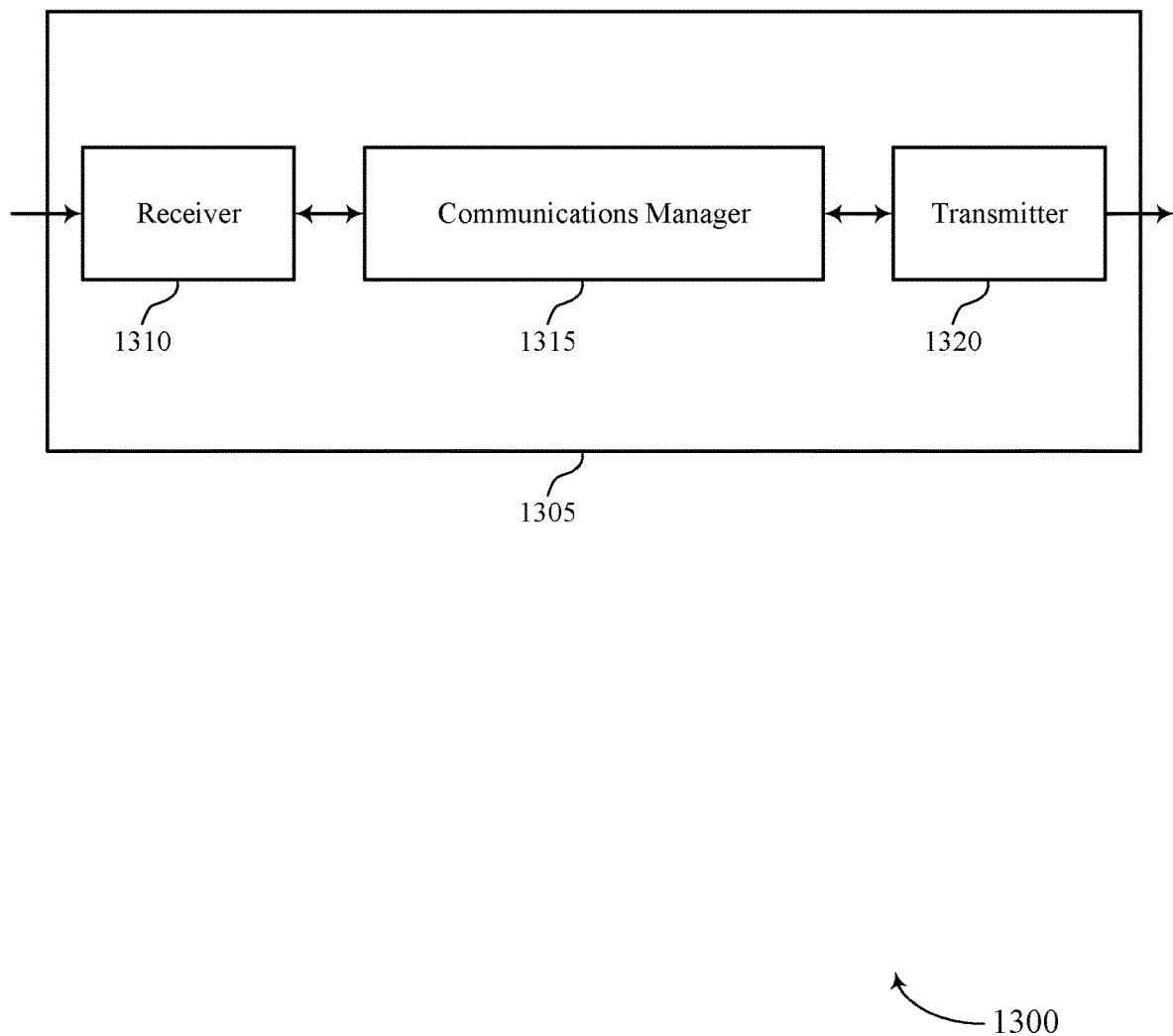
FIGS. 13 and 14 show block diagrams of devices that support partitioning of DFI bits in accordance with aspects of the present disclosure.

FIG. 13 shows a block diagram 1300 of a device 1305 that supports partitioning of DFI bits in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to partitioning of DFI bits, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit a message that indicates a downlink feedback indication bit sequence is partitioned into a first bit partition and a second bit partition, a number of bits in the first bit partition being based on a number of autonomous uplink hybrid automatic repeat request processes of a UE, monitor, in a shared radio frequency spectrum band, for an autonomous uplink transmission corresponding to at least one autonomous uplink hybrid automatic repeat request process of the number of autonomous uplink hybrid automatic repeat request processes, and transmit a feedback transmission including the downlink feedback indication bit sequence based on monitoring for the autonomous uplink transmission. The communications manager 1315 may be an example of aspects of the communications manager 1610 described herein.

The communications manager 1315, and/or at least some of its sub-components, may be implemented in hardware, code (e.g., software executed by a processor or firmware) executed by a processor, or any combination thereof. If implemented in software executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. The communications manager 1315, and/or at least some of its sub-components, may be physically located at various positions, including being distributed such that portions of functions are implemented at different physical locations by one or more physical devices. In some examples, communications manager 1315, and/or at least some of its sub-components, may be a separate and distinct component in accordance with various aspects of the present disclosure. In some examples, communications manager 1315, and/or at least some of its sub-components, may be combined with one or more other hardware components, including but not limited to a receiver, a transmitter, a transceiver, one or more other components described in the present disclosure, or a combination thereof in accordance with various aspects of the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
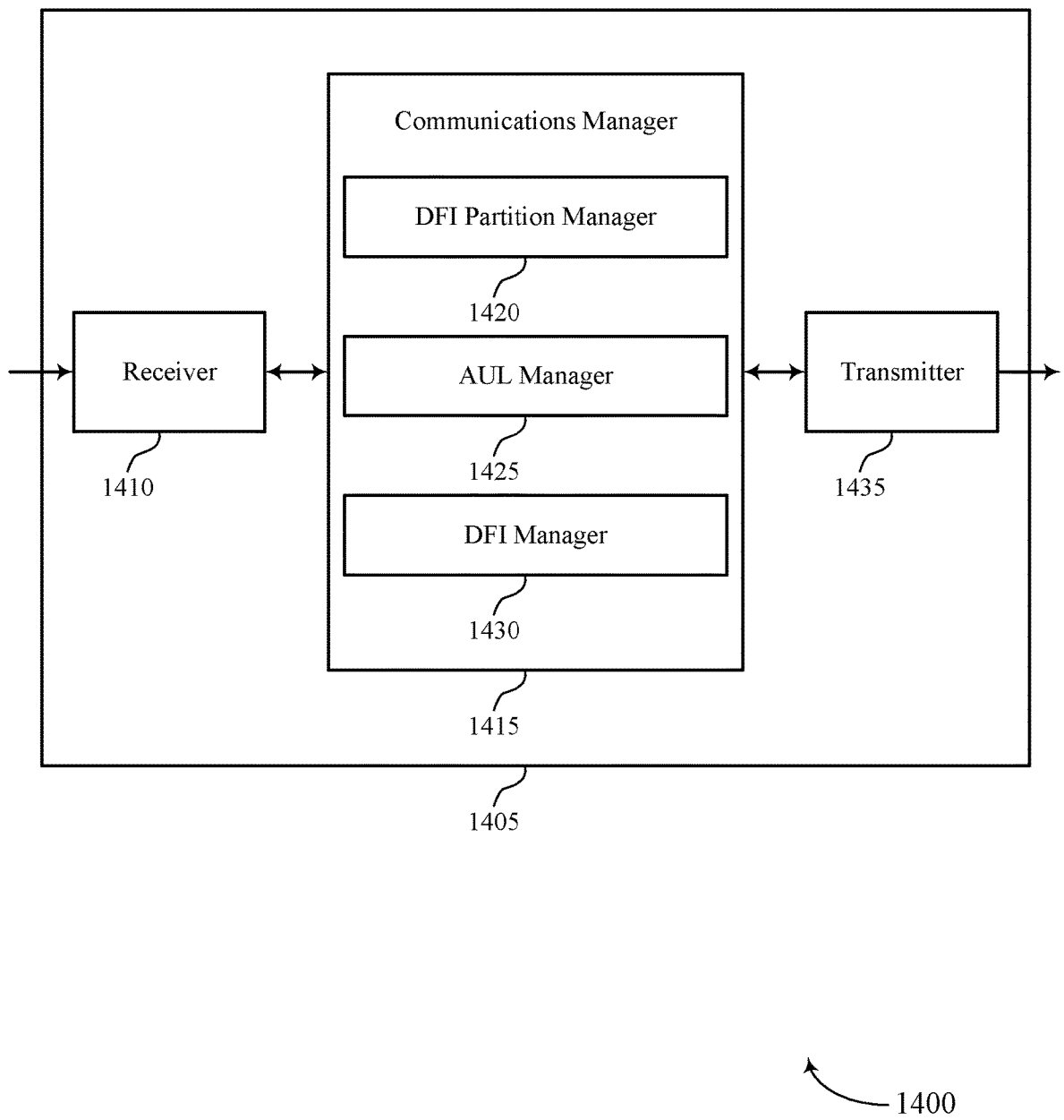

FIG. 14 shows a block diagram 1400 of a device 1405 that supports partitioning of DFI bits in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to partitioning of DFI bits, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a DFI partition manager 1420, an AUL manager 1425, and a DFI manager 1430. The communications manager 1415 may be an example of aspects of the communications manager 1610 described herein.

The DFI partition manager 1420 may transmit a message that indicates a downlink feedback indication bit sequence is partitioned into a first bit partition and a second bit partition, a number of bits in the first bit partition being based on a number of autonomous uplink hybrid automatic repeat request processes of a UE.

The AUL manager 1425 may monitor, in a shared radio frequency spectrum band, for an autonomous uplink transmission corresponding to at least one autonomous uplink hybrid automatic repeat request process of the number of autonomous uplink hybrid automatic repeat request processes.

The DFI manager 1430 may transmit a feedback transmission including the downlink feedback indication bit sequence based on monitoring for the autonomous uplink transmission.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
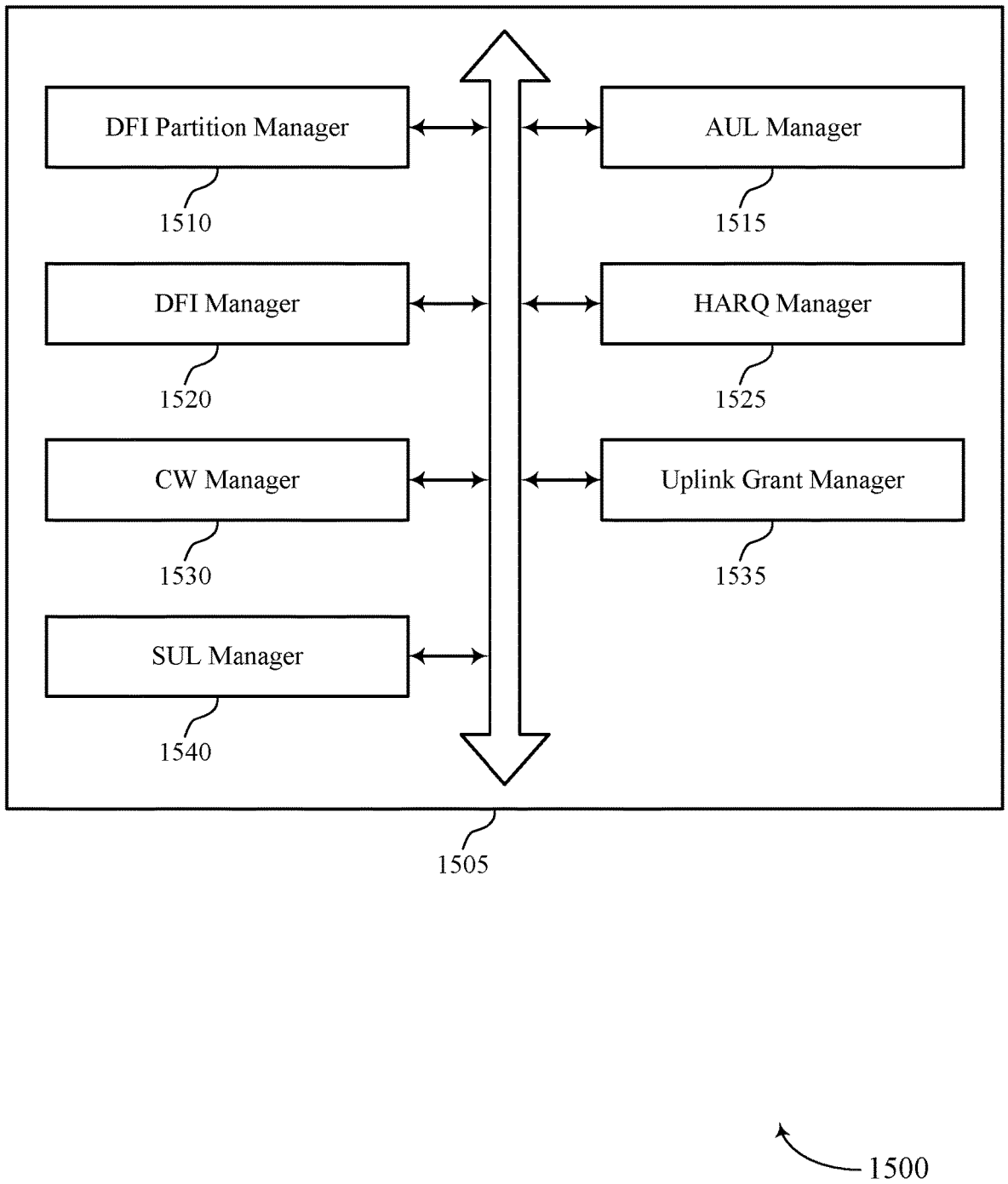
FIG. 15 shows a block diagram of a communications manager that supports partitioning of DFI bits in accordance with aspects of the present disclosure.

FIG. 15 shows a block diagram 1500 of a communications manager 1505 that supports partitioning of DFI bits in accordance with aspects of the present disclosure. The communications manager 1505 may be an example of aspects of a communications manager 1315, a communications manager 1415, or a communications manager 1610 described herein. The communications manager 1505 may include a DFI partition manager 1510, an AUL manager 1515, a DFI manager 1520, a HARQ manager 1525, a CW manager 1530, an uplink grant manager 1535, and a SUL manager 1540. Each of these modules may communicate, directly or indirectly, with one another (e.g., via one or more buses).

The DFI partition manager 1510 may transmit a message that indicates a downlink feedback indication bit sequence is partitioned into a first bit partition and a second bit partition, a number of bits in the first bit partition being based on a number of autonomous uplink hybrid automatic repeat request processes of a UE.

In some examples, the DFI partition manager 1510 may partition the downlink feedback indication bit sequence into the first bit partition and the second bit partition based on the second bit partition including a contention window update command based on at least a subset of code block groups within a first uplink hybrid automatic repeat request process of the UE passing error detection, a signal to interference plus noise ratio measurement of a transmission time interval that includes the transport block for the first scheduled uplink hybrid automatic repeat request process satisfying a threshold, a collision not being detected within the transmission time interval that includes the first uplink hybrid automatic repeat request process, or any combination thereof.

In some examples, the DFI partition manager 1510 may partition the downlink feedback indication bit sequence into the first bit partition and the second bit partition based on a number of scheduled uplink hybrid automatic repeat request processes of the UE. In some examples, the DFI partition manager 1510 may partition the downlink feedback indication bit sequence into the first bit partition and the second bit partition based on a number of operating sub-bands in the shared radio frequency spectrum band. In some examples, the DFI partition manager 1510 may partition the downlink feedback indication bit sequence into the first bit partition and the second bit partition based on the second bit partition including a single bit for each scheduled uplink hybrid automatic repeat request process of the UE.

In some examples, the DFI partition manager 1510 may partition the downlink feedback indication bit sequence into the first bit partition and the second bit partition based on the second bit partition including a contention window update command. In some examples, the DFI partition manager 1510 may partition of the downlink feedback indication bit sequence into the first bit partition and the second bit partition based on whether a grant for retransmitting the autonomous uplink transmission is within scheduled uplink resource. In some examples, the DFI partition manager 1510 may partition the downlink feedback indication bit sequence into the first bit partition and the second bit partition based on the first bit partition including a set of bits for each autonomous uplink hybrid automatic repeat request process of the UE and the second bit partition including a single bit for each scheduled uplink hybrid automatic repeat request process of the UE.

In some examples, the DFI partition manager 1510 may partition the downlink feedback indication bit sequence into the first bit partition and the second bit partition based on the first bit partition including a single bit for transport block level feedback for a first subset of autonomous uplink hybrid automatic repeat request processes of the UE and a set of bits for code block group level feedback or code block level feedback for a second subset of autonomous uplink hybrid automatic repeat request processes of the UE. In some examples, the DFI partition manager 1510 may partition the downlink feedback indication bit sequence into the first bit partition and the second bit partition based on the first bit partition including a set of bits for each autonomous uplink hybrid automatic repeat request process of the UE and the second bit partition including a single bit or two bits for a contention window update command.

In some examples, the DFI partition manager 1510 may partition the downlink feedback indication bit sequence into the first bit partition and the second bit partition based on the second bit partition including a single bit for feedback for each scheduled uplink hybrid automatic repeat request process of the UE. In some cases, the second bit partition includes a single bit for the contention window update command that indicates a same update to a respective contention window within each sub-band of a set of sub-bands in the shared radio frequency spectrum band. In some cases, the second bit partition includes a set of bits for the contention window update command, each bit of the set of bits indicating an update to a contention window within a respective sub-band of a set of sub-bands in the shared radio frequency spectrum band.

In some cases, the second bit partition includes a set of bits for the contention window update command, each bit of the set of bits indicating an update to a contention window within a respective sub-band group of a set of sub-band groups in the shared radio frequency spectrum band. In some cases, a first feedback for a first scheduled uplink hybrid automatic repeat request process of the UE includes one of an acknowledgement or a negative acknowledgment based on whether at least a subset of code block groups within the first scheduled uplink hybrid automatic repeat request process passes error detection.

In some cases, a first feedback for a first scheduled uplink hybrid automatic repeat request process of the UE includes one of an acknowledgement or a negative acknowledgment based on whether a signal to interference plus noise ratio measurement of a transmission time interval that includes the first scheduled uplink hybrid automatic repeat request process satisfies a threshold. In some cases, a first feedback for a first scheduled uplink hybrid automatic repeat request process of the UE includes one of an acknowledgement or a negative acknowledgment based on whether a collision is detected within a transmission time interval that includes the first scheduled uplink hybrid automatic repeat request process. In some cases, the second bit partition of the downlink feedback indication bit sequence includes a threshold for a duration between the autonomous uplink transmission and the feedback transmission including the downlink feedback indication bit sequence, where valid information in the downlink feedback indication bit sequence is based on the threshold for the duration.

The AUL manager 1515 may monitor, in a shared radio frequency spectrum band, for an autonomous uplink transmission corresponding to at least one autonomous uplink hybrid automatic repeat request process of the number of autonomous uplink hybrid automatic repeat request processes.

The DFI manager 1520 may transmit a feedback transmission including the downlink feedback indication bit sequence based on monitoring for the autonomous uplink transmission. In some examples, the DFI manager 1520 may transmit a threshold for a duration between the autonomous uplink transmission and the feedback transmission including the downlink feedback indication bit sequence via radio resource control signaling, where valid information in the downlink feedback indication bit sequence is based on the threshold for the duration.

The HARQ manager 1525 may generate feedback for each autonomous uplink hybrid automatic repeat request process of the UE within the first bit partition of the downlink feedback indication bit sequence. In some examples, the HARQ manager 1525 may monitor for a retransmission of the autonomous uplink transmission or a second autonomous uplink transmission in the shared radio frequency spectrum band based on the feedback included in the first partition of the downlink feedback indication bit sequence. In some examples, the HARQ manager 1525 may generate feedback for each scheduled uplink hybrid automatic repeat request process of the UE within the second bit partition of the downlink feedback indication bit sequence. In some examples, the HARQ manager 1525 may transmit a second feedback transmission including a second downlink feedback indication bit sequence based on monitoring for the retransmission of the autonomous uplink transmission.

The CW manager 1530 may generate a contention window update command within the second bit partition of the downlink feedback indication bit sequence. In some cases, the contention window update command indicates to reset a contention window to a defined duration or to modify a duration of the contention window.

The uplink grant manager 1535 may transmit a grant for retransmitting the autonomous uplink transmission within a scheduled uplink resource.

The SUL manager 1540 may monitor for a retransmission of the autonomous uplink transmission within the scheduled uplink resource.

Figure 16:
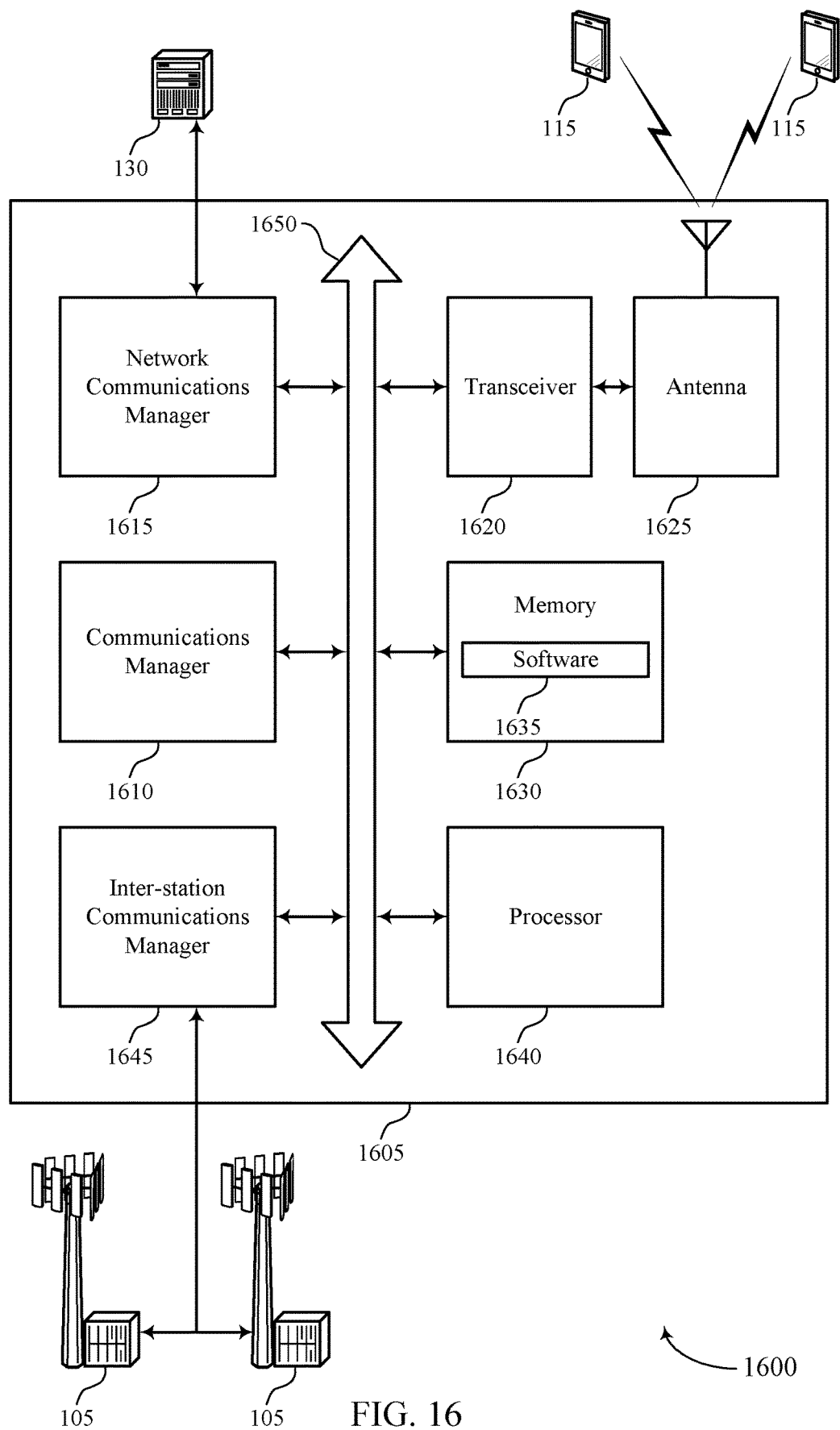
FIG. 16 shows a diagram of a system including a device that supports partitioning of DFI bits in accordance with aspects of the present disclosure.

FIG. 16 shows a diagram of a system 1600 including a device 1605 that supports partitioning of DFI bits in accordance with aspects of the present disclosure. The device 1605 may be an example of or include the components of device 1305, device 1405, or a base station 105 as described herein. The device 1605 may include components for bidirectional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit a message that indicates a downlink feedback indication bit sequence is partitioned into a first bit partition and a second bit partition, a number of bits in the first bit partition being based on a number of autonomous uplink hybrid automatic repeat request processes of a UE, monitor, in a shared radio frequency spectrum band, for an autonomous uplink transmission corresponding to at least one autonomous uplink hybrid automatic repeat request process of the number of autonomous uplink hybrid automatic repeat request processes, and transmit a feedback transmission including the downlink feedback indication bit sequence based on monitoring for the autonomous uplink transmission.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code or software 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting partitioning of DFI bits).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The software 1635 may include instructions to implement aspects of the present disclosure, including instructions to support wireless communications. The software 1635 may be stored in a non-transitory computer-readable medium such as system memory or other type of memory. In some cases, the software 1635 may not be directly executable by the processor 1640 but may cause a computer (e.g., when compiled and executed) to perform functions described herein.

Figure 17:
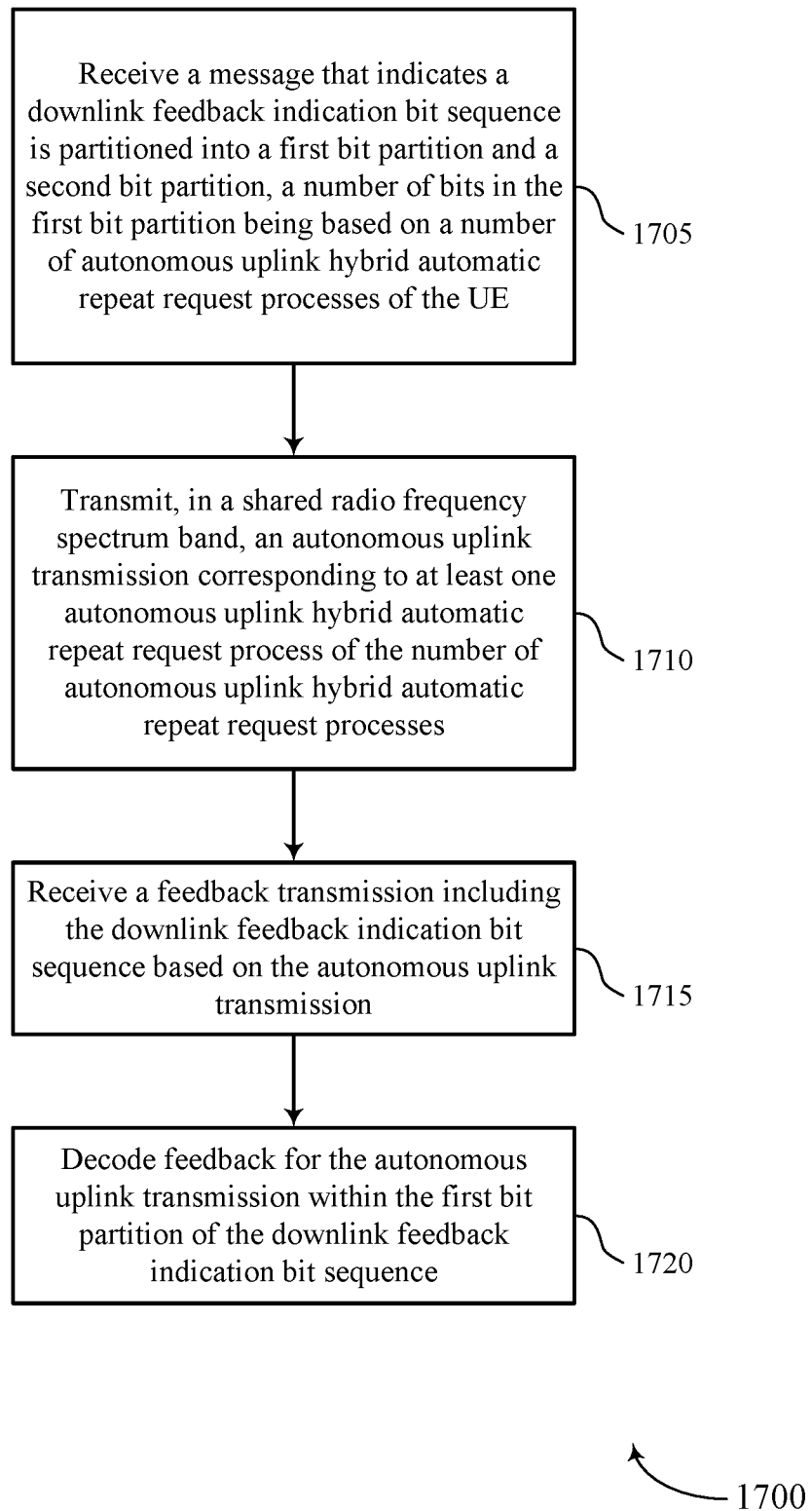
FIGS. 17 through 22 show flowcharts illustrating methods that support partitioning of DFI bits in accordance with aspects of the present disclosure.

FIG. 17 shows a flowchart illustrating a method 1700 that supports partitioning of DFI bits in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive a message that indicates a downlink feedback indication bit sequence is partitioned into a first bit partition and a second bit partition, a number of bits in the first bit partition being based on a number of autonomous uplink hybrid automatic repeat request processes of the UE. The operations of 1705 may be performed according to the methods described herein. In some examples, aspects of the operations of 1705 may be performed by a DFI partition manager as described with reference to FIGS. 9 through 12.

At 1710, the UE may transmit, in a shared radio frequency spectrum band, an autonomous uplink transmission corresponding to at least one autonomous uplink hybrid automatic repeat request process of the number of autonomous uplink hybrid automatic repeat request processes. The operations of 1710 may be performed according to the methods described herein. In some examples, aspects of the operations of 1710 may be performed by an AUL manager as described with reference to FIGS. 9 through 12.

At 1715, the UE may receive a feedback transmission including the downlink feedback indication bit sequence based on the autonomous uplink transmission. The operations of 1715 may be performed according to the methods described herein. In some examples, aspects of the operations of 1715 may be performed by a DFI manager as described with reference to FIGS. 9 through 12.

At 1720, the UE may decode feedback for the autonomous uplink transmission within the first bit partition of the downlink feedback indication bit sequence. The operations of 1720 may be performed according to the methods described herein. In some examples, aspects of the operations of 1720 may be performed by a decoder as described with reference to FIGS. 9 through 12.

Figure 18:
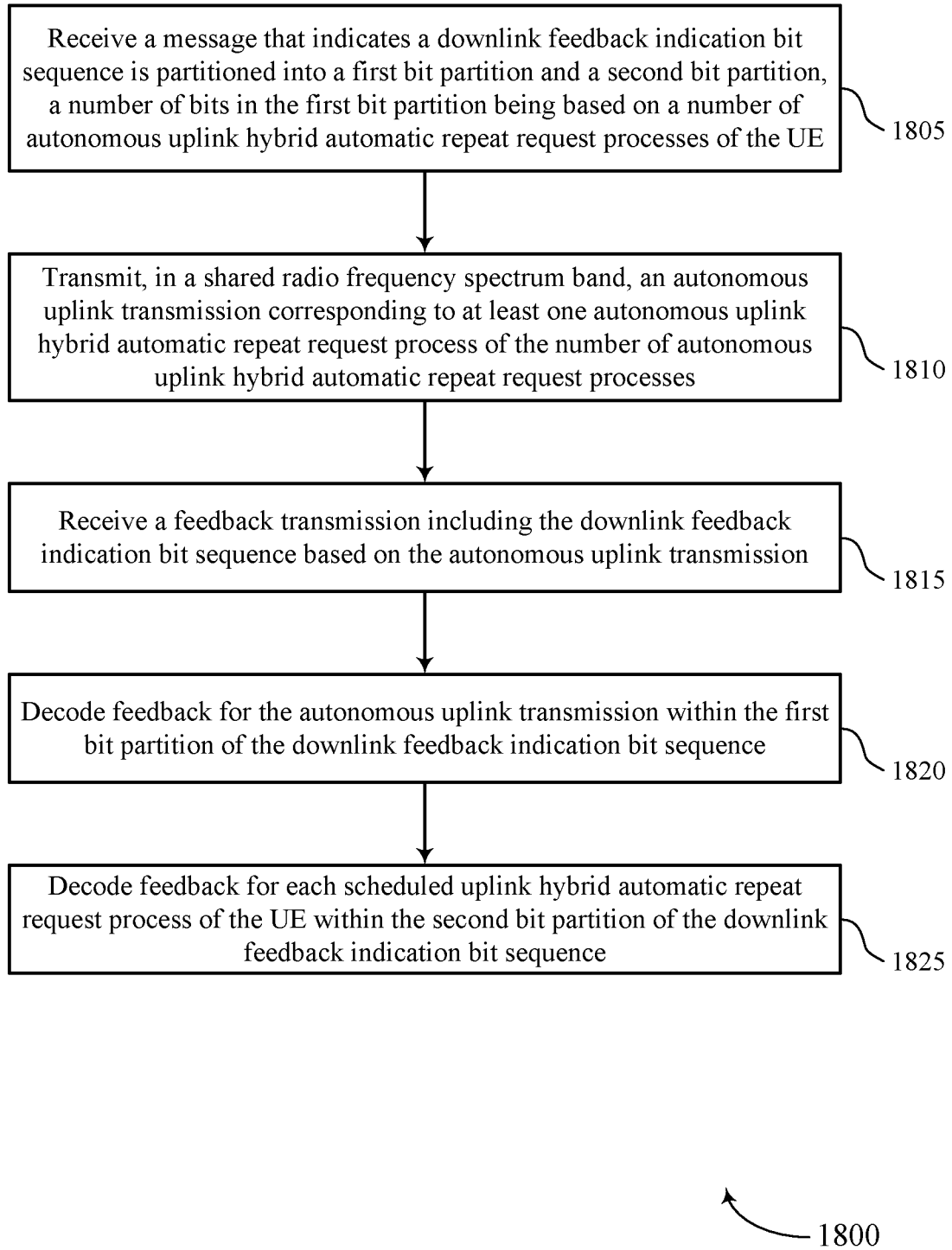

FIG. 18 shows a flowchart illustrating a method 1800 that supports partitioning of DFI bits in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive a message that indicates a downlink feedback indication bit sequence is partitioned into a first bit partition and a second bit partition, a number of bits in the first bit partition being based on a number of autonomous uplink hybrid automatic repeat request processes of the UE. The operations of 1805 may be performed according to the methods described herein. In some examples, aspects of the operations of 1805 may be performed by a DFI partition manager as described with reference to FIGS. 9 through 12.

At 1810, the UE may transmit, in a shared radio frequency spectrum band, an autonomous uplink transmission corresponding to at least one autonomous uplink hybrid automatic repeat request process of the number of autonomous uplink hybrid automatic repeat request processes. The operations of 1810 may be performed according to the methods described herein. In some examples, aspects of the operations of 1810 may be performed by an AUL manager as described with reference to FIGS. 9 through 12.

At 1815, the UE may receive a feedback transmission including the downlink feedback indication bit sequence based on the autonomous uplink transmission. The operations of 1815 may be performed according to the methods described herein. In some examples, aspects of the operations of 1815 may be performed by a DFI manager as described with reference to FIGS. 9 through 12.

At 1820, the UE may decode feedback for the autonomous uplink transmission within the first bit partition of the downlink feedback indication bit sequence. The operations of 1820 may be performed according to the methods described herein. In some examples, aspects of the operations of 1820 may be performed by a decoder as described with reference to FIGS. 9 through 12.

At 1825, the UE may decode feedback for each scheduled uplink hybrid automatic repeat request process of the UE within the second bit partition of the downlink feedback indication bit sequence. The operations of 1825 may be performed according to the methods described herein. In some examples, aspects of the operations of 1825 may be performed by a decoder as described with reference to FIGS. 9 through 12.

Figure 19:
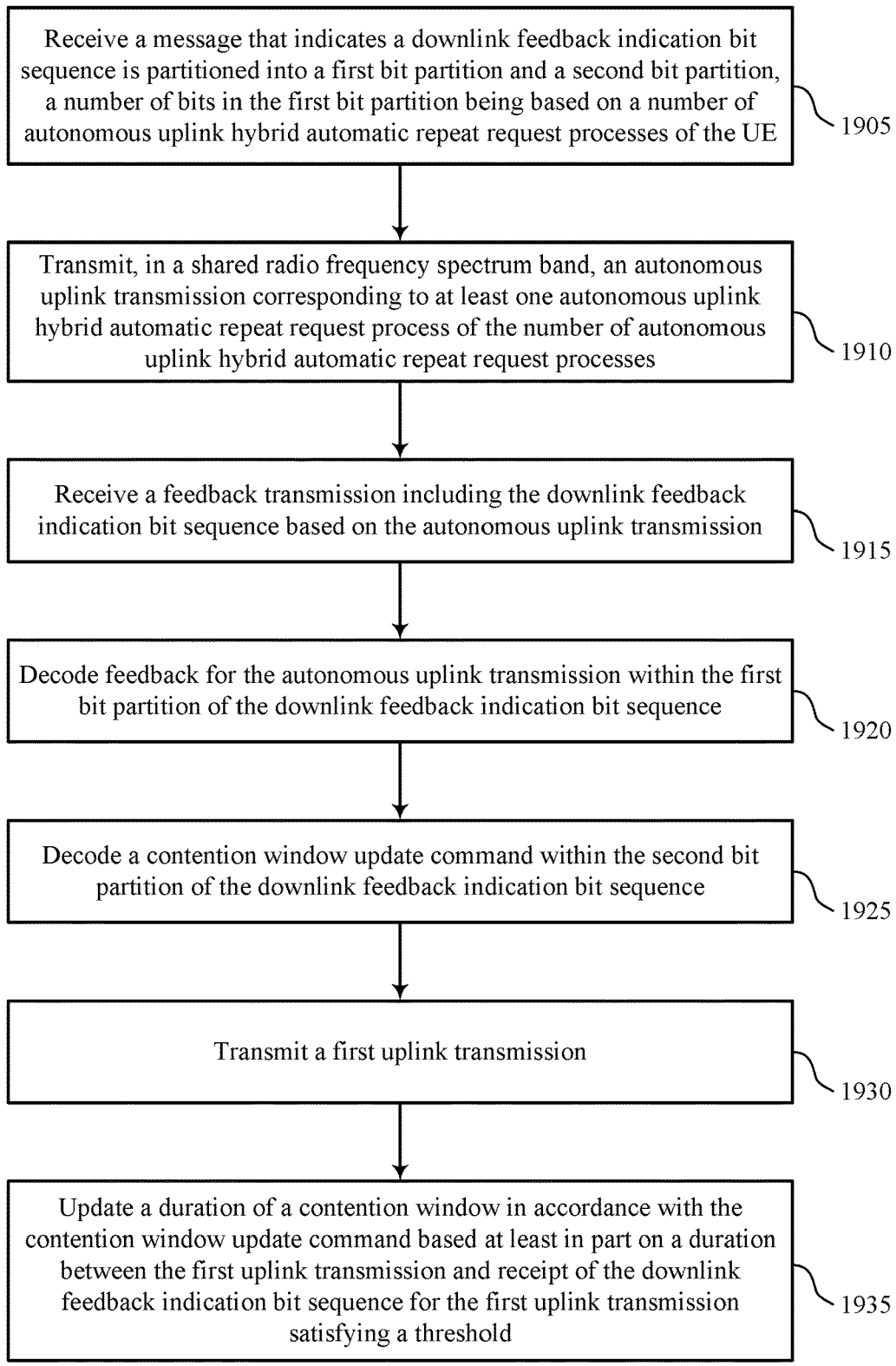

FIG. 19 shows a flowchart illustrating a method 1900 that supports partitioning of DFI bits in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive a message that indicates a downlink feedback indication bit sequence is partitioned into a first bit partition and a second bit partition, a number of bits in the first bit partition being based on a number of autonomous uplink hybrid automatic repeat request processes of the UE. The operations of 1905 may be performed according to the methods described herein. In some examples, aspects of the operations of 1905 may be performed by a DFI partition manager as described with reference to FIGS. 9 through 12.

At 1910, the UE may transmit, in a shared radio frequency spectrum band, an autonomous uplink transmission corresponding to at least one autonomous uplink hybrid automatic repeat request process of the number of autonomous uplink hybrid automatic repeat request processes. The operations of 1910 may be performed according to the methods described herein. In some examples, aspects of the operations of 1910 may be performed by an AUL manager as described with reference to FIGS. 9 through 12.

At 1915, the UE may receive a feedback transmission including the downlink feedback indication bit sequence based on the autonomous uplink transmission. The operations of 1915 may be performed according to the methods described herein. In some examples, aspects of the operations of 1915 may be performed by a DFI manager as described with reference to FIGS. 9 through 12.

At 1920, the UE may decode feedback for the autonomous uplink transmission within the first bit partition of the downlink feedback indication bit sequence. The operations of 1920 may be performed according to the methods described herein. In some examples, aspects of the operations of 1920 may be performed by a decoder as described with reference to FIGS. 9 through 12.

At 1925, the UE may decode a contention window update command within the second bit partition of the downlink feedback indication bit sequence. The operations of 1925 may be performed according to the methods described herein. In some examples, aspects of the operations of 1925 may be performed by a decoder as described with reference to FIGS. 9 through 12.

At 1930, the UE may transmit a first uplink transmission. For example, in some cases, the UE may perform, in the shared radio frequency spectrum band, a clear channel assessment procedure within a contention window based on the contention window update command, and transmit the first uplink transmission based on the clear channel assessment procedure. The operations of 1930 may be performed according to the methods described herein. In some examples, aspects of the operations of 1930 may be performed by a LBT manager as described with reference to FIGS. 9 through 12.

At 1935, the UE may update a duration of a contention window in accordance with the contention window update command based at least in part on a duration between the first uplink transmission and receipt of the downlink feedback indication bit sequence for the first uplink transmission satisfying a threshold. In some cases, the threshold is semi-statically obtained from radio resource control programming (e.g., the threshold or minimum duration between the first uplink transmission and receipt of the downlink feedback indication bit sequence for the first uplink transmission may be RRC configured). The operations of 1935 may be performed according to the methods described herein. In some examples, aspects of the operations of 1935 may be performed by an AUL manager as described with reference to FIGS. 9 through 12.

Figure 20:
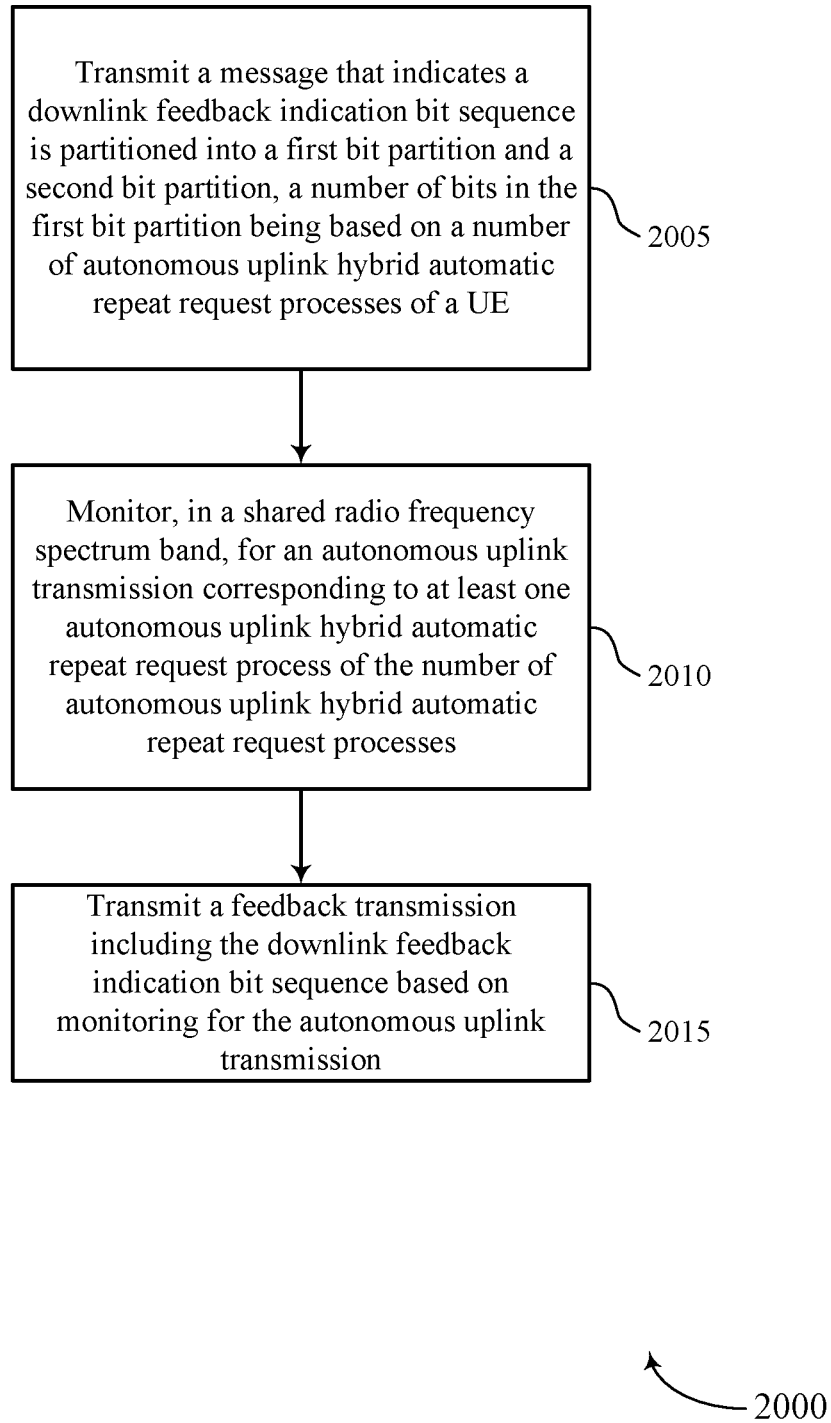

FIG. 20 shows a flowchart illustrating a method 2000 that supports partitioning of DFI bits in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may transmit a message that indicates a downlink feedback indication bit sequence is partitioned into a first bit partition and a second bit partition, a number of bits in the first bit partition being based on a number of autonomous uplink hybrid automatic repeat request processes of a UE. The operations of 2005 may be performed according to the methods described herein. In some examples, aspects of the operations of 2005 may be performed by a DFI partition manager as described with reference to FIGS. 13 through 16.

At 2010, the base station may monitor, in a shared radio frequency spectrum band, for an autonomous uplink transmission corresponding to at least one autonomous uplink hybrid automatic repeat request process of the number of autonomous uplink hybrid automatic repeat request processes. The operations of 2010 may be performed according to the methods described herein. In some examples, aspects of the operations of 2010 may be performed by an AUL manager as described with reference to FIGS. 13 through 16.

At 2015, the base station may transmit a feedback transmission including the downlink feedback indication bit sequence based on monitoring for the autonomous uplink transmission. The operations of 2015 may be performed according to the methods described herein. In some examples, aspects of the operations of 2015 may be performed by a DFI manager as described with reference to FIGS. 13 through 16.

Figure 21:
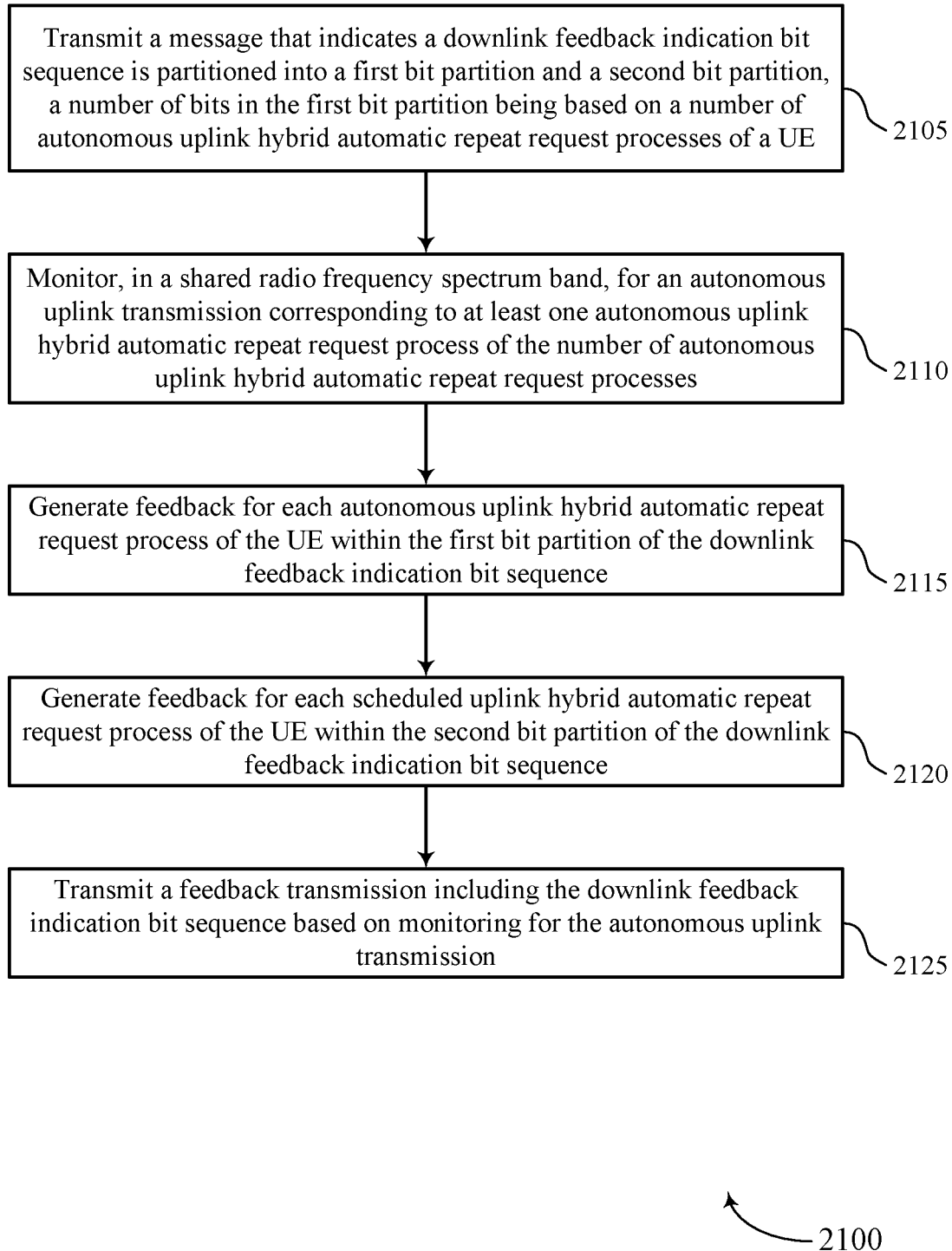

FIG. 21 shows a flowchart illustrating a method 2100 that supports partitioning of DFI bits in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may transmit a message that indicates a downlink feedback indication bit sequence is partitioned into a first bit partition and a second bit partition, a number of bits in the first bit partition being based on a number of autonomous uplink hybrid automatic repeat request processes of a UE. The operations of 2105 may be performed according to the methods described herein. In some examples, aspects of the operations of 2105 may be performed by a DFI partition manager as described with reference to FIGS. 13 through 16.

At 2110, the base station may monitor, in a shared radio frequency spectrum band, for an autonomous uplink transmission corresponding to at least one autonomous uplink hybrid automatic repeat request process of the number of autonomous uplink hybrid automatic repeat request processes. The operations of 2110 may be performed according to the methods described herein. In some examples, aspects of the operations of 2110 may be performed by an AUL manager as described with reference to FIGS. 13 through 16.

At 2115, the base station may generate feedback for each autonomous uplink hybrid automatic repeat request process of the UE within the first bit partition of the downlink feedback indication bit sequence. The operations of 2115 may be performed according to the methods described herein. In some examples, aspects of the operations of 2115 may be performed by a HARQ manager as described with reference to FIGS. 13 through 16.

At 2120, the base station may generate feedback for each scheduled uplink hybrid automatic repeat request process of the UE within the second bit partition of the downlink feedback indication bit sequence. The operations of 2120 may be performed according to the methods described herein. In some examples, aspects of the operations of 2120 may be performed by a HARQ manager as described with reference to FIGS. 13 through 16.

At 2125, the base station may transmit a feedback transmission including the downlink feedback indication bit sequence based on monitoring for the autonomous uplink transmission. The operations of 2125 may be performed according to the methods described herein. In some examples, aspects of the operations of 2125 may be performed by a DFI manager as described with reference to FIGS. 13 through 16.

Figure 22:
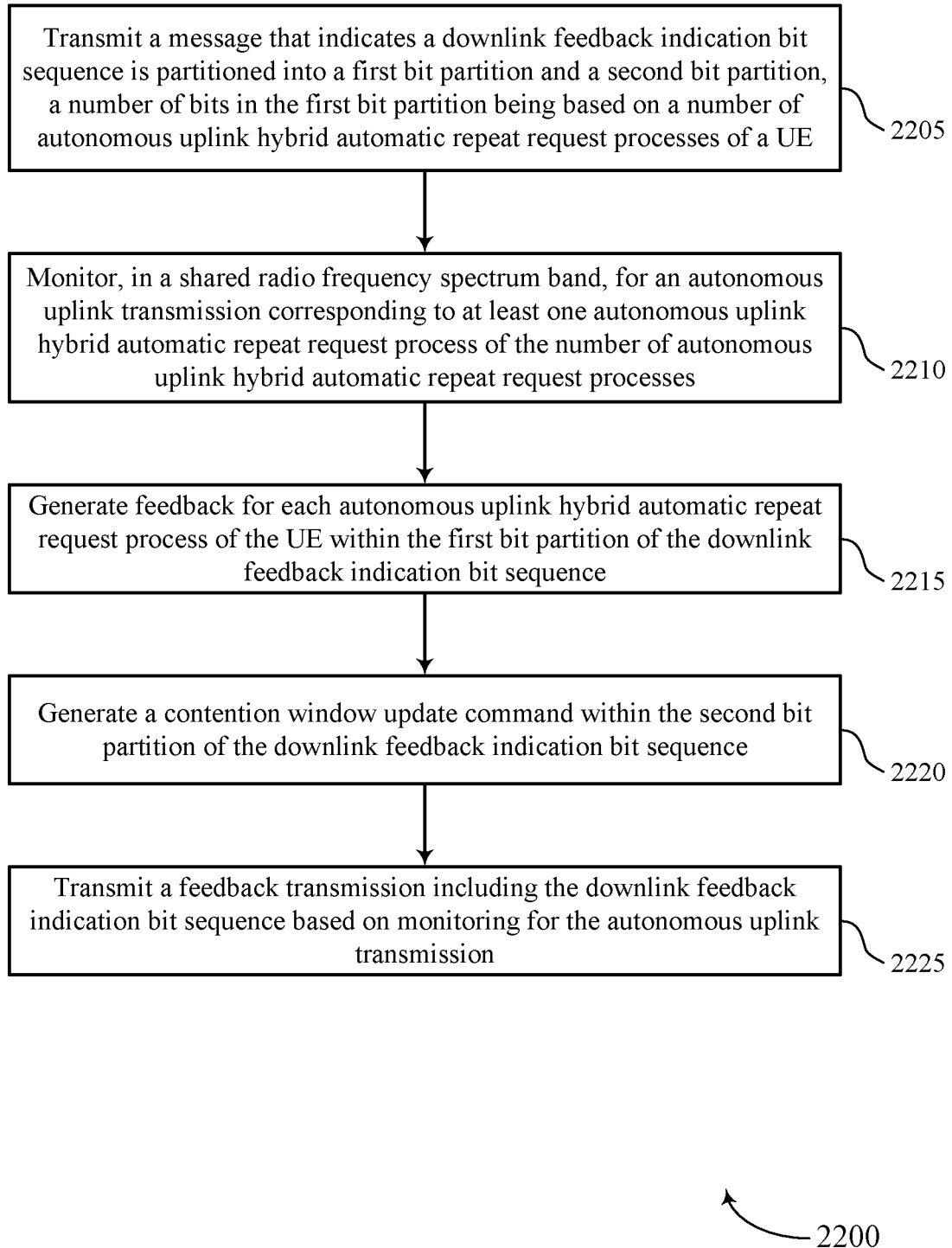

FIG. 22 shows a flowchart illustrating a method 2200 that supports partitioning of DFI bits in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may transmit a message that indicates a downlink feedback indication bit sequence is partitioned into a first bit partition and a second bit partition, a number of bits in the first bit partition being based on a number of autonomous uplink hybrid automatic repeat request processes of a UE. The operations of 2205 may be performed according to the methods described herein. In some examples, aspects of the operations of 2205 may be performed by a DFI partition manager as described with reference to FIGS. 13 through 16.

At 2210, the base station may monitor, in a shared radio frequency spectrum band, for an autonomous uplink transmission corresponding to at least one autonomous uplink hybrid automatic repeat request process of the number of autonomous uplink hybrid automatic repeat request processes. The operations of 2210 may be performed according to the methods described herein. In some examples, aspects of the operations of 2210 may be performed by an AUL manager as described with reference to FIGS. 13 through 16.

At 2215, the base station may generate feedback for each autonomous uplink hybrid automatic repeat request process of the UE within the first bit partition of the downlink feedback indication bit sequence. The operations of 2215 may be performed according to the methods described herein. In some examples, aspects of the operations of 2215 may be performed by a HARQ manager as described with reference to FIGS. 13 through 16.

At 2220, the base station may generate a contention window update command within the second bit partition of the downlink feedback indication bit sequence. The operations of 2220 may be performed according to the methods described herein. In some examples, aspects of the operations of 2220 may be performed by a CW manager as described with reference to FIGS. 13 through 16.

At 2225, the base station may transmit a feedback transmission including the downlink feedback indication bit sequence based on monitoring for the autonomous uplink transmission. The operations of 2225 may be performed according to the methods described herein. In some examples, aspects of the operations of 2225 may be performed by a DFI manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   receiving a message that indicates a downlink feedback indication bit sequence is partitioned into a first bit partition and a second bit partition, a number of bits in the first bit partition being based at least in part on a number of autonomous uplink hybrid automatic repeat request processes of the UE;
   transmitting, in a shared radio frequency spectrum band, an autonomous uplink transmission corresponding to at least one autonomous uplink hybrid automatic repeat request process of the number of autonomous uplink hybrid automatic repeat request processes;
   receiving a feedback transmission comprising the downlink feedback indication bit sequence based at least in part on the autonomous uplink transmission; and
   decoding feedback for the autonomous uplink transmission within the first bit partition of the downlink feedback indication bit sequence.

2. The method of claim 1, further comprising:
   decoding feedback for each scheduled uplink hybrid automatic repeat request process of the UE within the second bit partition of the downlink feedback indication bit sequence; and
   decoding a contention window update command within the second bit partition of the downlink feedback indication bit sequence.

3. The method of claim 2, further comprising:
   transmitting a first uplink transmission; and
   updating a duration of a contention window in accordance with the contention window update command based at least in part on a duration between the first uplink transmission and receipt of the downlink feedback indication bit sequence for the first uplink transmission satisfying a threshold.

4. The method of claim 3, wherein the threshold is semi-statically obtained from radio resource control programming.

5. The method of claim 2, wherein the contention window update command indicates to reset a contention window to a defined duration or to modify a duration of the contention window.

6. The method of claim 2, further comprising:
performing, in the shared radio frequency spectrum band, a clear channel assessment procedure within a contention window based at least in part on the contention window update command.

7. The method of claim 6, further comprising:
retransmitting the autonomous uplink transmission or transmitting a second autonomous uplink transmission in the shared radio frequency spectrum band based at least in part on a result of the clear channel assessment procedure and the feedback for the autonomous uplink transmission.

8. The method of claim 2, wherein the partitioning of the downlink feedback indication bit sequence into the first bit partition and the second bit partition is based at least in part on the second bit partition including the contention window update command based on at least a subset of code block groups within a first uplink hybrid automatic repeat request process of the UE passing error detection, a signal to interference plus noise ratio measurement of a transmission time interval that includes a transport block for the first uplink hybrid automatic repeat request process satisfying a threshold, a collision not being detected within the transmission time interval that includes the first uplink hybrid automatic repeat request process, or any combination thereof.

9. The method of claim 2, wherein the second bit partition comprises a single bit for the contention window update command that indicates a same update to a respective contention window within each sub-band of a plurality of sub-bands in the shared radio frequency spectrum band.

10. The method of claim 2, wherein the second bit partition comprises a plurality of bits for the contention window update command, each bit of the plurality of bits indicating an update to a contention window within a respective sub-band of a plurality of sub-bands in the shared radio frequency spectrum band.

11. The method of claim 1, wherein the partitioning of the downlink feedback indication bit sequence into the first bit partition and the second bit partition is based at least in part on a number of scheduled uplink hybrid automatic repeat request processes of the UE.

12. The method of claim 1, wherein the partitioning of the downlink feedback indication bit sequence into the first bit partition and the second bit partition is based at least in part on a number of operating sub-bands in the shared radio frequency spectrum band.

13. The method of claim 1, wherein the partitioning of the downlink feedback indication bit sequence into the first bit partition and the second bit partition is based at least in part on the first bit partition including a plurality of bits for each autonomous uplink hybrid automatic repeat request process of the UE and the second bit partition including a single bit for each scheduled uplink hybrid automatic repeat request process of the UE.

14. The method of claim 1, wherein the partitioning of the downlink feedback indication bit sequence into the first bit partition and the second bit partition is based at least in part on the first bit partition including a plurality of bits for each autonomous uplink hybrid automatic repeat request process of the UE and the second bit partition including a single bit or two bits for a contention window update command.

15. The method of claim 1, wherein the partitioning of the downlink feedback indication bit sequence into the first bit partition and the second bit partition is based at least in part on the second bit partition including a single bit for feedback for each scheduled uplink hybrid automatic repeat request process of the UE.

16. The method of claim 1, further comprising:
receiving a grant for retransmitting the autonomous uplink transmission within a scheduled uplink resource;
retransmitting the autonomous uplink transmission within the scheduled uplink resource;
receiving a second feedback transmission comprising a second downlink feedback indication bit sequence based at least in part on the retransmitted autonomous uplink transmission; and
decoding feedback for the retransmitted autonomous uplink transmission within the first bit partition of the second downlink feedback indication bit sequence.

17. A method for wireless communication by a base station, comprising:
transmitting a message that indicates a downlink feedback indication bit sequence is partitioned into a first bit partition and a second bit partition, a number of bits in the first bit partition being based at least in part on a number of autonomous uplink hybrid automatic repeat request processes of a user equipment (UE);
monitoring, in a shared radio frequency spectrum band, for an autonomous uplink transmission corresponding to at least one autonomous uplink hybrid automatic repeat request process of the number of autonomous uplink hybrid automatic repeat request processes;
generating feedback for each autonomous uplink hybrid automatic repeat request process of the UE; and
transmitting a feedback transmission comprising the downlink feedback indication bit sequence, wherein the generated feedback is included in the first bit partition of the downlink feedback indication bit sequence.

18. The method of claim 17, further comprising:
monitoring for a retransmission of the autonomous uplink transmission or a second autonomous uplink transmission in the shared radio frequency spectrum band based at least in part on the feedback included in the first bit partition of the downlink feedback indication bit sequence.

19. The method of claim 17, further comprising:
generating feedback for each scheduled uplink hybrid automatic repeat request process of the UE within the second bit partition of the downlink feedback indication bit sequence.

20. The method of claim 17, further comprising:
generating a contention window update command within the second bit partition of the downlink feedback indication bit sequence.

21. The method of claim 20, further comprising:
partitioning the downlink feedback indication bit sequence into the first bit partition and the second bit partition based at least in part on the second bit partition including the contention window update command based on at least a subset of code block groups within a first uplink hybrid automatic repeat request process of the UE passing error detection, a signal to interference plus noise ratio measurement of a transmission time interval that includes a transport block for the first scheduled uplink hybrid automatic repeat request process satisfying a threshold, a collision not being detected within the transmission time interval that includes the first uplink hybrid automatic repeat request process, or any combination thereof.

22. The method of claim 17, further comprising:
partitioning the downlink feedback indication bit sequence into the first bit partition and the second bit partition based at least in part on a number of scheduled uplink hybrid automatic repeat request processes of the UE.

23. The method of claim 17, further comprising:
partitioning the downlink feedback indication bit sequence into the first bit partition and the second bit partition based at least in part on a number of operating sub-bands in the shared radio frequency spectrum band.

24. The method of claim 17, further comprising:
partitioning the downlink feedback indication bit sequence into the first bit partition and the second bit partition based at least in part on the first bit partition including a plurality of bits for each autonomous uplink hybrid automatic repeat request process of the UE and the second bit partition including a single bit for each scheduled uplink hybrid automatic repeat request process of the UE.

25. An apparatus for wireless communication by a user equipment (UE), comprising:
a processor,
memory in electronic communication with the processor; and
instructions stored in the memory and executable by the processor to cause the apparatus to:
receive a message that indicates a downlink feedback indication bit sequence is partitioned into a first bit partition and a second bit partition, a number of bits in the first bit partition being based at least in part on a number of autonomous uplink hybrid automatic repeat request processes of the UE;
transmit, in a shared radio frequency spectrum band, an autonomous uplink transmission corresponding to at least one autonomous uplink hybrid automatic repeat request process of the number of autonomous uplink hybrid automatic repeat request processes;
receive a feedback transmission comprising the downlink feedback indication bit sequence based at least in part on the autonomous uplink transmission; and
decode feedback for the autonomous uplink transmission within the first bit partition of the downlink feedback indication bit sequence.

26. The apparatus of claim 25, wherein the instructions are further executable by the processor to cause the apparatus to:
decode feedback for each scheduled uplink hybrid automatic repeat request process of the UE within the second bit partition of the downlink feedback indication bit sequence; and
decode a contention window update command within the second bit partition of the downlink feedback indication bit sequence.

27. The apparatus of claim 26, wherein the instructions are further executable by the processor to cause the apparatus to:
transmit a first uplink transmission; and
update a duration of a contention window in accordance with the contention window update command based at least in part on a duration between the first uplink transmission and receipt of the downlink feedback indication bit sequence for the first uplink transmission satisfying a threshold.

28. The apparatus of claim 27, wherein the threshold is semi-statically obtained from radio resource control programming.

29. An apparatus for wireless communication by a base station, comprising:
a processor,
memory in electronic communication with the processor; and
instructions stored in the memory and executable by the processor to cause the apparatus to:
transmit a message that indicates a downlink feedback indication bit sequence is partitioned into a first bit partition and a second bit partition, a number of bits in the first bit partition being based at least in part on a number of autonomous uplink hybrid automatic repeat request processes of a user equipment (UE);
monitor, in a shared radio frequency spectrum band, for an autonomous uplink transmission corresponding to at least one autonomous uplink hybrid automatic repeat request process of the number of autonomous uplink hybrid automatic repeat request processes;
generate feedback for each autonomous uplink hybrid automatic repeat request process of the UE; and
transmit a feedback transmission comprising the downlink feedback indication bit sequence, wherein the generated feedback is included in the first bit partition of the downlink feedback indication bit sequence.

* * * * *